(12) United States Patent
Ishikawa et al.

(10) Patent No.: US 10,007,042 B2
(45) Date of Patent: Jun. 26, 2018

(54) COMPOSITION, LIGHT REFLECTING FILM, LUMINANCE-IMPROVING FILM, BACKLIGHT UNIT, AND LIQUID CRYSTAL DISPLAY DEVICE

(71) Applicant: FUJIFILM Corporation, Tokyo (JP)

(72) Inventors: Hiroyuki Ishikawa, Kanagawa (JP); Shinichi Morishima, Kanagawa (JP); Mitsuyoshi Ichihashi, Kanagawa (JP); Katsufumi Ohmuro, Kanagawa (JP); Akio Tamura, Kanagawa (JP); Wataru Hoshino, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days. days.

(21) Appl. No.: 15/266,292

(22) Filed: Sep. 15, 2016

(65) Prior Publication Data

US 2017/0010398 A1    Jan. 12, 2017

Related U.S. Application Data

(63) Continuation of application No. PCT/JP2015/058414, filed on Mar. 20, 2015.

(30) Foreign Application Priority Data

Mar. 20, 2014 (JP) ................................ 2014-058471

(51) Int. Cl.
| | |
|---|---|
| *G02F 1/1333* | (2006.01) |
| *G02B 5/30* | (2006.01) |
| *C09K 19/58* | (2006.01) |
| *C08F 220/14* | (2006.01) |
| *C08F 220/22* | (2006.01) |
| *C08F 220/28* | (2006.01) |
| *G02F 1/1335* | (2006.01) |
| *C09K 19/32* | (2006.01) |
| *C09K 19/34* | (2006.01) |
| *C09K 19/52* | (2006.01) |

(52) U.S. Cl.
CPC .......... *G02B 5/3016* (2013.01); *C08F 220/14* (2013.01); *C08F 220/22* (2013.01); *C08F 220/28* (2013.01); *C09K 19/322* (2013.01); *C09K 19/3405* (2013.01); *C09K 19/586* (2013.01); *C09K 19/588* (2013.01); *G02B 5/30* (2013.01); *G02F 1/133553* (2013.01); *C08F 2220/281* (2013.01); *C09K 19/348* (2013.01); *C09K 2019/323* (2013.01); *C09K 2019/328* (2013.01); *C09K 2019/3408* (2013.01); *C09K 2019/3433* (2013.01); *C09K 2019/528* (2013.01); *G02F 2001/133507* (2013.01)

(58) Field of Classification Search
CPC .. C09K 19/586; C09K 19/588; C09K 19/322; C09K 19/3405; C09K 19/348; C09K 2019/323; C09K 2019/3433; C09K 2019/528; C09K 2019/328; C09K 2019/3408; G02F 1/1333; G02F 1/133553; G02F 2001/133507; C08F 220/14; C08F 220/22; C08F 220/28; C08F 2220/281; G02B 5/3016; G02B 5/30

USPC ........................... 252/299.01, 299.6; 428/1.1
See application file for complete search history.

(56) References Cited

U.S. PATENT DOCUMENTS

| | | | |
|---|---|---|---|
| 6,444,280 B1 | 9/2002 | Matsuoka et al. | |
| 6,569,502 B1 * | 5/2003 | Ito .................... | G02F 1/133632 252/299.7 |
| 6,839,103 B2 | 1/2005 | Kelly et al. | |
| 2003/0164920 A1 | 9/2003 | Kelly et al. | |
| 2003/0178601 A1 | 9/2003 | Kirsh et al. | |

FOREIGN PATENT DOCUMENTS

| | | |
|---|---|---|
| JP | 01-133003 A | 5/1989 |
| JP | H10-307208 A | 11/1998 |
| JP | 2000-171637 A | 6/2000 |
| JP | 2000-304930 A | 11/2000 |
| JP | 2003-270443 A | 9/2003 |
| JP | 2004-504285 A | 2/2004 |
| JP | 2013-195630 A | 9/2013 |

OTHER PUBLICATIONS

International Search Report issued in connection with International Patent Application No. PCT/JP2015/058414 dated May 12, 2015.
Written Opinion issued in connection with International Patent Application No. PCT/JP2015/058414 dated May 12, 2015.
International Preliminary Report on Patentability issued by WIPO dated Sep. 29, 2016, in connection with International Patent Application No. PCT/JP2015/058414.
Notification of Reasons for Refusal issued by the Japanese Patent Office dated Sep. 26, 2016, in connection with Japanese Patent Application No. 2016-508817.
Notification of Reasons for Refusal issued by the Japanese Patent Office dated Jan. 23, 2018, in connection with Japanese Patent Application No. 2016-508817.
Ditch Hiroo, accepted type liquid crystal display of reality and optical art, Optics 27 (2),1998, pp. 74-80, Optical Society of Japan, Japan.

(Continued)

*Primary Examiner* — Geraldina Visconti
(74) *Attorney, Agent, or Firm* — Edwards Neils, LLC; Jean C. Edwards, Esq.

(57) ABSTRACT

There is provided a composition containing a discotic liquid crystal compound, a chiral agent, and a surfactant which can form a light reflecting layer formed by fixing a cholesteric liquid crystalline phase, which exhibits excellent durability under a hot and humid environment and excellent heat resistance, and has few alignment defects; a light reflecting film; a luminance-improving film; a backlight unit; and a liquid crystal display device.

21 Claims, 2 Drawing Sheets

(56) References Cited

OTHER PUBLICATIONS

First Office Action issued by the State Intellectual Property Office of China dated Jan. 17, 2018, in connection with Chinese Patent Application No. 201580015048.2.

\* cited by examiner

COMPOSITION, LIGHT REFLECTING FILM, LUMINANCE-IMPROVING FILM, BACKLIGHT UNIT, AND LIQUID CRYSTAL DISPLAY DEVICE

CROSS-REFERENCE TO RELATED APPLICATIONS

This application is a Continuation of PCT International Application No. PCT/JP2015/058414, filed on Mar. 20, 2015, which was published under PCT Article 21(2) in Japanese, and which claims priority under 35 U.S.C. Section 119(a) to Japanese Patent Application No. 2014-058471 filed on Mar. 20, 2014. The above applications are hereby expressly incorporated by reference, in their entirety, into the present application.

BACKGROUND OF THE INVENTION

1. Field of the Invention

The present invention relates to a composition, a light reflecting film, a luminance-improving film, a backlight unit, and a liquid crystal display device. In more detail, the present invention relates to a composition, a light reflecting film using the composition, a luminance-improving film using the light reflecting film, a luminance-improving film-attached backlight unit using the luminance-improving film, and a liquid crystal display device using the luminance-improving film.

2. Description of the Related Art

The applications of a flat panel display such as a liquid crystal display device (hereinafter, also referred to as LCD) as an image display device which has low power consumption and is space-saving are expanding year by year. A liquid crystal display device has a configuration in which a backlight (hereinafter, also referred to as BL), a backlight side polarizing plate, a liquid crystal cell, and a viewing side polarizing plate are provided in this order.

In recent years, in flat panel display markets, development in power saving has been progressing as LCD performance improvement. This performance improvement has been significantly seen in liquid crystal display devices having a small size, such as, in particular, tablet PCs, smartphones, or the like.

On the other hand, in a large-size device for TV applications, development of a next generation high-definition television (4K2K, EBU ratio of 100% or greater) for the current TV standard (FHD, NTSC (National Television System Committee) ratio of 72%≈BU (European Broadcasting Union) ratio of 100%) has been progressing, and development in power saving has been progressing as performance improvement equivalently to that in a small-size device. Thus, there has been increasing demand for power saving in a liquid crystal display device.

With power saving for a backlight, it has been proposed to provide a reflective polarizer between a backlight and a backlight side polarizing plate. A reflective polarizer is an optical element which transmits only light oscillating in a specific polarization direction and reflects light oscillating in other specific polarization directions, form light incident while oscillating in all polarization directions. Thus, it is possible to recycle the light reflected without being transmitted through the reflective polarizer, and it is possible to improve the light use efficiency in the LCD.

As the reflective polarizer, a light reflecting layer formed by fixing a cholesteric liquid crystalline phase which is a reflective polarizer reflecting only circular polarization in one direction is known.

As an example of the light reflecting layer formed by fixing a cholesteric liquid crystalline phase, in JP2013-195630A, a light reflecting film which has two or more layers of a film formed by fixing a liquid crystal phase after a curable liquid crystal composition is applied on the film formed by fixing the liquid crystal phase after a resin film or a curable liquid crystal composition is applied, is transparent, and includes a surfactant having a specific structure in which a curable liquid crystal composition has a hydrogen bonding group and a fluoroalkyl chain is described. In the examples of JP2013-195630A, only examples of a light reflecting film obtained by using a rod-shaped liquid crystal compound are disclosed, but in JP2013-195630A, a light reflecting layer using a discotic liquid crystal compound is also described.

In JP1998-307208A (JP-H10-307208A), a manufacturing method of an optical film in which a discotic liquid crystalline material having a chiral discotic nematic phase is rapidly cooled at a cooling speed of 100° C./min or greater from a temperature region in which this liquid crystal phase is exhibited, and then subjected to a photocrosslinking reaction is described. In the examples of JP1998-307208A (JP-H10-307208A), an optical film obtained by using a liquid crystal composition including a discotic liquid crystal compound with chirality and another discotic liquid crystal compound is disclosed. In particular, in Example 4, a red light reflecting film having a film thickness of 10 μm and a reflecting center wavelength of 640 nm is disclosed.

In JP2000-171637A, an optical compensation sheet having an optically anisotropic layer including a polymer formed of a non-chiral discotic liquid crystal compound having a polymerizable group and a chiral compound is described. In the examples of JP2000-171637A, an optically anisotropic layer obtained by using a liquid crystal composition including a discotic liquid crystal compound without chirality and a discotic liquid crystal compound with chirality is disclosed.

SUMMARY OF THE INVENTION

As a result of studies on the light reflecting layer formed by fixing a cholesteric liquid crystalline phase described in these documents, the present inventors found that, first, the light reflecting film formed by fixing a cholesteric liquid crystalline phase using a rod-shaped liquid crystal compound disclosed in the examples of JP2013-195630A or the like needs further improvement in durability and heat resistance under a hot and humid environment. Specifically, the present inventors found that, if the light reflecting film is disposed near a backlight unit of the liquid crystal display device, the light reflecting film is placed over a long period of time under a hot and humid environment or heated to a high temperature, and thus, a new problem in which the light reflectance of the light reflecting film is lowered may occur.

Next, as a result of studies on the performance of the red light reflecting film in Example 4 of JP1998-307208A (JP-H10-307208A), the present inventors found that alignment defects (specifically, roughness caused by the film thickness irregularity of the surface of a light reflecting layer) may occur. If alignment defects occur, the reflectance of a light reflecting film is lowered in a case where the film thicknesses are the same, and in a case where the light reflecting film is incorporated into an LCD, a problem of the diagonal tint change occurs, and thus, in a case where the light reflecting film is used as a reflective polarizer of an LCD, it is very important to suppress the alignment defects. In addition, in recent years, there has been an increasing demand for a thinner LCD on the market, and development of a thinner LCD is required. With thinning of an LCD, thinning of optical members used in an LCD is required. Thinning of the luminance-improving film using a reflective polarizer has also been demanded. Thus, when using the red reflecting film in Example 4 of JP1998-307208A (JP-H10-307208A) as a reflective polarizer of LCD, not improvement in the direction for increasing a thickness but improvement in alignment defects is demanded.

As a result of studies on the optically anisotropic layer described in JP2000-171637A, the present inventors found that improvement in alignment defects as in JP1998-307208A (JP-H10-307208A) is demanded.

An object of the present invention is to provide a composition which enables formation of a light reflecting layer formed by fixing a cholesteric liquid crystalline phase, which exhibits excellent durability under a hot and humid environment and excellent heat resistance, and has few alignment defects.

As a result of thorough studies, the present inventors found that, by including a discotic liquid crystal compound, a chiral agent, and a surfactant, it is possible to provide a composition which enables formation of a light reflecting layer formed by fixing a cholesteric liquid crystalline phase, which exhibits excellent durability under a hot and humid environment and excellent heat resistance, and has few alignment defects, in comparison with the related art, and completed the present invention.

In JP1998-307208A (JP-H10-307208A) and JP2000-171637A, it is not disclosed and not suggested that a surfactant is added to a composition including a discotic liquid crystal compound, but it was found unexpectedly that the alignment defects can be eliminated by adding a surfactant.

That is, the above problems are solved by the present invention having the following configurations.

[1] A composition comprising a discotic liquid crystal compound, a chiral agent, and a surfactant.

[2] The composition according to [1], in which the surfactant is preferably a polymer type surfactant.

[3] The composition according to [1] or [2], in which the discotic liquid crystal compound preferably has a 3-substituted benzene structure.

[4] The composition according to any one of [1] to [3], in which the chiral agent preferably contains an axially asymmetric structure.

[5] The composition according to any one of [1] to [4], in which the chiral agent preferably contains a binaphthyl structure.

[6] The composition according to any one of [1] to [5], in which the chiral agent is preferably represented by the following General Formula (1).

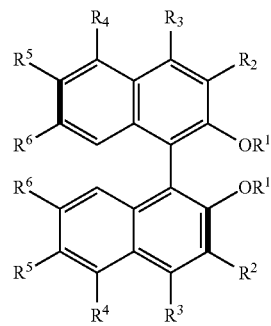

General Formula (1)

In General Formula (1), $R^1$ to $R^6$ each independently represent a monovalent organic group or an inorganic group; a plurality of $R^1$ to $R^6$ may be the same as or different from each other; and $R^1$ to $R^6$ may be linked to each other.

[7] The composition according to any one of [1] to [6], in which the chiral agent is preferably represented by the following General Formula (2).

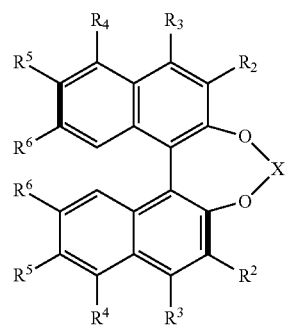

General Formula (2)

In General Formula (2), $R^2$ to $R^6$ each independently represent a monovalent organic group; a plurality of $R^2$ to $R^6$ may be the same as or different from each other; $R^2$ to $R^6$ may be linked to each other; and X represents a divalent organic group or an inorganic group.

[8] The composition according to any one of [1] to [7], in which the composition is preferably used for forming a light reflecting layer formed by fixing a cholesteric liquid crystalline phase.

[9] A light reflecting film comprising a first light reflecting layer formed by fixing a cholesteric liquid crystalline phase of the composition according to any one of [1] to [8], in which, in the first light reflecting layer, a discotic liquid crystal compound is aligned vertically.

[10] The light reflecting film according to [9], in which the first light reflecting layer and a λ/4 plate are preferably laminated to each other.

[11] The light reflecting film according to [9] or [10], in which the first light reflecting layer is preferably laminated in direct contact with a surface of an underlayer.

[12] The light reflecting film according to [11], in which the underlayer preferably contains the discotic liquid crystal compound.

[13] The light reflecting film according to [12], in which, in the underlayer, the discotic liquid crystal compound is preferably aligned vertically.

[14] The light reflecting film according to any one of [11] to [13], in which the underlayer is preferably laminated on a support.

[15] The light reflecting film according to any one of [11] to [14], in which the underlayer is preferably a λ/4 plate.

[16] A luminance-improving film, comprising the light reflecting film according to any one of [9] to [15] and a second light reflecting layer formed by fixing a cholesteric liquid crystalline phase of a rod-shaped liquid crystal compound, the light reflecting film according to any one of [9] to [15] and a second light reflecting layer formed by fixing a cholesteric liquid crystalline phase of a rod-shaped liquid crystal compound being laminated to each other.

[17] The luminance-improving film according to [16], in which the light reflecting film according to any one of [9] to [15] includes a λ/4 plate, and the λ/4 plate, the first light reflecting layer, and the second light reflecting layer are preferably laminated in this order.

[18] The luminance-improving film according to [16] or [17] preferably further comprising a third light reflecting layer formed by fixing a cholesteric liquid crystalline phase of a rod-shaped liquid crystal compound.

[19] The luminance-improving film according to [18], in which any one of the first light reflecting layer, the second light reflecting layer, and the third light reflecting layer is a blue light reflecting layer having a peak of reflectance of which the reflecting center wavelength is 380 nm to 499 nm and the full width at half maximum is 100 nm or less, another one is a green light reflecting layer having a peak of reflectance of which the reflecting center wavelength is 500 nm to 599 nm and the full width at half maximum is 125 nm or less, and the other one is a red light reflecting layer having a peak of reflectance of which the reflecting center wavelength is 600 nm to 750 nm and the full width at half maximum is 150 nm or less.

[20] A luminance-improving film-attached backlight unit comprising the luminance-improving film according to any one of [16] to [19] and a backlight unit.

[21] A liquid crystal display device using the luminance-improving film according to any one of [16] to [19].

According to the present invention, it is possible to provide a composition which enables formation of a light reflecting layer formed by fixing a cholesteric liquid crystalline phase, which exhibits excellent durability under a hot and humid environment and excellent heat resistance, and has few alignment defects.

In addition, according to the present invention, it is possible to provide a luminance-improving film which has high heat resistance and can suppress a diagonal tint change when incorporated into a liquid crystal display device.

DESCRIPTION OF THE PREFERRED EMBODIMENTS

Figure 1:
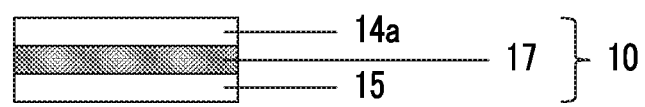
FIG. 1 is a schematic diagram showing a cross-section of one example of a light reflecting film of the present invention, and this is an aspect having a support, a λ/4 plate and an underlayer (alignment film (which is referred to as alignment layer)) formed on the support, and a first light reflecting layer laminated in direct contact with a surface of the underlayer.

Hereinafter, the composition, the light reflecting film, the luminance-improving film, the luminance-improving film-attached backlight unit, and the liquid crystal display device of the present invention will be described in detail.

The description of the constitutive elements as described below is based on representative embodiments of the present invention, but the present invention is not limited to such embodiments. Moreover, in the specification, ranges with the numerical values indicated by "to" mean the ranges including the numerical values described before and after the "to" as the upper limit and the lower limit, respectively.

In the specification, "full width at half maximum" of a peak refers to the peak width at the ½ peak height.

[Composition]

The composition of the present invention contains a discotic liquid crystal compound, a chiral agent, and a surfactant.

With this configuration, the composition of the present invention enables formation of a light reflecting layer formed by fixing a cholesteric liquid crystalline phase, which exhibits excellent durability under a hot and humid environment and excellent heat resistance, and has few alignment defects.

The composition using a discotic liquid crystal compound can enhance the heat resistance of the light reflecting layer formed by fixing a cholesteric liquid crystalline phase compared to the composition using a rod-shaped liquid crystal compound. The composition using a chiral agent and a surfactant improves the durability of the light reflecting layer formed by fixing a cholesteric liquid crystalline phase under a hot and humid environment. In addition, the composition using a surfactant can reduce the alignment defects of the light reflecting layer formed by fixing a cholesteric liquid crystalline phase.

The composition of the present invention is preferably a composition for formation of a light reflecting layer formed by fixing a cholesteric liquid crystalline phase.

<Discotic Liquid Crystal Compound>

The light reflecting layer formed by fixing a cholesteric liquid crystalline phase using a discotic liquid crystal compound as a cholesteric liquid crystal material will be described.

The discotic liquid crystal compound is not particularly limited, and can be appropriately selected, as necessary. Specific examples of the discotic liquid crystal compound include compounds described in JP2007-108732A, JP2010-244038A, JP2013-195630A, JP1998-307208A (JP-H10-307208A), or JP2000-171637A.

In general, in JP2013-195630A, it is described that the cholesteric discotic liquid crystal compound preferably has a triphenylene structure. However, as a result of studies, the present inventors found that a discotic liquid crystal compound having a 3-substituted benzene structure has higher optical performance in terms of reflectance than a discotic liquid crystal compound having a triphenylene structure since the discotic liquid crystal compound has large Δn and a large full width at half maximum. That is, the discotic liquid crystal compound preferably has a 3-substituted benzene structure.

Preferable examples of the discotic liquid crystal compound are shown below, but the present invention is not limited thereto.

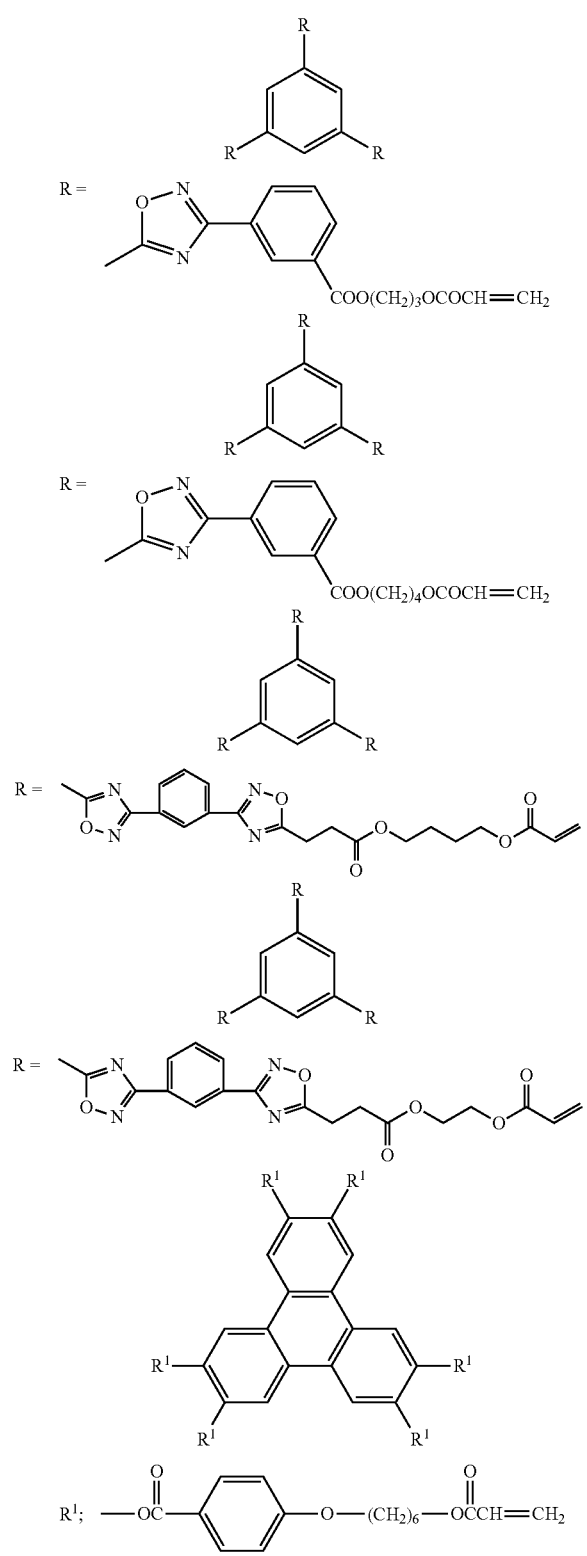

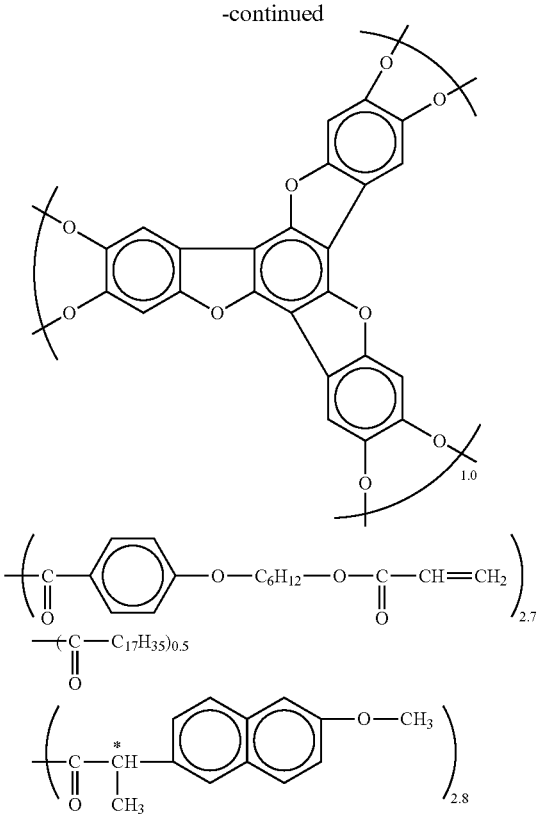

(the number next to the parenthesis represents a molar compositional ratio)

<Chiral Agent>

The chiral agent is not limited, and can be appropriately selected, as necessary.

The chiral agent can be selected from, for example, various known chiral agents (for example, chiral agents for TN or STN, 199 p, Section 4-3, Chapter 3 in Liquid Crystal Device Handbook edited by first 42 Committee of Japan Society for the Promotion of Science, 1989).

As the chiral agent, chiral agent including an asymmetric carbon atom, an axially asymmetric compound (which may be a compound not including an asymmetric carbon atom) containing an axially asymmetric structure, or a planarly asymmetric compound (which may be a compound not including an asymmetric carbon atom) can also be used. Examples of the axially asymmetric compound or the planarly asymmetric compound include binaphthyl, helicene, paracyclophane, and derivatives thereof.

The chiral agent may have a polymerizable group. Examples of the chiral agent exhibiting a strong torsion force include chiral agents described in JP2010-181852A, JP2003-287623A, JP2002-80851A, JP2002-80478A, or JP2002-302487A. Furthermore, regarding the isosorbide compounds described in these documents, isomannide compounds having a corresponding structure can also be used, and regarding the isomannide compounds described in these documents, isosorbide compounds having a corresponding structure can also be used.

From the viewpoint of alignment defects and reflectance, the chiral agent used in the composition of the present invention preferably contain an axially asymmetric structure and more preferably contains a binaphthyl structure, and the binaphthyl structure particularly preferably includes binaphthol as a partial structure.

In a case where the binaphthyl structure includes binaphthol as a partial structure, a structure in which binaphthols are bonded to each other through a divalent linking group is preferable. As the divalent linking group in this case, a linking chain of ether, a linking chain of ester, a linking chain including a phosphorus atom, or a linking chain including a sulfur atom is preferable, and a linking chain of ether, a linking chain of ester, or a linking chain including a phosphorus atom is more preferable.

The chiral agent most preferably has a structure in which the binaphthyl structure includes binaphthol as a partial structure, a ring is formed through a linking group of ether. As the estimated reason why reflectance and alignment defects are increased, it is thought that this is because, in the case of being used in a discotic liquid crystal, an axially asymmetric chiral agent having a higher aspect ratio has higher interactivity and does not disturb crystallinity compared with the case of using a discotic liquid crystal using an asymmetric carbon atom.

A chiral agent containing a binaphthyl structure is preferably represented by the following General Formula (1), and more preferably represented by General Formula (2).

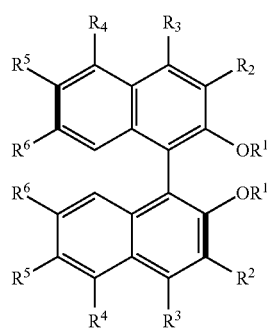

General Formula (1)

In General Formula (1), $R^1$ to $R^6$ each independently represent a monovalent organic group or an inorganic group; a plurality of $R^1$ to $R^6$ may be the same as or different from each other; and $R^1$ to $R^6$ may be linked to each other.

Examples of the monovalent organic group or the inorganic group represented by $R^1$ to $R^6$ in General Formula (1) include a hydrogen atom, a halogen atom, an alkyl group, an alkynyl group, an aryl group, a formyl group, an acyl group, a sulfonyl group, a sulfinyl group (—S(=O)—), a phospho group, a phosphono group, and a phosphoryl group.

$R^1$ in General Formula (1) is preferably an alkyl group, an aryl group, an acyl group, a sulfonyl group, a sulfinyl group (—S(=O)—), a phospho group, a phosphono group, and a phosphoryl group. The plurality of $R^1$'s are preferably linked to each other.

Each of $R^2$ to $R^4$ and $R^6$ in General Formula (1) are preferably a hydrogen atom.

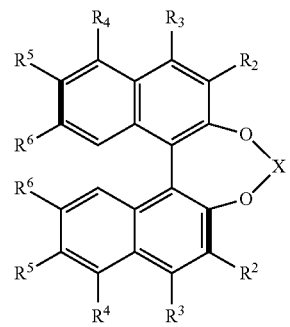

General Formula (2)

In General Formula (2), $R^2$ to $R^6$ each independently represent a monovalent organic group; a plurality of $R^2$ to $R^6$ may be the same as or different from each other; $R^2$ to $R^6$ may be linked to each other; and X represents a divalent organic group or an inorganic group.

Examples and preferable ranges of $R^2$ to $R^6$ in General Formula (2) are the same as the examples and the preferable ranges of $R^2$ to $R^6$ in General Formula (1).

As the divalent organic group or the inorganic group represented by X, a linking chain of ether, a linking chain of ester, a linking chain including a phosphorus atom, or a linking chain including a sulfur atom is preferable. Specific examples of the divalent organic group or the inorganic group represented by X include an alkylene group, an arylene group, a heteroarylene group, a compound having —C(=O)-$L^1$-C(=O)— ($L^1$ represents a divalent linking group), a sulfinyl group (—S(=O)—), and —P(=O)(—OR$^P$)— (R$^P$ represents a substituent, and is preferably an alkyl group or an aryl group).

As specific compounds preferably used as the chiral agent containing a binaphthyl structure, the following compounds are preferable.

As compounds in which X is a linking chain of ether, compounds in which X is an alkylene group, an arylene group, or a heteroarylene group are preferable. As the compounds in which X is an alkylene group, the compounds described in paragraphs [0019] to [0045] of JP2002-179669A are preferable, and the contents described in this document are incorporated in the present invention. As the compounds in which X is an arylene group or a heteroarylene group, the compounds described in paragraphs [0010] to [0044] of JP2002-179670A are preferable, and the contents described in this document are incorporated in the present invention.

As the compounds in which X is a linking chain of ester, that is, X is a compound having —C(=O)-$L^1$-C(=O)— ($L^1$ represents a divalent linking group), the compounds described in paragraphs [0017] to [0053] of JP2002-179668A are preferable, and the contents described in this document are incorporated in the present invention.

As the compounds in which X is a linking chain including a phosphorus atom, the compounds described in paragraphs [0018] to [0048] of JP2002-180051A are preferable, and the contents described in this document are incorporated in the present invention.

<Surfactant>

The surfactant used the composition of the present invention is not particularly limited, and can be appropriately selected. Specific examples of the surfactant include surfactants described in paragraphs [0103] to [0144] of JP2009-193046A, surfactants described in paragraphs [0140] to

[0147] of JP2013-242555A as low molecule-based surfactants, and surfactants described in paragraphs [0016] to [0032] of JP2013-228433A as polymer-based surfactants, but the present invention is not limited thereto. From the viewpoint of reducing alignment defects and cissing, the polymer-based surfactant is preferable.

The weight average molecular weight of the polymer-based surfactant is preferably 1,000 to 30,000, more preferably 5,000 to 20,000, and still more preferably 7,000 to 10,000.

In addition, in a case where a polymer-based surfactant is used, it was found that the durability is improved unexpectedly. It is thought that this is because, in the polymer-based surfactant, at the interface of each layer, hydrolysis is less likely to proceed, and an acid is less likely to be generated, and due to this, decomposition of the composition of the light reflecting layer is not promoted.

As the polymer-based surfactant, a fluorine-base surfactant, a silicone-based surfactant, or a compound having an alkyl chain having 4 or more carbon atoms is preferable, a fluorine-base surfactant or a compound having an alkyl chain having 4 or more carbon atoms is more preferable, and a fluorine-base surfactant is most preferable. If using such a surfactant, alignment defects can be reduced, and cissing can be reduced, and the composition is suitable as a light reflecting film.

In fluorine-base surfactant, the weight content of monomer units having a fluorine is preferably 40% or greater, more preferably 60% or greater, and most preferably 80% or greater. If the content of monomer units having a fluorine is great, the film thickness irregularity hardly occurs, and due to this, alignment time or alignment defects are reduced, and the performance of the luminance-improving film is improved.

The fluorine-base surfactant is preferably a polymer having, for example, a fluorinated alkyl group (which may be interrupted by an ether bond, an ester bond, a carbonyl group, or a urethane bond) having 1 to 20 carbon atoms and an amphiphilic group in a side chain.

The fluorinated alkyl group is not particularly limited as long as it has 1 to 20 carbon atoms, and may be interrupted by an ether bond (—O—), an ester bond (—CO—O—), a carbonyl group (—CO—), a urethane bond (—NH—CO—O—), but is preferably not interrupted by these groups, that is, is preferably represented by —$C_kH_lF_m$ (k represents an integer of 1 to 20, l represents an integer of 0 to 40, m represents an integer of 1 to 41, and l+m=2k+1).

The fluorinated alkyl group is preferably a fluorinated alkyl group including a perfluoroalkyl group having 1 to 10 carbon atoms, in which the remaining carbon atoms have not been fluorinated. The perfluoroalkyl group more preferably has 3 to 10 carbon atoms.

On the other hand, as the amphiphilic group, amphiphilic groups included in nonionic surfactants known in the related art are exemplified, and the amphiphilic group including an alkylene group which has been interrupted by an ether bond, an ester bond, or a carbonyl group is preferable. Among these, the amphiphilic group including a polyalkyleneoxy group (a polyethyleneoxy group, a polypropyleneoxy group, or a polybutyleneoxy group) is preferable.

Such fluorine-based surfactants can be obtained by at least polymerizing a monomer having the fluorinated alkyl group and a monomer having the amphiphilic group. As the monomer having the fluorinated alkyl group and the monomer having the amphiphilic group, the monomers represented by each of the following Formulas (h1) and (h2), and General Formula (X) are preferable.

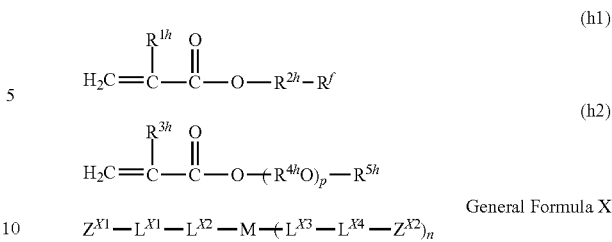

In Formula (h1), $R^{1h}$ represents a hydrogen atom or a methyl group, $R^{2h}$ represents a linear, branched, or cyclic alkylene group having 1 to 15 carbon atoms, preferably 1 to 10 carbon atoms, and $R^f$ represents a perfluoroalkyl group having 1 to 5 carbon atoms, preferably 3 to 5 carbon atoms.

In Formula (h2), $R^{3h}$ represents a hydrogen atom or a methyl group, $R^{4h}$ represents an alkylene group having 2 to 4 carbon atoms, and $R^{5h}$ represents a hydrogen atom or an alkyl group having 1 to 15 carbon atoms, preferably having 1 to 10 carbon atoms.

In addition, in Formula (h2), p represents an integer from 1 to 50.

Specific examples of the monomer represented by Formula (h1) include 2,2,2-trifluoroethyl (meth)acrylate, 2,2,3,3,3-pentafluoropropyl (meth)acrylate, 2-(perfluorobutyl)ethyl (meth)acrylate, and 2-(perfluoro-3-methylbutyl)ethyl (meth)acrylate.

In addition, specific examples of the monomer represented by Formula (h2) include (meth)acrylic acid methoxypolyethylene glycol ester [for example, having a number (r) of ethylene glycol repeating units of 1 to 50], (meth)acrylic acid methoxypolypropylene glycol ester [for example, having a number (r) of propylene glycol repeating units of 1 to 50], (meth)acrylic acid methoxypoly(ethylene-propylene) glycol ester [for example, having a sum (r) of the number of ethylene glycol repeating units and the number of propylene glycol repeating units of 2 to 50], (meth)acrylic acid methoxypoly(ethylene-tetramethylene) glycol ester [for example, having a sum (r) of the number of ethylene glycol repeating units and the number of propylene glycol repeating units of 2 to 50], (meth)acrylic acid butoxypoly(ethylene-propylene) glycol ester [for example, having a sum (r) of the number of ethylene glycol repeating units and the number of propylene glycol repeating units of 2 to 50], (meth)acrylic acid octoxypoly(ethylene-propylene) glycol ester [for example, having a sum (r) of the number of ethylene glycol repeating units and the number of tetramethylene glycol repeating units of 2 to 50], (meth)acrylic acid lauroxypolyethylene glycol ester [for example, having a number (r) of ethylene glycol repeating units of 2 to 50], (meth)acrylic acid lauroxypoly(ethylene-propylene) glycol ester [for example, having a sum (r) of the number of ethylene glycol repeating units and the number of propylene glycol repeating units of 2 to 50], polyethylene glycol (meth)acrylate, polypropylene glycol (meth)acrylate, polyethylene glycol-polypropylene glycol (meth)acrylate, polyethylene glycol-polybutylene glycol (meth)acrylate, polystyrylethyl (meth)acrylate, and LIGHT ESTER HOA-MS and LIGHT ESTER HOMS manufactured by KYOEISHA CHEMICAL Co., Ltd.

In Formula X, $Z^{X1}$ and $Z^{X2}$ each independently represent a group having a radical polymerizable double bond, $L^{X1}$ and $L^{X4}$ each independently represent a single bond or an alkylene group having a hydroxyl group, $L^{X2}$ and $L^{X3}$ each independently represent a single bond or a divalent linking group configured of at least one selected from the group consisting of —O—, —(C=O)O—, —O(C=O)—, a divalent chain-like group, an alkylene group having a hydroxyl group, and divalent aliphatic cyclic group, M represents a single bond or a di- to tetravalent linking group, and n represents an integer of 1 to 3.

$Z^{x1}$ and $Z^{x2}$ each independently represent a group having a radical polymerizable double bond. Examples of the group having a radical polymerizable double bond are shown below.

Examples of the group having a radical polymerizable double bond include the following Formula Z1 to Z6 and $CH_2=C(R^1)$—C(=O)—O— (the preferable range of $R^1$ in the linking group is the same as the preferable range of $R^1$ in General Formula X1 described below).

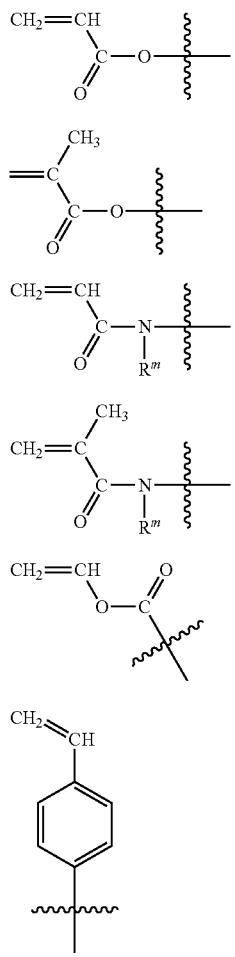

Formula Z1

Formula Z2

Formula Z3

Formula Z4

Formula Z5

Formula Z6

In Formulas Z1 to Z6, $R^m$ represents a hydrogen atom or an alkyl group having 1 to 20 carbon atoms, more preferably an alkyl group having 1 to 7 carbon atoms, and most preferably a hydrogen atom or a methyl group.

Among Formulas Z1 to Z6, Formula Z1 or Z2 is preferable, and Formula Z1 is more preferable.

$L^{x1}$ and $L^{x4}$ each independently represent a single bond or an alkylene group having a hydroxyl group. $L^{x1}$ and $L^{x4}$ are each independently preferably —CH$_2$CH(OH)CH$_2$— or —CH$_2$CH(CH$_2$OH)—, and most preferably —CH$_2$CH(OH)CH$_2$—. $L^{x1}$ and $L^{x4}$ may be the same as or different from each other.

$L^{x2}$ and $L^{x3}$ each independently represent a single bond, —O—, —(C=O)O—, —O(C=O)—, a divalent chain-like group, an alkylene group having a hydroxyl group, a divalent aliphatic cyclic group, or a combination thereof. The divalent chain-like group may be linear or branched. The alkylene group having a hydroxyl group is preferably —CH$_2$CH(OH)CH$_2$— or —CH$_2$CH(CH$_2$OH)—, and more preferably —CH$_2$CH(OH)CH$_2$—.

The preferable combinations of $L^{x2}$ are shown below. The left side is bonded to the $Z^{x1}$ side, and the right side is bonded to M.

Lx21: —O-divalent chain-like group-
Lx22: —O-divalent aliphatic cyclic group-divalent chain-like group-
Lx23: —OC(=O)-divalent aliphatic cyclic group-
Lx24: -divalent aliphatic cyclic group-(C=O)O—
Lx25: —(O-divalent chain-like group)$_n$-
Lx26: —O-alkylene group having a hydroxyl group- The preferable combinations of $L^{x3}$ are shown below. The left side is bonded to M, and the right side is bonded to the $Z^{x2}$ side.

Lx31: -divalent chain-like group-O—
Lx32: -divalent chain-like group-divalent aliphatic cyclic group-O—
Lx33: -divalent aliphatic cyclic group-C(=O)O—
Lx34: —O(C=O)-divalent cyclic group-
Lx35: -(divalent chain-like group-O—)$_n$—
Lx36: -alkylene group having a hydroxyl group-O—

The divalent chain-like group means an alkylene group, a substituted alkylene group, an alkenylene group, a substituted alkenylene group, an alkynylene group, or a substituted alkynylene group. An alkylene group, a substituted alkylene group, an alkenylene group, or a substituted alkenylene group is preferable, and an alkylene group or an alkenylene group is more preferable.

The alkylene group may have a branch. The alkylene group preferably has 1 to 12 carbon atoms, more preferably 2 to 10 carbon atoms, and most preferably 2 to 8 carbon atoms.

The alkylene moiety of a substituted alkylene group is the same as the alkylene group described above. Examples of the substituent include a halogen atom.

The alkenylene group may have a branch. The alkenylene group preferably has 2 to 12 carbon atoms, more preferably 2 to 10 carbon atoms, and most preferably 2 to 8 carbon atoms.

The alkenylene moiety of a substituted alkenylene group is the same as the alkenylene group described above. Examples of the substituent include a halogen atom.

The alkynylene group may have a branch. The alkynylene group preferably has 2 to 12 carbon atoms, more preferably 2 to 10 carbon atoms, and most preferably 2 to 8 carbon atoms.

The alkynylene moiety of a substituted alkynylene group is the same as the alkynylene group described above. Examples of the substituent include a halogen atom.

Specific examples of the divalent chain-like group include ethylene, trimethylene, propylene, tetramethylene, 2-methyl-tetramethylene, pentamethylene, hexamethylene, octamethylene, 2-butenylene, and 2-butynylene.

The divalent aliphatic cyclic group represented by $L^{x2}$ and $L^{x3}$ in Formula X is preferably a 5-membered ring, a 6-membered ring, or a 7-membered ring, more preferably a 5-membered ring or a 6-membered ring, and most preferably a 6-membered ring.

The ring included in the divalent aliphatic cyclic group may be any one of an aliphatic cycle and a saturated heterocycle. Examples of the aliphatic cycle include a cyclohexane ring, a cyclopentane ring, and a norbornene ring.

The divalent aliphatic cyclic group may have a substituent. Examples of the substituent include a halogen atom, a cyano group, a nitro group, an alkyl group having 1 to 5 carbon atoms, a halogen-substituted alkyl group having 1 to 5 carbon atoms, an alkoxy group having 1 to 5 carbon atoms, an alkylthio group having 1 to 5 carbon atoms, an acyloxy group having 2 to 6 carbon atoms, an alkoxycarbonyl group having 2 to 6 carbon atoms, a carbamoyl group, an alkyl-substituted carbamoyl group having 2 to 6 carbon atoms, and an acylamino group having 2 to 6 carbon atoms. Among these, an alkyl group having 1 to 5 carbon atoms or a halogen-substituted alkyl group having 1 to 5 carbon atoms is preferable.

In General Formula X, n represents an integer of 1 to 3. In a case where n is 2 or 3, a plurality of $L^{x3}$'s and $L^{x4}$'s may be the same as or different from each other, and a plurality of $Z^{x2}$'s may be the same as or different from each other. n is preferably 1 or 2, and more preferably 1.

In General Formula X, M is a single bond or a di- to tetravalent linking group. In General Formula X, when n is 1, M is a divalent linking group, when n is 2, M is a trivalent linking group, and when n is 3, M is a tetravalent linking group.

M is preferably a di- to tetravalent chain-like group, a group having an aliphatic cyclic group, or a group having an aromatic ring. The di- to tetravalent chain-like group represents a saturated hydrocarbon group having 2 to 4 direct bonds. The saturated hydrocarbon groups preferably has 1 to 40 carbon atoms, more preferably 1 to 20 carbon atoms, and still more preferably 1 to 10 carbon atoms. The saturated hydrocarbon group may be linear or branched.

In Formula X1, $R^1$, $R^2$, and $R^3$ each independently represent a hydrogen atom or an alkyl group having 1 to 20 carbon atoms, $L^{11}$, $L^{12}$, and $L^{13}$ each independently represent a single bond or a divalent linking group configured of at least one selected from the group consisting of —O—, —(C=O)O—, —O(C=O)—, a divalent chain-like group, an alkylene group having a hydroxyl group, and divalent aliphatic cyclic group, $M^1$ represents a single bond or a di- to tetravalent linking group, and n1 represents an integer of 0 to 2.

Each of $R^1$, $R^2$, and $R^3$ in General Formula X1 is preferably a hydrogen atom or an alkyl group having 1 to 12 carbon atoms, more preferably an alkyl group having 1 to 6 carbon atoms, and particularly preferably a hydrogen atom or a methyl group. More preferable ranges of $R^1$ and $R^2$ in General Formula X1 are the same as the preferable ranges of $R^1$ and $R^2$ in General Formula X2 described below.

$L^{11}$, $L^{12}$, and $L^{13}$ each have the same meaning as $L^{x2}$ and $L^{x3}$ in General Formula X, and the preferable combinations thereof are also the same. More preferable ranges of $L^{11}$, $L^{12}$, and $L^{13}$ in General Formula X1 are the same as the preferable ranges of $L^{11}$ and $L^{12}$ in General Formula X2 described below.

n1 in General Formula X1 is preferably 0 to 1, and more preferably 0.

$M^1$ in General Formula X1 has the same meaning as M in General Formula X, and the preferable range thereof is also the same. A more preferable range of $M^1$ in General Formula X1 are the same as the preferable range of $M^1$ in General Formula X2 described below.

In a case where n is 0 in General Formula X and M is a divalent linking group, the monomer represented by General Formula X is preferably a monomer represented by the following General Formula X2.

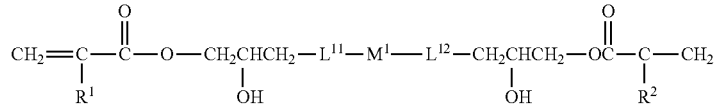

General Formmual X2

Examples of the group having an aliphatic cyclic group include a cyclohexane ring, a cyclopentane ring, and a norbornene ring.

Examples of the group having the aromatic cyclic group include a phenyl group and a naphthalene group.

The valence of M is more preferably 2 or 3, and particularly preferably 3.

The monomer represented by General Formula X is more preferably a monomer represented by the following General Formula X1.

In Formula X2, $R^1$ and $R^2$ each independently represent a hydrogen atom or an alkyl group having 1 to 20 carbon atoms, $L^{11}$ and $L^{12}$ each independently represent a single bond or a divalent linking group configured of at least one selected from the group consisting of —O—, —(C=O)O—, —O(C=O)—, a divalent chain-like group, an alkylene group having a hydroxyl group, and divalent aliphatic cyclic group, and $M^1$ represents a single bond or a divalent linking group.

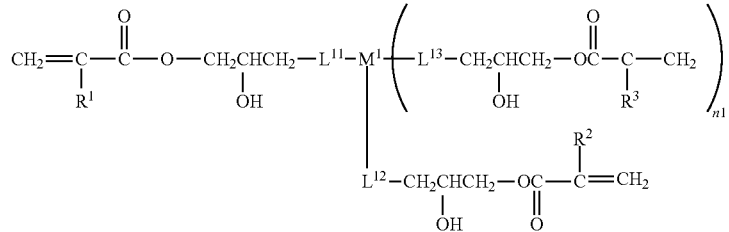

General Formula X1

Each of $R^1$ and $R^2$ in General Formula X2 is preferably a hydrogen atom or a methyl group, and most preferably a hydrogen atom.

$L^{11}$ and $L^{12}$ in General Formula X2 are each independently preferably *—O—**, *—O—CH$_2$—**, *—OCH(CH$_3$)—**, *—O—C$_2$H$_4$—**, *—O—C$_3$H$_6$—**, or *—OCH$_2$CH(OH)CH$_2$—**, and more preferably *—O—** or *—O—CH$_2$—**. * is bonded to an alkyl group having a hydroxyl group in General Formula X1 or X2, and ** is bonded to $M^1$.

$M^1$ in General Formula X2 is preferably a single bond, —C$_6$H$_{10}$—, —O(C=O)C$_6$H$_4$(C=O)O—, —O(C=O)C$_6$H$_{10}$(C=O)O—, or —O—C$_6$H$_4$—C(CH$_3$)(CH$_3$)—C$_6$H$_4$—O—.

The fluorine-based surfactant may be a surfactant obtained by polymerizing (meth)acrylic acid alkyl ester within a range not impairing the effects of the present invention, in addition to the monomer represented by Formula (h1) and the monomer represented by Formula (h2). Specific examples of the alkyl (meth)acrylate include methyl (meth)acrylate, ethyl (meth)acrylate, n-propyl (meth)acrylate, i-propyl (meth)acrylate, n-butyl (meth)acrylate, i-butyl (meth)acrylate, n-octyl (meth)acrylate, 2-ethylhexyl (meth)acrylate, i-nonyl (meth)acrylate, lauryl (meth)acrylate, hexadecyl (meth)acrylate, stearyl (meth)acrylate, cyclohexyl (meth)acrylate, benzyl (meth)acrylate, and isobornyl (meth)acrylate.

The fluorine-based surfactant may be any one of a random polymer and a graft polymer, and is preferably a graft polymer.

<Other Components>

The composition of the present invention used for forming a light reflecting layer formed by fixing a cholesteric liquid crystalline phase may contain other components such as a polymerization initiator and an alignment assistant, in addition to a cholesteric liquid crystal material.

Examples of the photopolymerization initiator include α-carbonyl compounds (described in U.S. Pat. No. 2,367,661A or U.S. Pat. No. 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. No. 3,046,127A or U.S. Pat. No. 2,951,758A), combinations of a triarylimidazole dimer and p-aminophenyl ketone (described in U.S. Pat. No. 3,549,367A), acridine and phenazine compounds (described in JP1985-105667A (JP-S60-105667A) or U.S. Pat. No. 4,239,850A) and oxadiazole compounds (described in U.S. Pat. No. 4,212,970A), and acyl phosphine oxide compounds (described in JP1988-40799B (JP-S63-40799B), JP-1994-29234B (JP-H05-29234B), JP1998-95788A (JP-H10-95788A), or JP1998-29997A (JP-H10-29997A))

<Solvent>

As the solvent of the composition of the present invention for forming a light reflecting layer, an organic solvent is preferably used. Examples of the organic solvent include amides (for example, N,N-dimethylformamide), sulfoxides (for example, dimethyl sulfoxide), heterocyclic compound (for example, pyridine), hydrocarbons (for example, benzene and hexane), alkyl halides (for example, chloroform and dichloromethane), esters (for example, methyl acetate and butyl acetate), ketones (for example, acetone, methylethylketone, and cyclohexanone), and ethers (for example, tetrahydrofuran and 1,2-dimethoxyethane). Alkyl halides or ketones are preferable. A combination of two or more kinds of the organic solvents may be used.

[Light Reflecting Film]

The light reflecting film of the present invention includes a first light reflecting layer formed by fixing a cholesteric liquid crystalline phase of the composition of the present invention, and in the first light reflecting layer, a discotic liquid crystal compound is aligned vertically.

<Configuration>

The configuration of the light reflecting film of the present invention will be described based on the drawings.

In FIG. 1, as one example of the light reflecting film of the present invention, an aspect in which a λ/4 plate and an underlayer (alignment film) 17 are formed on a support 15 and a first light reflecting layer 14a is laminated thereon in direct contact is shown. The light reflecting film of the present invention is not limited to the aspect of FIG. 1, and as shown in FIG. 3, it is preferable that a λ/4 plate 12 is laminated on the support 15, the first light reflecting layer 14a is laminated thereon through an adhesive layer (gluing material) 20, and an underlayer (alignment film) 18 is laminated thereon.

Figure 3:
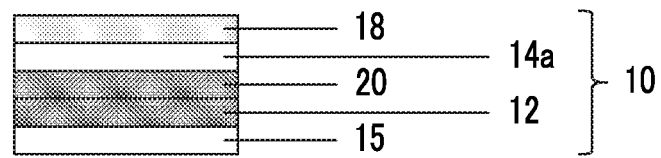
FIG. 3 is a schematic diagram showing a cross-section of another example of the light reflecting film of the present invention, and this is an aspect in which the λ/4 plate and a reflective polarizer having the first light reflecting layer, the second light reflecting layer, and the third light reflecting layer are laminated in direct contact with each other.

The λ/4 plate 12 shown in FIGS. 1 and 3 may be a single-layer or may be a laminate formed of two or more layers, and is preferably a laminate formed of two or more layers.

(First Light Reflecting Layer Formed by Fixing Cholesteric Liquid Crystalline Phase)

The first light reflecting film is a light reflecting layer formed by fixing a cholesteric liquid crystalline phase, and in the first light reflecting layer, a discotic liquid crystal compound is aligned vertically.

"The discotic liquid crystal compound is "aligned vertically"" refers to a state in which a surface vertical to a director of the discotic liquid crystal compound is vertical to the air interface of a film, or the underlayer. Here, "vertical" is not required to be vertical (angle between a surface and a straight line is 90°) in the strict sense, and optical errors are acceptable. For example, the angle between the air interface of the discotic liquid crystal compound or the underlayer and the plane vertical to the director of the discotic liquid crystal is preferably 90°±20°, more preferably 90°±15°, and particularly preferably 90°±10°.

Here, it can be confirmed in the following manner that, in any film, the discotic liquid crystal compound is aligned vertically.

The vertical alignment of the discotic liquid crystal compound can be obtained by, for example, measuring Re and Rth using AXOSCAN manufactured by Axometrics Inc.

In the vertical alignment of the discotic liquid crystal compound in which the cholesteric liquid crystal phase is not formed, the vertical alignment can be confirmed from the fact that Re exhibits a positive value.

In the vertical alignment of the discotic liquid crystal compound in which the cholesteric liquid crystal phase is formed, the vertical alignment can be confirmed from the fact that Rth exhibits a negative value.

In addition, it can be confirmed in the following manner that, in any film, the discotic liquid crystal compound is aligned vertically and exhibits a cholesteric phase.

For example, the vertical alignment can be confirmed from the fact that when Rth is measured using AXOSCAN manufactured by Axometrics Inc., the Rth is a negative value. The cholesteric liquid crystalline phase can be confirmed from the fact that when a UV absorption spectrum is measured, a wavelength selectively reflecting the light is present. In addition, in a case where visible light is reflected, it can be confirmed that selective reflection occurs by ensuring that only the light of any one of a right-handed circular polarization plate and a left-handed circular polarization plate of the reflected light is transmitted, and it can be confirmed that a cholesteric liquid crystalline phase is formed.

In addition, as a method for obtaining Rth of a cholesteric layer, a method using a polarization ellipsometry can be applied.

For example, if using the ellipsometry method as described in Jpn. J. Appl. Phys. 48 (2009) 03B021 by M. Kimura et al., the thickness of the cholesteric layer, the pitch, and the twist angle can be obtained, and the value of Rth can be obtained therefrom.

The reflecting center wavelength and the full width at half maximum of the light reflecting layer can be obtained as follows.

If the transmission spectrum of a light reflecting layer is measured using a spectrophotometer UV3150 (Shimadzu Corporation), a decreased peak in the transmittance can be seen in the selective reflection region. If, of the two wavelengths having the transmittances at half the height of the greatest peak height, the value of the wavelength on the short wavelength side is $\lambda 1$ (nm) and the value of the wavelength on the long wavelength side is $\lambda 2$ (nm), the reflecting center wavelength and the full width at half maximum can be represented by the following Equation.

Reflecting center wavelength=$(\lambda 1+\lambda 2)/2$

Full width at half maximum=$(\lambda 2-\lambda 1)$

A wavelength (that is, reflecting center wavelength) giving a peak of refractive index can be adjusted by changing the pitch or the refractive index of the helical structure in the cholesteric liquid crystalline phase of a light reflecting layer formed by fixing a cholesteric liquid crystalline phase, and changing the pitch can be easily adjusted by changing the amount of chiral agent added. Specifically, there is detailed description in a Fujifilm research report No. 50 (2005), pp. 60-63.

The manufacture method of the light reflecting layer formed by fixing a cholesteric liquid crystalline phase is not particularly limited, and for example, the method described in JP1989-133003A (JP-1H01-133003A), JP3416302B, JP3363565B, or JP1996-271731A (JP-H08-271731A) can be used, and the contents thereof are incorporated in the present invention.

(Underlayer)

The underlayer is not particularly limited, and can be appropriately selected. As the underlayer, a known alignment film and a layer containing a discotic liquid crystal compound can be exemplified, and from the viewpoint of reducing alignment defects, the underlayer is preferably a layer containing a discotic liquid crystal compound and more preferably a film in which a discotic liquid crystal compound is aligned vertically. By a layer containing a discotic liquid crystal compound having a large excluded volume being present in the underlayer, excellent performance as an alignment film is exhibited. In addition, if the underlayer is a vertical alignment film, it is thought that, when a light reflecting layer is aligned vertically, the surface free energy becomes equal, and thus, an alignment in which an intermolecular force increases becomes advantageous.

Moreover, as a known alignment film, SUNEVER SE-130 (manufactured by Nissan Chemical Industries, Ltd.) or the like can be used.

In the light reflecting film of the present invention, the first light reflecting layer is preferably laminated in direct contact with a surface of an underlayer.

In the light reflecting film of the present invention, the underlayer is preferably laminated on a support. The support of the underlayer is not particularly limited, and any resin film or glass can be used. A preferable aspect of the support is described below as a preferable aspect of the support of a $\lambda/4$ plate.

($\lambda/4$ Plate)

The light reflecting film of the present invention preferably has a $\lambda/4$ plate. In the light reflecting film of the present invention, the first light reflecting layer and the $\lambda/4$ plate are preferably laminated, and the underlayer of the first light reflecting layer is preferably the $\lambda/4$ plate.

The $\lambda/4$ plate is a layer for converting circular polarization passed through a reflective polarizer to linear polarization.

At the same time, by adjusting the retardation (Rth) in the thickness direction, it is possible to cancel the phase difference in the thickness direction of the light reflecting layer which occurs in the case of viewing from an oblique direction.

In the light reflecting film of the present invention, Rth (550) of the $\lambda/4$ plate is preferably −120 nm to 120 nm, more preferably −80 nm to 80 nm, and particularly preferably −70 nm to 70 nm.

In the present specification, definition and measurement method of Re and Rth of the $\lambda/4$ plate are the same as the definition and measurement method of Re and Rth of the polarizing plate protective film described below.

In the light reflecting film of the present invention, the $\lambda/4$ plate preferably satisfies the following Expressions (A) to (C).

$450 \text{ nm}/4-35 \text{ nm} < Re(450) < 450 \text{ nm}/4+35 \text{ nm}$    Expression (A)

$550 \text{ nm}/4-35 \text{ nm} < Re(550) < 550 \text{ nm}/4+35 \text{ nm}$    Expression (B)

$630 \text{ nm}/4-35 \text{ nm} < Re(630) < 630 \text{ nm}/4+35 \text{ nm}$    Expression (C)

(in Formulas (A) to (C), Re($\lambda$) represents retardation (unit: nm) in the in-plane direction at a wavelength of $\lambda$ nm)

The material used in the $\lambda/4$ plate is not particularly limited. Various polymer films, for example, polyester-based polymers such as cellulose acylate, a polycarbonate-based polymer, polyethylene terephthalate, and polyethylene naphthalate, acryl-based polymers such as polymethyl methacrylate, styrene-based polymers such as polystyrene and an acrylonitrile-styrene copolymer (AS resin) can be used. In addition, it is possible to use for producing a light reflecting film by selecting one or more polymers from polyolefins such as polyethylene and polypropylene, polyolefin-based polymers such as an ethylene-propylene copolymer, vinyl chloride-based polymers, amide-based polymers such as nylon or aromatic polyamide, imide-based polymers, sulfone-based polymers, polyether sulfone-based polymers, polyether ether ketone-based polymers, polyphenylene sulfide-based polymers, vinylidene chloride-based polymers, vinyl alcohol-based polymers, vinyl butyral-based polymers, allylate-based polymers, polyoxymethylene-based polymers, epoxy-based polymers, and polymers obtained by mixing the above polymers, by producing a polymer film using the selected polymers as main components, and by combining the polymers such that the above-described characteristics are satisfied.

In addition, the $\lambda/4$ plate preferably includes at least one of layers formed of a composition containing a liquid crystalline compound. That is, the $\lambda/4$ plate is preferably a laminate of a polymer film (support) and an optically anisotropic layer formed of a composition containing a liquid crystalline compound. As the support, a polymer film having small optical anisotropy may be used, or a polymer film in which optical anisotropy is expressed by a stretching treatment may be used. The support preferably has a light transmittance of 80% or greater.

In addition, the type of the liquid crystalline compound used in formation of an optically anisotropic layer is not particularly limited. For example, an optically anisotropic layer obtained by fixing by photocrosslinking or thermal crosslinking after formation of a nematic alignment in the liquid crystal state of a low molecular liquid crystalline compound or an optically anisotropic layer obtained by fixing the alignment by cooling after formation of a nematic alignment in the liquid crystal state of a polymer crystalline compound can also be used. In the present invention, even in a case where the liquid crystalline compound is used in the optically anisotropic layer, the optically anisotropic layer is a layer formed by fixing the liquid crystalline compound by polymerization, and after the layer is formed, it is not necessary to exhibit crystallinity any longer. The polymerizable liquid crystalline compound may be a polyfunctional polymerizable liquid crystalline compound or may be a monofunctional polymerizable liquid crystalline compound. In addition, the liquid crystalline compound may be a discotic liquid crystalline compound or may be a rod-shaped liquid crystalline compound. In the present invention, a discotic liquid crystalline compound is more preferable.

As the rod-shaped liquid crystal compound, for example, the rod-shaped liquid crystal compounds described in JP1999-513019A (JP-H11-513019A) or JP2007-279688A can be preferably used, and, as the discotic liquid crystal compound, for example, the discotic liquid crystal compounds described in JP2007-108732A or JP2010-244038A can be preferably used, but the present invention is not limited thereto.

In the optically anisotropic layer described above, the molecules of the liquid crystal compound are preferably immobilized in any alignment state of a vertical alignment, a horizontal alignment, a hybrid alignment, and a tilt alignment. To produce a phase difference plate in which the viewing angle dependency is symmetrical, it is preferable that the disc surface of a discotic liquid crystalline compound is substantially vertical to the film surface (optically anisotropic layer surface) or the long axis of a rod-shaped liquid crystal compound is substantially horizontal to the film surface (optically anisotropic layer surface). "The discotic liquid crystalline compound is substantially vertical" means that the average of the angle between the film surface (optically anisotropic layer surface) and the disc surface of the discotic liquid crystalline compound is within a range of 70° to 90°. 80° to 90° is more preferable, and 85° to 90° is still more preferable. "The rod-shaped liquid crystalline compound is substantially horizontal" means that the angle between the film surface (optically anisotropic layer surface) and the director of the rod-shaped liquid crystal compound is within a range of 0° to 20°. 0° to 10° is more preferable, and 0° to 5° is still more preferable.

The optically anisotropic layer can be formed by applying a liquid crystalline compound such as a rod-shaped liquid crystalline compound or a discotic liquid crystalline compound, and if desired, a coating solution including a polymerization initiator, an alignment control agent, or other additives described below to a support. The optically anisotropic layer is preferably formed by forming an alignment film on the support and applying the coating solution on the alignment film surface.

In the present invention, it is preferable that the above-described composition is applied to the surface of the alignment film and the molecules of the liquid crystalline compound are aligned. Since the alignment film has a function of defining the alignment direction of the liquid crystalline compound, it is preferable to use the alignment film to achieve a preferable aspect of the present invention. However, if the alignment state is fixed after the liquid crystalline compound is aligned, the alignment film plays its role, and thus, is not essential as a configuration component of the present invention. That is, it is also possible to produce a polarizing plate of the present invention by transfer only an optical anisotropic layer on an alignment film of which the alignment state is fixed onto a polarizing layer or a support.

The alignment film is preferably formed by a rubbing treatment of a polymer.

Examples of the polymer can be used in the alignment film include methacrylate-based copolymers, styrene-based copolymers, polyolefins, polyvinyl alcohols, modified polyvinyl alcohols, poly(N-methylolacrylamide), polyesters, polyimides, vinyl acetate copolymers, carboxymethyl cellulose, and polycarbonates described in paragraph [0022] of JP1996-338913A (JP-H08-338913A). A silane coupling agent can be used as a polymer. A water-soluble polymer (for example, poly(N-methylolacrylamide), carboxymethyl cellulose, gelatin, polyvinyl alcohol, or modified polyvinyl alcohol) is preferable, gelatin, polyvinyl alcohol, or modified polyvinyl alcohol is more preferable, and polyvinyl alcohol or modified polyvinyl alcohol is most preferable.

It is preferable that the composition is applied to the rubbing-treated surface of the alignment film and the molecules of the liquid crystalline compound are aligned. Thereafter, as necessary, the above-described optically anisotropic layer can be formed by reacting an alignment film polymer with a polyfunctional monomer included in the optically anisotropic layer or crosslinking an alignment film polymer using a crosslinking agent.

The film thickness of the alignment film is preferably within a range of 0.1 µm to 10 µm.

The in-plane retardation (Re) of a support (polymer film) supporting an optically anisotropic layer is preferably 0 nm to 50 nm, more preferably 0 nm to 30 nm, and still more preferably 0 nm to 10 nm. If the retardation is within the above range, the light leak of the reflected light can be reduced to the extent that the light leak is not visible, and thus, this is preferable.

In addition, the retardation (Rth) in the thickness direction of the support is preferably selected by a combination with the optically anisotropic layer provided on or beneath the support. Thus, it is possible to reduce light leak of the reflected light and the tint shift at the time of observing from an oblique direction.

Examples of the material of the polymer film used in the support include the material used in the λ/4 plate, cellulose acylate films (for example, a cellulose triacetate film (refractive index of 1.48), a cellulose diacetate film, a cellulose acetate butyrate film, and a cellulose acetate propionate film), polyolefins such as polyethylene and polypropylene, polyester-based resin films such as polyethylene terephthalate and polyethylene naphthalate, polyacryl-based resin films such as a polyether sulfone film and polymethylmethacrylate, a polyurethane-based resin film, a polyester film, a polycarbonate film, a polysulfone film, a polyether film, a polymethylpentene film, a polyether ketone film, a (meth) acryl nitrile film, and polymers having an alicyclic structure (a norbornene-based resin (ARTON, trade name, manufactured by JSR Corporation)), amorphous polyolefin (ZEONEX, trade name, manufactured by Nippon Zeon Corp.)).

Among these, triacetyl cellulose, polyethylene terephthalate, or polymer having an alicyclic structure is preferable, and triacetyl cellulose is particularly preferable.

A transparent support having a thickness of about 5 μm to 150 μm can be used, the thickness of the transparent support is preferably 5 μm to 80 μm, and more preferably 20 μm to 60 μm. In addition, the transparent support may be formed by lamination of a plurality of layers. To suppress the reflection of external light, a thin support is preferable, but if the thickness is less than 5 μm, the strength of the film is weakened, and thus, this is undesirable. To improve adhesion between a transparent support and a layer (an adhesive layer, a vertical alignment film, or a phase difference layer) provided thereon, the surface treatment (for example, a glow discharge treatment, a corona discharge treatment, an ultraviolet (UV) treatment, or a flame treatment) may be performed on the transparent support. An adhesive layer (undercoat layer) may be provided on the transparent support. In addition, to impart slipperiness to a transparent support or a long transparent support in the transport step or to prevent attaching of the rear surface and the surface after winding, one formed by applying a polymer layer obtained by mixing inorganic particles having an average particle diameter of about 10 nm to 100 nm in a solid content weight ratio of 5% to 40% to one side of a support or co-casting with the support is preferably used.

In the light reflecting film of the present invention, the λ/4 plate more preferably satisfies the following Expressions (1) to (4).

| 450 nm/4-25 nm<$Re(450)$<450 nm/4+25 nm | Expression (1) |
| 550 nm/4-25 nm<$Re(550)$<550 nm/4+25 nm | Expression (2) |
| 630 nm/4-25 nm<$Re(630)$<630 nm/4+25 nm | Expression (3) |
| $Re(450)$<$Re(550)$<$Re(630)$ | Expression (4) |

(in Formulas (1) to (4), $Re(\lambda)$ represents retardation (unit: nm) in the in-plane direction at a wavelength of λ nm)

The λ/4 plate still more preferably satisfies the following Expressions (1') to (4').

| 450 nm/4-15 nm<$Re(450)$<450 nm/4+15 nm | Expression (1') |
| 550 nm/4-15 nm<$Re(550)$<550 nm/4+15 nm | Expression (2') |
| 630 nm/4-15 nm<$Re(630)$<630 nm/4+15 nm | Expression (3') |
| $Re(450)$<$Re(550)$<$Re(630)$ | Expression (4') |

The λ/4 plate particularly preferably satisfies the following Expressions (1") to (4").

| 450 nm/4-5 nm<$Re(450)$<450 nm/4+5 nm | Expression (1") |
| 550 nm/4-5 nm<$Re(550)$<550 nm/4+5 nm | Expression (2") |
| 630 nm/4-5 nm<$Re(630)$<630 nm/4+5 nm | Expression (3") |
| $Re(450)$<$Re(550)$<$Re(630)$ | Expression (4") |

The manufacture method of the λ4 plate which satisfies Expressions (1) to (4) is not particularly limited, and for example, the method described in JP1996-1271731A (HP-H08-271731A) can be used, and the contents thereof are incorporated in the present invention.

The method described in JP1996-271731A (JP-H08-271731) is described below.

As the ¼ wavelength plate formed of a superposition of phase difference films, for example, a plate obtained by laminating a plurality of phase difference films to intersect their optical axes in combination of one giving a phase difference of a ½ wavelength with respect to monochromatic light and one giving a phase difference of a ¼ wavelength is exemplified.

In the case of a ¼ wavelength plate formed of a superposition of the phase difference films, by laminating a plurality of phase difference films giving a phase difference of a ½ wavelength or a ¼ wavelength with respect to monochromatic light to intersect their optical axes, the wavelength dispersion of retardation defined as the product (Δnd) of the refractive index difference (Δn) of a birefringent light and the thickness (d) can be superimposed, or increased or decreased, and arbitrarily controlled, and by suppressing the wavelength dispersion while controlling the phase difference as a whole to a ¼ wavelength, a wavelength plate showing a phase difference of a ¼ wavelength over a wide wavelength region can be obtained.

The laminating number of phase difference films in a ¼ wavelength plate formed of a superposition of the phase difference films is arbitrary. From the viewpoint of light transmittance, 2 to 5 films are generally laminated. The arrangement positions of a phase difference film giving a phase difference of a ½ wavelength and a phase difference film giving a phase difference of a ¼ wavelength are arbitrary.

In addition, in a case where the retardation of light having a wavelength of 450 nm is $R_{450}$, and the retardation of light having a wavelength of 550 nm is $R_{550}$, the ¼ wavelength plate formed of a superposition of the phase difference films can be obtained by laminating a phase difference film having a large retardation in which the $R_{450}/R_{550}$ ratio is 1.00 to 1.05 and a phase difference film having a small retardation in which the $R_{450}/R_{550}$ ratio is 1.05 to 1.20 by intersecting the optical axes thereof.

Even in the case of the ¼ wavelength plate formed of a superposition of the phase difference films, by laminating phase difference films having different retardations by intersecting the optical axis, in particular, by orthogonalizing, it is possible to control the wavelength dispersion of retardation in each phase difference film to be superimposed or to be increased or decreased, and, in particular, it is possible to reduce the retardation to the short wavelength side.

Additionally, specific examples of the ¼ wavelength plate by the ¼ wavelength plate formed of a superposition of the phase difference films include a laminate obtained by laminating a phase difference film (retardation of light having a wavelength of 550 nm: 700 nm) formed by stretching a polyvinyl alcohol film and a phase difference film (retardation of light having a wavelength of 550 nm: 560 nm) formed by stretching a polycarbonate film such that the optical axes thereof becomes orthogonal. The laminate substantially functions as the ¼ wavelength plate over a wavelength range of 450 nm to 750 nm.

The phase difference film can be obtained, for example, by a method of stretching a polymer film uniaxially or biaxially as described above. The type of the polymer is not particularly limited, and a polymer having excellent transparency is preferably used. Examples thereof include a polycarbonate-based polymer, a polyester-based polymer, a polysulfone-based polymer, a polyether sulfone-based polymer, a polystyrene-based polymer, a polyolefin-based polymer, a polyvinyl alcohol-based polymer, a cellulose acetate-based polymer, a polyvinyl chloride-based polymer, and a polymethyl methacrylate-based polymer.

In particular, a phase difference film in which $R_{450}/R_{550}$ is 1.00 to 1.05 can be formed using a polymer having an absorption end near a wavelength of 200 nm, such as a polyolefin-based polymer, a polyvinyl alcohol-based polymer, a cellulose acetate-based polymer, a polyvinyl chloride-based polymer, or polymethyl methacrylate-based polymer.

In addition, a phase difference film in which $R_{450}/R_{550}$ is 1.05 to 1.20 can be formed using a polymer having an absorption end on the wavelength side longer than 200 nm, such as a polycarbonate-based polymer, a polyester-based polymer, a polysulfone-based polymer, a polyethersulfone-based polymer, or a polystyrene-based polymer.

On the other hand, as the λ/4 plate which satisfies Equations (1) to (4), a plate prepared as a laminate of a λ/2 plate described below and the λ/4 plate can also be used.

The optically anisotropic layer used as the λ/2 plate or the λ/4 plate is described below. The light reflecting film of the present invention may include an optically anisotropic layer, the optically anisotropic layer can be formed from one or more types of curable compositions having a liquid crystal compound as a main component, and among the liquid crystal compounds, a liquid crystal compound having a polymerizable group is preferable, and the liquid crystal compound is preferably formed of one type of curable composition.

The λ/4 plate used in the λ/4 plate which satisfies Equations (1) to (4) may be an optically anisotropic support having a desired λ/4 function in support itself, and may have an optically anisotropic layer on a support formed of a polymer film. That is, in the case of the latter, by laminating another layer on a support, a desired λ/4 function is imparted. The configuration material of the optically anisotropic layer is not particularly limited, and the optically anisotropic layer may be a layer formed of a composition containing a liquid crystalline compound and exhibiting optical anisotropy expressed by the alignment of the molecules of the liquid crystalline compound, may be a layer having optical anisotropy expressed by aligning the polymer in the film by stretching a polymer film, or may have both layers. That is, the optically anisotropic layer can be configured of one or two or more biaxial films, and can also be configured by combining two or more uniaxial films such as combination of a C-plate and an A-plate. Of course, the optically anisotropic layer can also be configured by combining one or more biaxial films and one or more uniaxial films.

Here, the "λ/4 plate" used in the λ/4 plate which satisfies Equations (1) to (4) refers to a λ/4 plate of the optically anisotropic layer in which the in-plane retardation Re (λ) at a specific wavelength of λ nm satisfies the following equation.

$$Re(\lambda)=\lambda/4$$

The above equation may be achieved at any wavelength (for example, 550 nm) in the visible light region, and the in-plane retardation Re (550) at a wavelength of 550 nm is preferably 115 nm≤Re (550)≤155 nm, and more preferably 120 nm to 145 nm. If the retardation is within the above range, when combined with a λ/2 plate described below, the light leak of the reflected light can be reduced to the extent that the light leak is not visible, and thus, this is preferable.

The λ/2 plate used in the λ/4 plate which satisfies Equations (1) to (4) may be an optically anisotropic support having a desired λ/2 function in support itself, and may have an optically anisotropic layer on a support formed of a polymer film. That is, in the case of the latter, by laminating another layer on a support, a desired λ/2 function is imparted. The configuration material of the optically anisotropic layer is not particularly limited, and can be configured of the same configuration material as the λ/4 plate.

Here, the "λ/2 plate" used in the λ/4 plate which satisfies Equations (1) to (4) refers to a λ/2 plate of the optically anisotropic layer in which the in-plane retardation Re (λ) at a specific wavelength of λ nm satisfies the following equation.

$$Re(\lambda)=\lambda/2$$

The above equation may be achieved at any wavelength (for example, 550 nm) in the visible light region. Furthermore, in the present invention, the in-plane retardation Re1 of a λ/2 plate is set to be substantially double with respect to the in-plane retardation Re2 of a λ/4 plate. Here, "retardation is substantially double" means Re1=2×Re2±50 nm. Here, Re1=2×Re2±20 nm is more preferable, and Re1=2×Re2±10 nm is still more preferable. The above equation may be achieved at any wavelength in the visible light region, and is preferably achieved at a wavelength of 550 nm. If the retardation is within the above range, when combined with the λ/4 plate for forming a λ/4 plate used in the luminance-improving film by being laminated with the λ/2 plate, the light leak of the reflected light can be reduced to the extent that the light leak is not visible, and thus, this is preferable.

Moreover, in the liquid crystal display device of the present invention described below, lamination is preferably performed such that the direction of the linear polarization transmitted through the λ/4 plate used in the light reflecting film becomes parallel to the transmission axis direction of the polarizing plate on the backlight side.

In a case where the λ/4 plate used in the light reflecting film is a single layer, the angle between the slow axis direction of the λ/4 plate and the absorption axis direction of the polarizing plate is preferably 30° to 60°, more preferably 35° to 55°, particularly preferably 40° to 50°, and more particularly preferably 45°.

In a case where the λ/4 plate (λ/4 plate which satisfies Expressions (1) to (4)) used in the light reflecting film is a laminate of the λ/4 plate and the λ/2 plate, the angle between the slow axis direction of the whole λ/4 plate as a laminate and the absorption axis direction of the polarizing plate is 30° to 60°, preferably 35° to 550, more preferably 40° to 50°, particularly preferably 42° to 48°, and more particularly preferably 45°. Here, the angle between the slow axis direction of each of the λ/4 plate and the λ/2 used in a laminate and the absorption axis direction of the polarizing plate has the following positional relationship.

In a case where Rth at a wavelength of 550 nm of the λ/2 plate is negative, the angle between the slow axis direction of the λ/2 plate and the absorption axis direction of the polarizing plate is preferably within a range of 75°±8°, more preferably within a range of 75°±60, and still more preferably within a range of 75°±3°. Furthermore, at this time, the angle between the slow axis direction of the λ/4 plate for forming a λ/4 plate used in the luminance-improving film by being laminated with the λ/2 plate and the absorption axis direction of the polarizer layer is preferably within a range of 15°±8°, more preferably within a range of 15°±6°, and still more preferably within a range of 15°±3°. If the retardation is within the above range, the light leak of the reflected light can be reduced to the extent that the light leak is not visible, and thus, this is preferable.

In addition, in a case where Rth at a wavelength of 550 nm of the λ/2 plate is positive, the angle between the slow axis direction of the λ/2 plate and the absorption axis direction of the polarizer layer described above is preferably within a range of 15°±8°, more preferably within a range of 15°±6°, and still more preferably within a range of 15°±3°. Furthermore, at this time, the angle between the slow axis direction of the λ/4 plate for forming a λ/4 plate used in the luminance-improving film by being laminated with the λ/2 plate and the absorption axis direction of the polarizer layer described above is preferably within a range of 75°±8°, more preferably within a range of 75°±6°, and still more preferably within a range of 75°±3°. If the retardation is within the above range, the light leak of the reflected light can be reduced to the extent that the light leak is not visible, and thus, this is preferable.

In the above description, the λ/2 plate or the λ/4 plate which is a laminate structure provided with an optically anisotropic layer on a support has been described, but the present invention is not limited to this aspect, and the λ/2 plate or the λ/4 plate may be a plate obtained by laminating the λ/2 plate and the λ/4 plate on one surface of one transparent support or may be a plate obtained by laminating the λ/2 plate on one surface of one transparent support and laminating the λ/4 plate on the other surface. Furthermore, the λ/2 plate or the λ/4 plate may be formed of only a stretched polymer film (optically anisotropic layer support), or may be formed of only a liquid crystal film formed of a composition containing a liquid crystalline compound. Preferable examples of the liquid crystal film are also the same as preferable examples of the optically anisotropic layer.

(Adhesive Layer (Gluing Material))

In the present specification, "adhesion" is used in the concept including "gluing".

The light reflecting film of the present invention is preferably a film obtained by laminating a λ/4 plate and the first light reflecting layer in direct contact with each other or through an adhesive layer. In addition, in a case where the luminance-improving film of the present invention described below has a second light reflecting layer or further has the third light reflecting layer, each of the first light reflecting layer, the second light reflecting layer, and the third light reflecting layer can also be laminated in direct contact with each other or through an adhesive layer.

In the luminance-improving film of the present invention described below and the optical sheet member of the present invention described below, a polarizing plate and a reflective polarizer are preferably laminated in direct contact with each other or through an adhesive layer.

The optical sheet member of the present invention described below is preferably obtained by laminating a polarizing plate, a λ/4 plate, and a reflective polarizer in this order in direct contact with each other or through an adhesive layer.

As a method of laminating these members in direct contact with each other, a method of laminating other members on each member by coating can be exemplified.

In addition, between these members, an adhesive layer (pressure sensitive adhesive layer) may be disposed. As the pressure sensitive adhesive layer used for lamination of an optically anisotropic layer and a polarizing plate, for example, a material having a ratio (tan δ=G"/G') of the loss modulus G" to the storage modulus G' of 0.001 to 1.5, measured by a dynamic viscoelasticity measurement apparatus, is exemplified, and so-called, a pressure sensitive adhesive, a easily creeping material, and the like are included. Examples of the pressure sensitive adhesive which can be used in the present invention include an acryl-based pressure sensitive adhesive and a polyvinyl alcohol-based adhesive, but the present invention is not limited thereto.

In addition, examples of the adhesive include a boron compound aqueous solution, the curable adhesive of an epoxy compound not containing an aromatic ring in the molecule, as described in JP2004-245925A, the active energy ray-curable type adhesive having a polymerization initiator of which the molar absorption coefficient at a wavelength of 360 nm to 450 nm is 400 or greater and an ultraviolet curable compound as essential components, described in JP2008-174667A, and the active energy ray-curable type adhesive containing (a) a (meth)acryl-based compound having two or more (meth)acryloyl groups in the molecule, (b) a (meth)acryl-based compound having a hydroxyl group and only one polymerizable double bonds in the molecule, and (c) phenol ethylene oxide-modified acrylate or nonylphenol ethylene oxide-modified acrylate, in 100 parts by mass of the total amount mass of the (meth)acryl-based compound, described in JP2008-174667A.

In the optical sheet member of the present invention described below, the difference in refractive indexes between a reflective polarizer (a laminate including the first light reflecting layer, the second light reflecting layer, and the third light reflecting layer) and a layer adjacent to the polarizing plate side of the reflective polarizer is preferably 0.15 or less, more preferably 0.10 or less, and particularly preferably 0.05 or less. As the layer adjacent to the polarizing plate side of the reflective polarizer, the above-described adhesive layer can be exemplified.

The method for adjusting the refractive index of such an adhesive layer is not particularly limited, and for example, the methods described in JP1999-223712A (JP-H11-223712A) can be used. Among the methods described in JP1999-223712A (JP-H11-223712A), the following aspect is particularly preferable.

Examples of the gluing material used in the adhesive layer include resins such as a polyester-based resin, an epoxy-based resin, a polyurethane-based resin, a silicone-based resins, and an acryl-based resin. These may be used alone or in a mixture of two or more types thereof. In particular, since the acryl-based resin has excellent reliability in water resistance, heat resistance, light resistance, and the like, has good adhesiveness and transparency, and the refractive index of the acryl-based resin is easily adjusted to be suitable for a liquid crystal display, the acryl-based resin is preferable. Examples of the acryl-based pressure sensitive adhesive include acrylic acid and an ester thereof, methacrylic acid and an ester thereof, homopolymers of acrylic monomers such as acrylamide and acrylonitrile and copolymers thereof, and copolymers of at least one acrylic monomer and an aromatic vinyl monomer of vinyl acetate, maleic anhydride, or styrene. In particular, the acryl-based pressure sensitive adhesive is a copolymer formed of a main monomer such as ethylene acrylate, butyl acrylate, or 2-ethylhexyl acrylate, which expresses glutinosity, a monomer such as vinyl acetate, acrylonitrile, acrylamide, styrene, methacrylate, or methyl acrylate, which is a cohesive force component, and a functional group-containing monomer such as methacrylic acid, acrylic acid, itaconic acid, hydroxyethyl methacrylate, hydroxypropyl methacrylate, dimethylaminoethyl methacrylate, acrylamide, methylol acrylamide, glycidyl methacrylate, or maleic anhydride, which improves adhesive force or imparts a cross-linking starting point, and the copolymer preferably has Tg (glass transition point) in a range of −60° C. to −15° C. and preferably has a weight average molecular weight in a range 200,000 to 1,000,000.

In the present invention, a sheet-shaped photocurable adhesive material (described in Toagosei Group research Annual Report 11 TREND 2011 No. 14) can also be used in the adhesive layer. In the method, lamination of the optical films with each other is simple as a gluing material, the material is crosslinked and cured by ultraviolet rays (UV), and storage modulus, adhesiveness, and heat resistance are improved, and thus, the method is a bonding method suitable for the present invention.

[Luminance-Improving Film]

The luminance-improving film of the present invention is a luminance-improving film formed by laminating the light reflecting film of the present invention and the second light reflecting layer formed by fixing a cholesteric liquid crystalline phase of a rod-shaped liquid crystal compound.

With this configuration, when the luminance-improving film of the present invention is incorporated into a liquid crystal display device, the durability is excellent, and it is possible to suppress a diagonal tint change.

<Configuration>

The configuration of the luminance-improving film of the present invention will be described based on the drawings.

Figure 2:
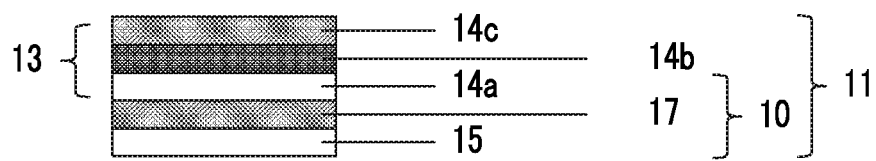
FIG. 2 is a schematic diagram showing a cross-section of one example of a luminance-improving film of the present invention, and this is an aspect in which the support, the λ/4 plate and the underlayer (alignment film) formed on the support, the first light reflecting layer, a second light reflecting layer, and a third light reflecting layer are laminated in direct contact with each other.

In FIG. 2, as one example of a luminance-improving film 11 of the present invention, an aspect in which the support 15, a λ/4 plate and underlayer (alignment film) 17 formed on the support, a reflective polarizer 13 formed of three layers of the first light reflecting layer 14a, a second light reflecting layer 14b, and a third light reflecting layer 14c are laminated in direct contact is shown. Moreover, the reflective polarizer 13 may have a layer other than the first light reflecting layer 14a, the second light reflecting layer 14b, and the third light reflecting layer 14c. For example, an aspect in which the second light reflecting layer 14b is laminated on the first light reflecting layer 14a through an adhesive layer 20 is also preferable.

The film thickness of the luminance-improving film of the present invention is preferably 3 μm to 120 μm, more preferably 5 μm to 100 μm, and still more preferably 6 μm to 90 μm.

The second light reflecting layer is a second light reflecting layer formed by fixing the cholesteric liquid crystalline phase of a rod-shaped liquid crystal compound.

The luminance-improving film of the present invention preferably further has a third light reflecting layer formed by fixing the cholesteric liquid crystalline phase of a rod-shaped liquid crystal compound or a discotic liquid crystal compound, and more preferably further has a third light reflecting layer formed by fixing the cholesteric liquid crystalline phase of a rod-shaped liquid crystal compound.

Here, for convenience of explanation, a laminate of light reflecting layers including the first light reflecting layer, the second light reflecting layer, and the third light reflecting layer is referred to as a reflective polarizer.

The luminance-improving film of the present invention is a luminance-improving film having a λ/4 plate and a reflective polarizer, and the reflective polarizer preferably includes the first light reflecting layer, the second light reflecting layer, and the third light reflecting layer from the λ/4 plate side in this order.

In the luminance-improving film of the present invention, it is preferable that, among the first light reflecting layer, the second light reflecting layer, and the third light reflecting layer, any one is a blue light reflecting layer having a peak of reflectance of which the reflecting center wavelength is 380 nm to 499 nm and the full width at half maximum is 100 nm or less, another one is a green light reflecting layer having a peak of reflectance of which the reflecting center wavelength is 500 nm to 599 nm and the full width at half maximum is 125 nm or less, and the other one is a red light reflecting layer having a peak of reflectance of which the reflecting center wavelength is 600 nm to 750 nm and the full width at half maximum is 150 nm or less.

In the luminance-improving film of the present invention, the sign of Rth (550) of the first light reflecting layer and the sign of Rth (550) of the second light reflecting layer are preferably opposite to each other (here, Rth (550) represents the retardation (unit: nm) in the thickness direction of each layer at a wavelength of 550 nm).

In addition, according to the present invention, it is possible to suppress a diagonal tint change when the luminance-improving film of the present invention is incorporated into a liquid crystal display device. Since, in LCD, the configuration of using a pair of linear polarizers disposed in a cross Nicol alignment on and beneath a liquid crystal cell is general, to convert the light from the reflective polarizer to linear polarization, it is necessary to incorporate a reflection polarizing plate having a configuration in which a λ/4 plate and a light reflecting layer formed by fixing a cholesteric liquid crystalline phase are laminated into a liquid crystal display device. However, if the reflection polarizing plate having such a configuration is incorporated into a liquid crystal display device, a change in the tint due to the optical characteristics of the cholesteric liquid crystalline phase and the λ/4 plate when viewed in an oblique direction is likely to occur.

The mechanism in which a diagonal tint change when the luminance-improving film of the present invention is incorporated into a liquid crystal display device is suppressed is described below. Hereinafter, an aspect in which the luminance-improving film of the present invention also includes a third light reflecting layer will be described as an example, but even in a case where the luminance-improving film of the present invention does not include the third light reflecting layer, it is possible to suppress the diagonal tint change when incorporated in a liquid crystal display device by the same mechanism.

Here, in the luminance-improving film of the present invention, a disposition method of a blue light reflecting layer, a green light reflecting layer, and a red light reflecting layer on the first light reflecting layer, the second light reflecting layer, and the third light reflecting layer, that is, the laminating order of a blue light reflecting layer, a green light reflecting layer, and a red light reflecting layer is not particularly limited. For the disposition method of a blue light reflecting layer, a green light reflecting layer, and a red light reflecting layer on the first light reflecting layer, the second light reflecting layer, and the third light reflecting layer, that is, the laminating order of a blue light reflecting layer, a green light reflecting layer, and a red light reflecting layer, even in any order, luminance can also be improved, and diagonal tint change can be suppressed.

When a luminance-improving film in the related art is incorporated into a liquid crystal display device, in an oblique direction, coloring (diagonal tint change) occurs due to the influence of the first light reflecting layer, the second light reflecting layer, and the third light reflecting layer. The reason for this is the following two. The first reason is that, in an oblique direction, the peak wavelength of the reflectance of the light reflecting layer formed by fixing a cholesteric liquid crystalline phase is shifted to the short wavelength side with respect to the front peak wavelength. For example, in the light reflecting layer having a reflecting center wavelength in a wavelength band of 500 nm to 599 nm, in an oblique direction, the center wavelength is shifted to a wavelength band of 400 nm to 499 nm. Another reason is that the light reflecting layer formed by fixing the cholesteric liquid crystalline phase using a rod-shaped liquid crystal acts as a negative C plate (in Rth, a positive phase difference plate) in a wavelength region where light is not reflected, and thus, in an oblique orientation, coloring occurs due to the influence of the retardation.

In the present invention, the first light reflecting layer is a light reflecting layer formed by fixing the cholesteric liquid crystalline phase, in which the discotic liquid crystal compound is aligned vertically, and Rth (550) becomes a negative value. In contrast, in the light reflecting layer formed by fixing a cholesteric liquid crystalline phase obtained by using a rod-shaped liquid crystal compound, Rth (550) is a positive value. Thus, if the light reflecting layer formed by fixing a cholesteric liquid crystalline phase using a rod-shaped liquid crystal compound is laminated on the first light reflecting layer, both Rth (550)'s are canceled, and thus, it is possible to improve the diagonal tint change when incorporated in a liquid crystal display device. Furthermore, the present inventors also found that when the first light reflecting layer, the second light reflecting layer, and the third light reflecting layer from the λ/4 plate side are laminated, great influence on the diagonal tint change is due to the influence of the first light reflecting layer and the second light reflecting layer. By the sign of Rth (550) of the first light reflecting layer and the sign of Rth (550) of the second light reflecting layer being opposite to each other, the diagonal tint change can be improved.

In a preferable aspect of the present invention, when the luminance-improving film of the present invention is incorporated into a liquid crystal display device, it is more preferable that luminance is increased. When the luminance-improving film of the present invention is incorporated into a liquid crystal display device, the mechanism in which luminance is increased is described below.

In the light reflecting layer formed by fixing the cholesteric liquid crystalline phase included in the luminance-improving film of the present invention, it is possible to reflect at least one of the right circular polarization or the left circular polarization in the wavelength band near the reflecting center wavelength thereof. In a preferable aspect of the luminance-improving film of the present invention, by among the first light reflecting layer, the second light reflecting layer, and the third light reflecting layer, any one being a blue light reflecting layer another one being a green light reflecting layer, and the other one being a red light reflecting layer, the reflective polarizer can reflect at least one of the right circular polarization or the left circular polarization for each of blue light, green light, and red light. In addition, the λ/4 plate can convert the circular polarization of light having a wavelength of λ nm into linear polarization. With this configuration, the circular polarization (for example, right circular polarization) in the first polarization state is substantially reflected by the reflective polarizer, and, on the other hand, the circular polarization (for example, left circular polarization) in the second polarization state substantially is transmitted through the reflective polarizer, and the light in the second polarization state (for example, left circular polarization) transmitted through the reflective polarizer is converted into linear polarization by the λ/4 plate. Thereafter, the light is preferably substantially transmitted through the polarizer of the polarizing plate (linear polarizer). Furthermore, the light in the first polarization state substantially reflected by the reflective polarizer in the reflecting member (also referred to as a light guide or an optical resonator) described below is randomized and recycled in its direction and the polarization state, one part as circular polarization in the first polarization state is reflected again by the reflective polarizer, the remaining part as circular polarization in the second polarization state is transmitted, and as a result, it is possible to increase the light usage ratio on the backlight side and improve the brightness of a liquid crystal display device.

The polarization state of the light emitted from the reflective polarizer, that is, the transmitted light and the reflected light of the reflective polarizer, can be measured, for example, by polarization measurement using AXOSCAN manufactured by Axometrics Inc.

Moreover, by changing not only the characteristics of the liquid crystal material of the first light reflecting layer and the second light reflecting layer but also the λ/4 plate, Re and Rth of the support, it is possible to change the balance among the transmittances of blue light, green light, and the red light.

(Reflective Polarizer)

The reflective polarizer includes the first light reflecting layer, the second light reflecting layer, and the third light reflecting layer from the λ/4 plate side in this order.

From the viewpoint of reducing the film thickness of the luminance-improving film described above, reflective polarizer preferably has only the first light reflecting layer, the second light reflecting layer, and the third light reflecting layer as the light reflecting layer formed by fixing the cholesteric liquid crystalline phase, that is, preferably does not have other light reflecting layers formed by fixing the cholesteric liquid crystalline phase.

It is preferable that, among the first light reflecting layer, the second light reflecting layer, and the third light reflecting layer, any one is a blue light reflecting layer having a peak of reflectance of which the reflecting center wavelength is 380 nm to 499 nm and the full width at half maximum is 100 nm or less, another one is a green light reflecting layer having a peak of reflectance of which the reflecting center wavelength is 500 nm to 599 nm and the full width at half maximum is 125 nm or less, and the other one is a red light reflecting layer having a peak of reflectance of which the reflecting center wavelength is 600 nm to 750 nm and the full width at half maximum is 150 nm or less.

The blue light reflecting layer preferably has a peak of reflectance which has a reflecting center wavelength in a wavelength band of 380 nm to 499 nm and a full width at half maximum of 100 nm or less.

The reflecting center wavelength of the blue light reflecting layer is preferably in a wavelength band of 430 nm to 480 nm, and more preferably in a wavelength band of 430 nm to 470 nm.

The full width at half maximum of the peak of reflectance of the blue light reflecting layer is preferably 100 nm or less, the full width at half maximum of the peak of reflectance is more preferably 90 nm or less, and the full width at half maximum of the peak of reflectance is particularly preferably 80 nm or less.

The blue light reflecting layer preferably does not have a peak of reflectance in a wavelength band of 500 nm to 750 nm. In addition, in the blue light reflecting layer, the average reflectance of 500 nm to 750 nm is preferably 5% or less.

In the blue light reflecting layer, the absolute value of Rth (550) is preferably 50 nm to 300 nm, and more preferably 80 nm to 270 nm.

In the blue light reflecting layer, the film thickness d is preferably 0.5 μm to 3.0 μm, and more preferably 1.0 μm to 2.6 μm.

The green light reflecting layer preferably has a peak of reflectance which has a reflecting center wavelength in a wavelength band of 500 nm to 599 nm and a full width at half maximum of 125 nm or less.

The reflecting center wavelength of the green light reflecting layer is preferably in a wavelength band of 520 nm to 590 nm, and more preferably in a wavelength band of 520 nm to 580 nm.

The full width at half maximum of the peak of reflectance of the green light reflecting layer is preferably 120 nm or less, the full width at half maximum of the peak of reflectance is more preferably 120 nm or less, and the full width at half maximum of the peak of reflectance is particularly preferably 110 nm or less.

The green light reflecting layer preferably does not have a peak of reflectance in a wavelength band of 380 nm to 499 nm and in a wavelength band of 600 nm to 750 nm. In addition, in the green light reflecting layer, the average reflectance of each of 380 nm to 499 nm and 600 nm to 750 nm is preferably 5% or less.

In the green light reflecting layer, the absolute value of Rth (550) is preferably 70 nm to 350 nm, and more preferably 100 nm to 330 nm.

In the green light reflecting layer, the film thickness d is preferably 0.8 μm to 3.6 μm, and more preferably equal to or greater than 1.5 μm and less than 3.3 μm.

The red light reflecting layer preferably has a peak of reflectance which has a reflecting center wavelength in a wavelength band of 600 nm to 750 nm and a full width at half maximum of 150 nm or less.

The reflecting center wavelength of the red light reflecting layer is preferably in a wavelength band of 610 nm to 690 nm, and more preferably in a wavelength band of 610 nm to 660 nm.

The full width at half maximum of the peak of reflectance of the red light reflecting layer is more preferably 150 nm or less, the full width at half maximum of the peak of reflectance is particularly preferably 130 nm or less, and the full width at half maximum of the peak of reflectance is particularly preferably 120 nm or less.

The red light reflecting layer preferably does not have a peak of reflectance in a wavelength band of 380 nm to 499 nm and in a wavelength band of 500 nm to 599 nm. In addition, in the red light reflecting layer, the average reflectance of each of 380 nm to 499 nm and 500 nm to 599 nm is preferably 5% or less.

In the red light reflecting layer, the absolute value of Rth (550) is preferably 80 nm to 400 nm, and more preferably 120 nm to 350 nm.

In the red light reflecting layer, the film thickness d is preferably 1.0 μm to 4.0 μm, and more preferably 1.5 μm to 3.5 μm.

In the first light reflecting layer, the second light reflecting layer, and the third light reflecting layer, the helical directions of the helical structures of respective cholesteric liquid crystalline phases are not particularly limited, but the helical directions of the helical structures of respective cholesteric liquid crystalline phases of the first light reflecting layer, the second light reflecting layer, and the third light reflecting layer are preferably matched. For example, it is preferable that, in the first light reflecting layer, the second light reflecting layer, and the third light reflecting layer, respective cholesteric liquid crystalline phases all have a right helical structure, and the first light reflecting layer, the second light reflecting layer, and the third light reflecting layer all reflect right circular polarization at the reflecting center wavelength. Naturally, it is also preferable that, in the first light reflecting layer, the second light reflecting layer, and the third light reflecting layer, respective cholesteric liquid crystalline phases all have a left helical structure, and the first light reflecting layer, the second light reflecting layer, and the third light reflecting layer all reflect left circular polarization at the reflecting center wavelength.

In general, the retardation Rth in the film thickness direction of a layer is defined as the following equation.

$$Rth=\{(nx+ny)/2-nz\}\times d$$

(In the above formula, nx represents the refractive index in the slow axis direction in the plane, ny represents the refractive index in the direction perpendicular to nx in the plane, and nz represents the refractive index in the direction perpendicular to nx and ny.)

In the light reflecting layer formed by fixing the cholesteric liquid crystalline phase, if using the ordinary light refractive index no and the extraordinary light refractive index ne of an original liquid crystal, the average value of the in-plane refractive index is represented by the following equation.

$$(nx+ny)/2=(no+ne)/2$$

In addition, since the refractive index in the film thickness direction becomes no, Rth of the light reflecting layer formed by fixing the cholesteric liquid crystalline phase is represented by the following equation. In the luminance-improving film of the present invention, as Rth of each of the first light reflecting layer, the second light reflecting layer, and the third light reflecting layer, the value calculated using the following equation is employed, and Rth of each of the first light reflecting layer, the second light reflecting layer, and the third light reflecting layer when the wavelength is λ nm is described as Rth (λ).

$$Rth=\{(no+ne)/2-no\}\times d=\{(ne-no)/2\}\times d$$

ne and no can be measured using an Abbe refractometer.

In addition, as a method for obtaining Rth of a cholesteric layer, a method using a polarization ellipsometry can be applied.

For example, if using the ellipsometry method as described in Jpn. J. Appl. Phys. 48 (2009) 03B021 by M. Kimura et al., the thickness of the cholesteric layer, the pitch, and the twist angle can be obtained, and the value of Rth can be obtained therefrom.

Since the light reflecting layer formed by fixing the cholesteric liquid crystalline phase using a rod-shaped cholesteric liquid crystal material as a cholesteric liquid crystal material substantially acts as a negative C plate (when two principal refractive indexes in the plane among the three principal refractive indexes of the index ellipsoid are defined as Nx and Ny, and one principal refractive index in the normal direction is defined as Nz, the condition of Nx=Ny>Nz is satisfied) with respect to light having a wavelength other than the selective reflection wavelength (the same meaning as the reflecting center wavelength), to compensate for this, it is necessary to have a function of a positive C plate (the condition of Nz>Nx=Ny> is satisfied). Hitherto, a method of providing a positive C plate newly using a material other than the cholesteric liquid crystal material to compensate for the light reflecting layer formed by fixing the cholesteric liquid crystalline phase using a rod-shaped cholesteric liquid crystal material as a cholesteric liquid crystal material or a method of imparting a function of the positive C plate to the λ/4 plate have been proposed, but it has not been that the positive C plate is provided as a part of a layer formed by fixing the cholesteric liquid crystalline phase to be used in the reflective polarizer. In addition, a method of using a part of a layer formed by fixing a cholesteric liquid crystalline phase used in a reflective polarizer contributing to circular polarization reflection as a light reflecting layer in which a discotic liquid crystal compound is used as a cholesteric liquid crystal material was not proposed.

In addition, the cholesteric liquid crystal material of the third light reflecting layer may be a rod-shaped liquid crystal compound or may be a discotic liquid crystal compound, and the rod-shaped liquid crystal compound is preferable.

At the time of superposition of the light reflecting layers formed by fixing a cholesteric liquid crystalline phase, a combination reflecting circular polarization in the same direction is preferably used. Thus, by arranging the phase state of circular polarization reflected by each layer, it is possible to prevent from becoming different polarization states in each wavelength region, and it is possible to improve the utilization efficiency of light.

The cholesteric liquid crystal material used in the second light reflecting layer and the third light reflecting layer, appropriate ones may be used, and there is no particular limitation on the material, but the following rod-shaped liquid crystal compound is preferably used.

Rod-Shaped Liquid Crystal Compound

As the rod-shaped liquid crystal compound, azomethines, azoxys, cyanobiphenyls, cyanophenyl esters, benzoic acid esters, cyclohexane carboxylic acid phenyl esters, cyanophenyl cyclohexanes, cyano-substituted phenyl pyrimidines, alkoxy-substituted phenyl pyrimidines, phenyl dioxanes, tolanes, or alkenylcyclohexyl benzonitriles are preferably used. Not only low molecular liquid crystalline molecules as described above but also polymer liquid crystalline molecules can be used.

The alignment of the rod-shaped liquid crystal compound is preferably fixed by polymerization, and as the polymerizable rod-shaped liquid crystal compound, compounds described in Makromol. Chem., vol. 190, pp. 2255 (1989), Advanced Materials 5 Volume, 107 (1993), U.S. Pat. No. 4,683,327A, U.S. Pat. No. 5,622,648A, U.S. Pat. No. 5,770,107A, WO95/22586A, WO95/24455A, WO97/00600A, WO098/23580A, WO98/52905A, JP1989-272551A (JP-H01-272551A), JP1994-16616A (JP-106-16616A), JP1995-110469A (JP-H07-110469A), JP1998-80081A (JP-H11-80081A), or JP2001-64627 can be used. As the rod-shaped liquid crystal compound, for example, those described in JP1999-513019A (JP-H11-513019A) or JP2007-279688A can be preferably used.

The luminance-improving film of the present invention preferably includes the first light reflecting layer, the second light reflecting layer, and the third light reflecting layer which are liquid crystal film formed by fixing the cholesteric liquid crystalline phase formed by polymerizing a mixture of a liquid crystal compound which is a cholesteric liquid crystal material and the like.

The luminance-improving film of the present invention preferably includes a support, and may have a liquid crystal film formed by fixing the cholesteric liquid crystalline phase formed by polymerizing a mixture of a liquid crystal compound which is a cholesteric liquid crystal material and the like on the support. Here, in the present invention, a liquid crystal film formed by fixing the cholesteric liquid crystalline phase may be formed using a λ/4 plate included in the luminance-improving film of the present invention as a support or a liquid crystal film formed by fixing the cholesteric liquid crystalline phase may be formed using the whole λ/4 plate formed on a support as a support.

On the other hand, the luminance-improving film of the present invention may not include a support at the time of film formation of the first light reflecting layer, the second light reflecting layer, and the third light reflecting layer, and for example, after the first light reflecting layer, the second light reflecting layer, and the third light reflecting layer are formed using glass or a transparent film as a support at the time of film formation of the first light reflecting layer, the second light reflecting layer, and the third light reflecting layer, and only the first light reflecting layer, the second light reflecting layer, and the third light reflecting layer are peeled off from the support at the time of film formation, the luminance-improving film of the present invention may be used. Moreover, in a case where, after the first light reflecting layer, the second light reflecting layer, and the third light reflecting layer are formed, only the first light reflecting layer, the second light reflecting layer, and the third light reflecting layer are peeled off from the support at the time of film formation, by attaching the first light reflecting layer, the second light reflecting layer, and the third light reflecting layer peeled off from the support to an adhesive layer using a film obtained by laminating a λ/4 plate and an adhesive layer (and/or gluing material), the luminance-improving film of the present invention is obtained.

In addition, by attaching a film obtained by forming a λ/4 plate and the first light reflecting layer on a support in this order and a film obtained by forming the third light reflecting layer and the second light reflecting layer on a support in this order to an adhesive layer (and/or gluing material) provided between the first light reflecting layer and the second light reflecting layer, the luminance-improving film of the present invention is preferably obtained. At this time, the support after attaching may or may not be peeled off.

By forming a film by a method such as coating with a mixture of a liquid crystal compound and the like, the first light reflecting layer, the second light reflecting layer, and the third light reflecting layer which are used in the luminance-improving film can be formed. By applying a mixture of a liquid crystal compound and the like on an alignment film to form a liquid crystal layer, an optically anisotropic element can also be produced.

Formation of a light reflecting layer formed by fixing a cholesteric liquid crystalline phase can be performed by a appropriate method such as a method of directly applying, as necessary, through polyimide or polyvinyl alcohol, or an appropriate alignment film such as an oblique vapor deposition layer of SiO, to a polarizing plate, or a method of applying, as necessary, through an alignment film, to a support which is not deteriorated at the alignment temperature of a liquid crystal formed of a transparent film. In addition, a superimposing method of a cholesteric liquid crystal layer through an alignment film can also be adopted.

Application of a mixture of a liquid crystalline compound and the like can be performed by a method of deploying a liquid product such as a solution by a solvent or a molten solution by heating by an appropriate method such as a roll coating method, a gravure printing method, or a spin coating method. The liquid crystalline molecules are fixed while maintaining the alignment state. Fixing is preferably performed by a polymerization reaction of the polymerizable group introduced into the liquid crystalline molecule.

The polymerization reaction includes a thermal polymerization reaction using a thermal polymerization initiator and a photopolymerization reaction using a photopolymerization initiator, and the photopolymerization reaction is preferable. Light irradiation for polymerization of the liquid crystalline molecule is preferably performed using ultraviolet rays. The irradiation energy is preferably 20 mJ/cm$^2$ to 50 J/cm$^2$, and more preferably 100 mJ/cm$^2$ to 800 mJ/cm$^2$. To accelerate the photopolymerization reaction, light irradiation may be performed under a heating condition. The thickness of the light reflecting layer formed by fixing a cholesteric liquid crystalline phase to be formed is preferably 0.1 μm to 100 μm, preferably 0.5 μm to 50 μm, still more preferably 1 μm to 30 μm, and most preferably 2 μm to 20 μm, from the viewpoint of selective reflectivity and prevention of alignment disorder or decrease in transmittance.

In a case where each light reflecting layer of the luminance-improving film of the present invention is formed by coating, by applying a coating solution, drying by a known method, and solidifying, each light reflecting layer is preferably formed. As the drying method, drying by heating is preferable.

One example of a manufacturing method of each light reflecting layer is a manufacturing method including at least (1) making a state of the cholesteric liquid crystalline phase by applying a polymerizable liquid crystal composition to the surface of a substrate or the like and (2) forming each light reflecting layer by irradiating the polymerizable liquid crystal composition with ultraviolet rays to proceed a curing reaction and fixing the cholesteric liquid crystalline phase.

By repeating the steps (1) and (2) on one surface of a substrate two times, a laminate of light reflecting layers formed by fixing a cholesteric liquid crystalline phase, in which the number of laminated layers increase, can be produced.

The turning direction of the cholesteric liquid crystalline phase can be adjusted by the type of a liquid crystal used or the type of a chiral agent added, and the helical pitch (that is, selective reflection wavelength) can be adjusted by the concentration of materials thereof. In addition, it is known that the wavelength of a particular region reflected by each light reflecting layer can be shifted by various factors in the manufacturing method, and the wavelength can be shifted under the conditions such as the temperature, the illuminance, and the irradiation time at the time of fixing a cholesteric liquid crystalline phase, in addition to the addition concentration of a chiral agent or the like.

The underlayer is preferably formed on the surface of a support such as a transparent thermoplastic resin film by coating. The coating method at this time is not particularly limited, and a known method can be used.

The alignment film can be provided by means such as a rubbing treatment of an organic compound (preferably, a polymer), oblique vapor deposition of an inorganic compound, and formation of a layer having a micro groove. Furthermore, an alignment film in which a alignment function occurs by applying an electric field, applying a magnetic field, or irradiating with light is also known. The alignment film is preferably formed by performing a rubbing treatment on the surface of a polymer film. The alignment film is preferably peeled off together with the support.

Depending on the polymer type used in the support, even in a case where an alignment film is not provided, by directly performing an alignment treatment (for example, rubbing treatment) on a support, it is also possible to function as an alignment film. As one example of such a support, PET can be exemplified.

In addition, in a case where a liquid crystal layer is directly laminated on a liquid crystal layer, the liquid crystal of the upper layer can be aligned by behavior of the liquid crystal layer of the underlayer as an alignment film in some cases. In such a case, even in a case where an alignment film is not provided and any special alignment treatment (for example, rubbing treatment) is not performed, the liquid crystal of the upper layer can be aligned. Details of the aspect in which the liquid crystal layer of the underlayer behaves as an alignment film has been described above as an aspect in which the underlayer of the first light reflecting layer is a λ/4 plate.

Rubbing Treatment

The alignment film or the surface of the support is preferably subjected to a rubbing treatment. In addition, the surface of optically anisotropic layer can also be subjected to a rubbing treatment, as necessary. In general, the rubbing treatment can be performed by rubbing the surface of a film of which the main component is a polymer with paper or cloth in a constant direction. A general method of the rubbing treatment is described, for example, in "Liquid Crystal Handbook" (published by MARUZEN CO., LTD., Oct. 30, 2000).

As the method of changing the rubbing density, the method described in "Liquid Crystal Handbook" (published by MARUZEN CO., LTD.) can be used. The rubbing density (L) is quantified by the following Equation (A).

$$L = Nl(1 + 2\pi rn/60v) \qquad \text{Equation (A)}$$

In Equation (A), N is the number of rubbing, l is the contact length of a rubbing roller, r is the radius of a roller, n is a rotation speed (rpm) of a roller, and v is a stage moving speed (speed per second).

To increase the rubbing density, the number of rubbing may be increased, the contact length of a rubbing roller may be lengthened, the radius of a roller may be increased, the rotational speed of a roller may be increased, or the stage moving speed may be lowered, and on the other hand, to decrease the rubbing density, the opposite operation thereof may be performed. In addition, as the conditions at the time of the rubbing treatment, it is also possible to refer to the description in JP4052558B.

In the step (1), first, a polymerizable liquid crystal composition is applied to the surface of a support or a substrate, or the surface of a light reflecting layer of an underlayer. The polymerizable liquid crystal composition is preferably prepared as a coating solution in which a material has been dissolved and/or dispersed in a solvent. Application of the coating solution can be performed by various methods such as a wire bar coating method, a extrusion coating method, a direct gravure coating method, a reverse gravure coating method, and a die coating method. In addition, it is also possible to form a coating film by ejecting the liquid crystal composition from a nozzle using an ink jet device.

Next, the polymerizable liquid crystal composition applied to the surface and became the coating film is made to be in a state of a cholesteric liquid crystalline phase. In an aspect in which the polymerizable liquid crystal composition is prepared as a coating solution including a solvent, by drying the coating film and removing the solvent, the polymerizable liquid crystal composition can be made to be in a state of a cholesteric liquid crystalline phase, in some cases. In addition, to obtain the transition temperature to a cholesteric liquid crystalline phase, as desired, the coating film may be heated. For example, by heating to the temperature of the isotropic phase and cooling to the cholesteric liquid crystalline phase transition temperature, the polymerizable liquid crystal composition can be made to be stably in a state of a cholesteric liquid crystalline phase. The liquid crystal phase transition temperature of the polymerizable liquid crystal composition is preferably within a range of 10° C. to 250° C., and more preferably within a range of 10° C. to 150° C., from the viewpoint of manufacturing suitability. If the transition temperature is lower than 10° C., a cooling step or the like of lowering the temperature to a temperature range where a liquid crystal phase is exhibited is required.

In addition, if the transition temperature is higher than 250° C., a high temperature is required to make be in an isotropic liquid state of a temperature higher than the temperature range where a liquid crystal phase is exhibited, and also from the viewpoint of waste of heat energy or deformation or deterioration of a substrate, this is disadvantageous.

Next, in the step (2), the coating film in a state of a cholesteric liquid crystalline phase is irradiated with ultraviolet rays to proceed a curing reaction. In the ultraviolet rays radiation, a light source such as a ultraviolet lamp is used. In this step, by irradiating with ultraviolet rays, a curing reaction of the polymerizable liquid crystal composition proceeds, and as a result, the cholesteric liquid crystalline phase is fixed, and a light reflecting layer is formed.

The amount of irradiation energy of ultraviolet rays is not particularly limited, and in general, about 100 mJ/cm$^2$ to 800 mJ/cm$^2$ is preferable. In addition, the application time of ultraviolet rays to the coating film is not particularly limited, and may be determined from the viewpoint of both sufficient strength and productivity of the cured film.

To accelerate the curing reaction, irradiation with ultraviolet rays may be performed under a heating condition. In addition, the temperature at the time of irradiation with ultraviolet rays is preferably maintained at a temperature range where a cholesteric liquid crystalline phase is exhibited such that the cholesteric liquid crystalline phase is not disturbed. In addition, since the oxygen concentration in the atmosphere is involved in the polymerization degree, in a case where the desired polymerization degree is not achieved in air and the film strength is not sufficient, by a method of nitrogen substitution or the like, the oxygen concentration in the atmosphere is preferably reduced. The oxygen concentration is preferably 10% or less, more preferably 7% or less, and most preferably 3% or less. The reaction ratio of the curing reaction (for example, polymerization reaction) which proceeds by irradiation with ultraviolet rays is preferably 70% or greater, more preferably 80% or greater, and still more preferably 90% or greater, from the viewpoint of keeping mechanical strength of a layer or preventing the unreacted substances from flowing out from a layer. To improve the reaction ratio, a method of increasing the irradiation amount of ultraviolet rays applied or a polymerization in a nitrogen atmosphere or under a heating condition is effective. In addition, after polymerization, a method of further promoting the reaction by a thermal polymerization reaction by keeping a state of a temperature higher than the polymerization temperature or a method of irradiating again with ultraviolet rays (here, irradiation is performed under the condition that satisfies the conditions of the present invention) can also be used. Measurement of the reaction ratio can be performed by comparing the absorption intensity of the infrared vibrational spectrum of the reactive group (for example, a polymerizable group) before and after the reaction progress.

In the above step, the cholesteric liquid crystalline phase is fixed, and each light reflecting layer is formed. Here, the state in which the liquid crystal phase is "fixed" is an aspect in which the state in which the alignment of the liquid crystal compound which has become a cholesteric liquid crystalline phase is maintained is most typical and preferable. Furthermore, specifically, the state means a state in which, in a temperature range of typically 0° C. to 50° C., and in more severe conditions, a temperature range of −30° C. to 70° C., this layer does not have fluidity, and a change in the alignment form is not caused by the external field or the external force, and the fixed alignment form can be stably continuously maintained. In the present invention, the alignment state of the cholesteric liquid crystalline phase is preferably fixed by a curing reaction which proceeds due to irradiation with ultraviolet rays.

Moreover, in the present invention, it is sufficient if the optical properties of the cholesteric liquid crystalline phase are maintained in the layer, and finally, it is no longer necessary that the liquid crystal composition of each light reflecting layer exhibits to show liquid crystallinity. For example, the liquid crystal composition may lose liquid crystallinity by increasing the molecular weight by a curing reaction.

<Optical Sheet Member>

The luminance-improving film of the present invention can be used as an optical sheet member.

The above-described optical sheet member is preferably an optical sheet member which has the luminance-improving film of the present invention and a polarizing plate including a polarizer, has the angle between the slow axis of the λ/4 plate and the absorption axis of the polarizer of 30° to 60°, and is obtained by laminating the polarizing plate, the λ/4 plate, and the reflective polarizer in this order in direct contact with each other or through an adhesive layer.

Figure 4:
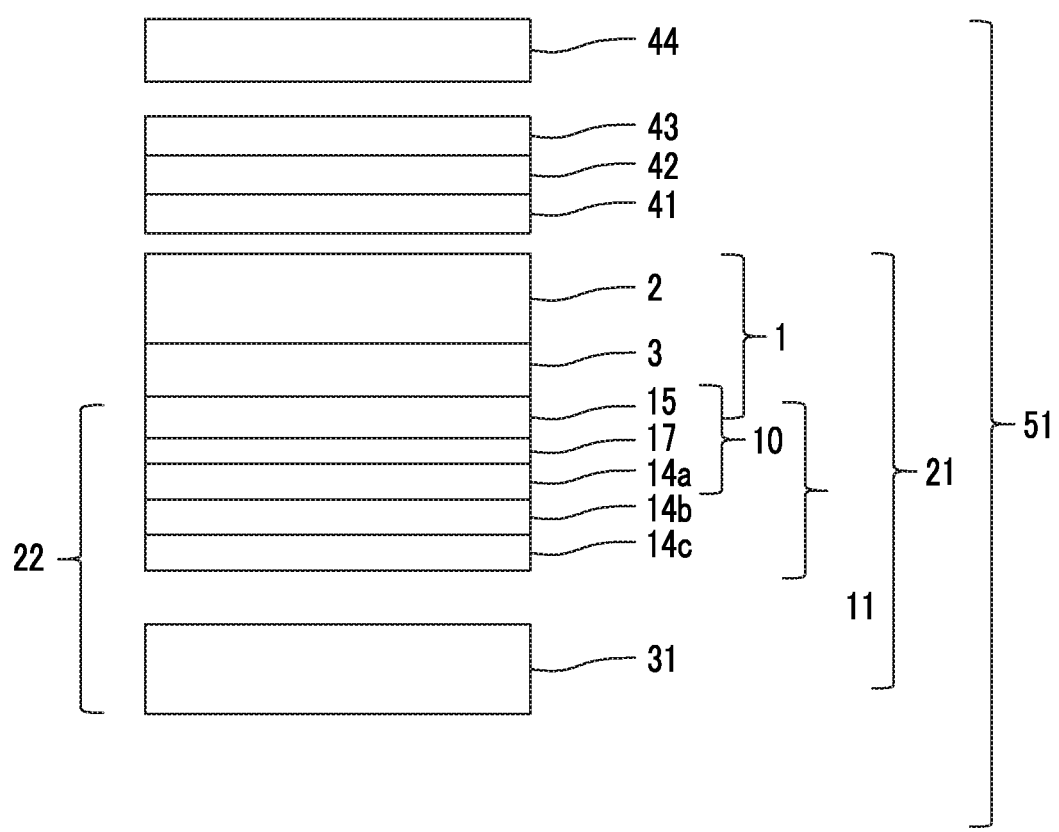
FIG. 4 is a schematic diagram showing a cross-section of one example of a liquid crystal display device of the present invention.

In FIG. 4, as one part of the liquid crystal display device of the present invention, a schematic diagram of an optical sheet member is shown together with a backlight unit 31. An optical sheet member 21 includes the luminance-improving film 11 and a polarizing plate 1 including a polarizer 3. The polarizing plate 1 and the luminance-improving film 11 may be laminated through the adhesive layer 20 (refer to FIG. 4), or may be disposed separately.

<Polarizing Plate>

Next, the polarizing plate will be described.

Usually, like the polarizing plate used in a liquid crystal display device, the polarizer included in the optical sheet member is preferably formed of a polarizer and two polarizing plate protective film (hereinafter, also referred to as protective film) disposed on both sides thereof. In the present invention, of the two protective films, as a protective film disposed on the liquid crystal cell side, a phase difference film is preferably used.

In FIG. 4, the polarizing plate 1 includes the polarizer 3. The polarizing plate 1 preferably includes a polarizing plate protective film 2 which may be a phase difference film the surface on the viewing side of the polarizer 3. The polarizing plate 1 may include the polarizing plate protective film 3 on the surface of the backlight unit 31 side of the polarizer 3 (refer to FIG. 4) or may not include the polarizing plate protective film 3 (not shown).

(Polarizer)

In the optical sheet member, the angle between the slow axis of the λ/4 plate and the absorption axis of the polarizer is preferably 30° to 60°. A more preferable aspect or a preferable aspect in a case where the λ/4 plate is a laminate of a λ/2 plate and a λ/4 plate is described in the description of the above-described λ/4 plate.

As the polarizer, a polarizer in which iodine is adsorbed on a polymer film and aligned is preferably used. The polymer film is not particularly limited, and various films can be used. Examples thereof include a polyvinyl alcohol-based film, a polyethylene terephthalate-based film, an ethylene-vinyl acetate copolymer-based film, partially saponified films thereof, a hydrophilic polymer film such as a cellulose-based film, and a polyene-based aligned film such as a dehydration treatment product of polyvinyl alcohol or a dehydrochloric acid treatment product of polyvinyl chloride.

Among these, the polyvinyl alcohol-based film which has excellent stainability by iodine as a polarizer is preferably used.

As the material of the polyvinyl alcohol-based film, polyvinyl alcohol or a derivative thereof is used. Examples of the derivative of polyvinyl alcohol include polyvinyl formal and polyvinyl acetal, and also include olefins such as ethylene and propylene, unsaturated carboxylic acids such as acrylic acid, methacrylic acid, and crotonic acid and alkyl esters thereof, and those modified with acrylamide.

The polymerization degree of a polymer which is a material of a polymer film is generally 500 to 10,000, preferably within a range of 1,000 to 6,000, and more preferably within a range of 1,400 to 4,000. Furthermore, in the case of a saponified film, the saponification degree thereof is preferably 75 mol % or greater, more preferably 98 mol % or greater, and more preferably within a range of 98.3 mol % to 99.8 mol %, for example, from the viewpoint of solubility in water.

The polymer film (unstretched film) is preferably subjected to at least a uniaxial stretching treatment and an iodine staining treatment according to a commonly used method in the related art. Furthermore, a boric acid treatment or a cleaning treatment can be performed. In addition, the polymer film (stretched film) subjected to the above treatments is subjected to a drying treatment according to a commonly used method in the related art, and the resulting film is used as a polarizer.

The thickness of the polarizer is not particularly limited, and is usually 5 μm to 80 μm, preferably 5 μm to 50 μm, and more preferably 5 μm to 25 μm.

As the optical characteristics of the polarizer, the single body transmittance when a polarizer single body is measured is preferably 43% or greater, and more preferably within a range of 43.3% to 45.0%. In addition, the orthogonal transmittance measured in a case where the two polarizers are prepared, and the absorption axes of the two polarizers are superimposed so as to be 90° to each other is preferably smaller, and practically, is preferably 0.00% to 0.050%, and more preferably 0.030% or less. The polarization degree, practically, is preferably 99.90% to 100%, and particularly 99.93% to 100%. Even when measured as a polarizing plate, it is preferable that substantially the same optical characteristics as the above are obtained.

(Polarizing Plate Protective Film)

The optical sheet member may have a polarizing plate protective film on the side opposite to the liquid crystal cell of the polarizer, or may not have a polarizing plate protective film. In the case of not having a polarizing plate protective film on the side opposite to the liquid crystal cell of the polarizer, a reflective polarizer described below may be provided to the polarizer directly or through an adhesive.

As the protective film disposed on the side opposite to the liquid crystal cell among the protective films, a thermoplastic resin which is excellent in transparency, mechanical strength, thermal stability, moisture blocking properties, and isotropy is used. Specific examples of the thermoplastic resin include cellulose resins such as triacetyl cellulose, a polyester resin, a polyether sulfone resin, a polysulfone resin, a polycarbonate resin, a polyamide resin, a polyimide resin, a polyolefin resin, a (meth)acrylic resin, a cyclic polyolefin resin (norbornene-based resin), a polyarylate resin, a polystyrene resin, a polyvinyl alcohol resin, and mixtures thereof.

The cellulose resin is an ester of cellulose and a fatty acid. Specific examples of the cellulose ester-based resin include triacetyl cellulose, diacetyl cellulose, tripropyl cellulose, and dipropyl cellulose. Among these, triacetyl cellulose is particularly preferable. A number of products of triacetyl cellulose are commercially available, and thus, triacetyl cellulose is advantageous from the viewpoint of availability and cost. Examples of the commercially available products of triacetyl cellulose include trade names "UV-50", "UV-80", "SH-80", "TD-80U", "TD-TAC", and "UZ-TAC" manufactured by Fujifilm Corporation, and "KC series" manufactured by Konica Minolta, Inc.

A specific example of the cyclic polyolefin resin is preferably norbornene-based resins. The cyclic olefin-based resin is a collective term for a resin obtained by polymerizing cyclic olefin as a polymerization unit, and examples thereof include the resins described in JP1989-240517A (JP-H01-240517A), JP1991-14882A (JP-H03-14882A), or JP1991-122137A (JP-H03-122137A). Specific examples thereof include a ring-opened (co)polymer of cyclic olefin, an addition polymer of cyclic olefin, copolymers of cyclic olefin and α-olefins such as ethylene and propylene and copolymers thereof (representatively, random copolymer), graft polymers obtained by modifying these with an unsaturated carboxylic acid or derivatives thereof, and hydrides thereof. Specific examples of the cyclic olefin include norbornene-based monomers.

As the cyclic polyolefin resin, various products are commercially available. Specific examples include trade names "ZEONEX" and "ZEONOR" manufactured by Nippon Zeon Corp., trade name "ARTON" manufactured by JSR Corporation, trade name "TOPAS" manufactured by TICONA Co., Ltd., and trade name "APEL" manufactured by Mitsui Chemicals, Inc.

As a (meth)acryl-based resin, any appropriate (meth) acryl-based resin can be employed within a range not impairing the effects of the present invention. Examples thereof include poly(meth)acrylic acid esters such as polymethyl methacrylate, a methyl methacrylate-(meth)acrylic acid copolymer, a methyl methacrylate-(meth)acrylic acid ester copolymer, methyl methacrylate-acrylic acid ester-(meth)acrylic acid copolymer, a (meth)acrylate-styrene copolymer (MS resin and the like), and a polymer having an alicyclic hydrocarbon group (for example, a methyl methacrylate-cyclohexyl methacrylate copolymer and a methyl methacrylate-(meth)norbornyl acrylate copolymer). Preferably, poly C1-6 alkyl (meth)acrylates such as polymethyl (meth)acrylate are exemplified. More preferably, methyl methacrylate-based resins which have methyl methacrylate as a main component (50% by mass to 100% by mess, preferably 70% by mass to 100% by mass) are exemplified.

Specific examples of the (meth)acryl-based resin include ACRYPET VH and ACRYPET VRL20A manufactured by Mitsubishi Rayon Co., Ltd., the (meth)acryl-based resins having a ring structure in the molecule described in JP2004-70296A, and high Tg (meth)acryl-based resins obtained by intramolecular crosslinking or an intramolecular cyclization reaction.

As the (meth)acryl-based resin, a (meth)acryl-based resin having a lactone ring structure can also be used. This is because a (meth)acryl-based resin has high heat resistance, high transparency, and high mechanical strength by biaxially stretching.

The thickness of the protective film may be appropriately set, and is generally 1 μm to 80 μm from the viewpoint of strength or workability such as handling, or thin film properties. In particular, the thickness is preferably 1 μm to 60 μm, and more preferably 5 μm to 40 μm. A case where the thickness of the protective film is 5 μm to 25 μm is particularly preferable.

Re (λ) represents the in-plane retardation at a wavelength λ and Rth (λ) represents the retardation in the thickness direction. Re (λ) is measured by applying light having a wavelength λ nm in the film normal direction, in KOBRA 21ADH or WR (manufactured by Oji Scientific Instruments). By manually replacing the wavelength selective filter or converting the measured value using program or the like in selecting a measurement wavelength λ nm, it is possible to measure. In a case where the film to be measured is represented by a uniaxial or biaxial refractive index ellipsoid, Rth (λ) is calculated by the following method. Moreover, this measurement method is partly used in measurement of the average tilt angle on the alignment film side of a discotic liquid crystal molecule in an optically anisotropic layer described below and the average tilt angle of the opposite side.

Light having a wavelength of λ nm is incident from each inclined direction at 10 degrees step to the one side 50° from the normal direction to the normal direction of the film using the in-plane slow axis (determined by KOBRA 21ADH or WR) as the inclined axis (rotation axis) (in a case where there is no slow axis, an arbitrary direction in the film plane is used as the rotation axis), Re (λ) is measured at six points in total, and Rth (λ) is calculated based on the measured retardation value, the assumed value of the average refractive index, and the input film thickness value by KOBRA 21ADH or WR. In the above description, using the in-plane slow axis from the normal direction as the rotation axis, in the case of a film having a direction in which the value of retardation becomes 0 at any inclined angle, the sign of the retardation value at the inclined angle larger than the inclined angle is changed to a negative sign, and is calculated by KOBRA 21ADH or WR. Moreover, using the slow axis as the inclined axis (rotation axis) (in a case where there is no slow axis, an arbitrary direction in the film plane is used as the rotation axis), the retardation values from arbitrary inclined two directions are measured, and Rth can also be calculated based on the values, the assumed value of the average refractive index, and the input film thickness value according to Equations (A) and (B).

input film thickness value by KOBRA 21ADH or WR. In addition, in the above measurement, as the assumed value of the average refractive index, the values described in Polymer Handbook (JOHN WILEY & SONS, INC) or the values described in the catalogs of various optical films can be used. In the value of the average refractive index is unknown, the value can be obtained by measuring using an Abbe refractometer. The values of the average refractive indexes of major optical films are as follows: cellulose acylate (1.48), cycloolefin polymer (1.52), polycarbonate (1.59), polymethyl methacrylate (1.49), and polystyrene (1.59). By inputting the assumed value of the average refractive index and the film thickness, nx, ny, and nz is calculated by KOBRA 21ADH or WR. Nz=(nx−nz)/(nx−ny) is calculated from the calculated nx, ny, and nz.

In the present specification, "visible light" refers to light having a wavelength band of 380 nm to 780 nm. In the present specification, in a case where measurement wavelength is not specifically described, the measurement wavelength is 550 nm.

In addition, in the present specification, an angle (for example, an angle such as "90°") and a relationship thereof (for example, "orthogonal", "parallel", and "intersect at 45°") is intended to include an error range acceptable in the technical field to which the invention pertains. For example, the angle means an angle within a range of an exact angle±less than 10°, and the error of an exact angle is preferably 5° or less, and more preferably 3° or less.

In the present specification, "slow axis" of a phase difference film means a direction in which the refractive index becomes the largest.

In the present specification, a numerical value, a numerical value range, and qualitative expression (for example, expressions "equivalent" or "equal") indicating optical characteristics of each member such as a phase difference region, a phase difference film, and a liquid crystal layer are intended to be interpreted as indicating a numerical value, a numerical value range, and properties including an error generally acceptable for members used in a liquid crystal display device.

$$Re(\theta) = \left[nx - \frac{ny \times nx}{\sqrt{\left\{ny \sin\left(\sin^{-1}\left(\frac{\sin(-\theta)}{nx}\right)\right)\right\}^2 + \left\{nz \cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}} \qquad \text{Equation A}$$

Re (θ) represents a retardation value in the angle θ-inclined direction from the normal direction. In addition, nx in Equation (A) represents the refractive index in the slow axis direction in the plane, ny represents the refractive index in the direction orthogonal to nx in the plane, and nz represents the refractive index in the direction orthogonal to nx and ny. d is a film thickness.

$Rth=((nx+ny)/2-nz)\times d$      Equation (B)

In a case where the film to be measured cannot be represented by a uniaxial or biaxial refractive index ellipsoid, that is, the film is a film not having a so-called optic axis, Rth (λ) is calculated by the following method. Light having a wavelength of λ nm is incident from each inclined direction at 10 degrees step from −50° to +50° to the normal direction of the film using the in-plane slow axis (determined by KOBRA 21ADH or WR) as the inclined axis (rotation axis), Re (λ) is measured at eleven points, and Rth (λ) is calculated based on the measured retardation value, the assumed value of the average refractive index, and the In addition, "front" in the present specification means the normal direction to the display surface, and "front contrast (CR)" refers to a contrast calculated from the white brightness and the black brightness measured in the normal direction of the display surface.

[Liquid Crystal Display Device]

The liquid crystal display device of the present invention is a liquid crystal display device using the luminance-improving film of the present invention.

It is preferable that the liquid crystal display device of the present invention has the luminance-improving film of the present invention or the optical sheet member of the present invention and a backlight unit in this order; the backlight unit emits a light source emitting blue light having an emission center wavelength in a wavelength band of 430 nm to 480 nm, green light having an emission center wavelength in a wavelength band of 500 nm to 600 nm, and red light having at least a portion of the peak of the emission intensity in a wavelength band of 600 nm to 700 nm; and the liquid crystal display device of the present invention has a reflecting member in which the backlight unit converts or reflects the polarization state of the light reflected by the luminance-improving film or the optical sheet member emitted from the light source at the rear portion of the light source.

In addition, in the liquid crystal display device of the present invention, the full width at half maximum of each of the blue light and the green light is preferably 100 nm or less. In addition, it is preferable that, in the liquid crystal display device of the present invention, the red light has an emission center wavelength in a wavelength band of 600 nm to 700 nm, and the full width at half maximum of the red light is 100 nm or less. In such an aspect which is a part of the liquid crystal display device of the present invention, while improving the color reproducibility by combining with a RGB (R represents Red, G represents Green, and B represents Blue) narrow band backlight, it is possible to achieve a sufficient luminance-improving performance by the luminance-improving film or the optical sheet member of the present invention having a simple configuration of the light reflecting layer 3 layer formed by fixing a cholesteric liquid crystalline phase which is each light reflecting layer of RGB (the light reflecting layer of R represents a red light reflecting layer, the light reflecting layer of G represents a green light reflecting layer, and the light reflecting layer of B represents a blue light reflecting layer) and the λ/4.

As a result of studies by the present inventors, the difference (reflecting center wavelength–emission center wavelength) between an emission center wavelength (wavelength giving the peak of emission intensity) of blue light, green light, and red light of the backlight unit and the reflecting center wavelength (wavelength giving the peak of reflectance) of each color in the luminance-improving film, for blue light and green light, is preferably within ±50 nm, and more preferably within ±25 nm.

On the other hand, the difference for red light is preferably 0 nm to 75 nm from the viewpoint of suppressing the diagonal tint change, more preferably 0 nm to 50 nm, and still more preferably 10 nm to 30 nm. The emission center wavelength of the red light of the backlight unit and the reflecting center wavelength of the red light reflecting layer more preferably satisfy the following Expression (λ).

$$10 \text{ nm} < \text{emission center wavelength of red light of backlight unit} - \text{reflecting center wavelength of red light reflecting layer} < 30 \text{ nm} \quad \text{Expression (}\lambda\text{)}$$

In the present invention, a layer (for example, a film having high retardation such as a stretched PET film) disturbing the polarization state of the light reflected from the light reflecting layer is preferably placed between the third light reflecting layer of the luminance-improving film and the backlight unit from the viewpoint of improving the luminance. The relationship between the average refractive index of the layer disturbing the polarization state of the light reflected from the light reflecting layer and the average refractive index of the third light reflecting layer still more preferably satisfies the following expression.

$$0 < \text{average refractive index of layer disturbing polarization state of light reflected from light reflecting layer} - \text{average refractive index of third light reflecting layer} < 0.2$$

<Backlight Unit>

The configuration of the backlight unit may be an edge light mode having a light guide plate, a reflecting plate, or the like as a configuration member, or may be a direct backlight mode.

The liquid crystal display device of the present invention preferably has a reflecting member in which the backlight unit converts or reflects the polarization state of the light reflected by the luminance-improving film or the optical sheet member emitted from the light source at the rear portion of the light source. The reflecting member is not particularly limited, and known reflecting members can be used. The reflecting members described in JP3416302B, JP3363565B, JP4091978B, or JP3448626B are exemplified, and the contents thereof are incorporated in the present invention.

In the present invention, the backlight unit of the light source preferably has a light source having a blue light emitting diode emitting blue light and a fluorescent material emitting green light and red light when blue light of the blue light emitting diode is incident, or a light source having a UV emitting diode emitting UV light having an emission center wavelength in a wavelength band equal to or longer than 300 nm and less than 430 nm and a fluorescent material emitting blue light, green light, and red light when UV light of the UV emitting diode is incident. The light source of the backlight unit more preferably has blue light emitting diode emitting blue light and a fluorescent material emitting green light and red light when blue light of the blue light emitting diode is incident.

As the light source of the backlight unit, the above-described blue light emitting diode emitting blue light, green light emitting diode emitting green light, and red light emitting diode emitting red light may be used.

In addition, the light source of the backlight unit may be light source (pseudo white LED) having a blue light emitting diode emitting blue light and a fluorescent material (yellow phosphor or the like) emitting light having a wide peak over green light to red light when blue light is incident. In this case, the backlight unit emits blue light having an emission center wavelength in a wavelength band of 430 nm to 480 nm, green light having an emission center wavelength in a wavelength band of 500 nm to 600 nm, and red light having at least a part of the peak of the emission intensity in a wavelength band of 600 nm to 700 nm.

As the fluorescent material, there are yttrium-aluminum-garnet-based yellow phosphors, terbium-aluminum-garnet-based yellow phosphors, and the like. The fluorescence wavelength of the fluorescent material can be controlled by changing the particle size of the phosphor.

In the liquid crystal display device of the present invention, a blue light emitting diode emitting blue light and a fluorescent material emitting green light and red light when blue light of the blue light emitting diode is incident are quantum dot members (for example, quantum dot sheet or bar shaped quantum dot bar), and a quantum dot member is preferably disposed between an optical sheet member and a blue light source. The quantum dot member is not particularly limited, and known quantum dot members can be used. The quantum dot members described in JP2012-169271A or SID'12 DIGEST p. 895 are exemplified, and the contents thereof are incorporated in the present invention. In addition, as the quantum dot member, Quantum Dot Enhancement Film (QDEF, manufacture by NanoSys Co., Ltd.) can be used.

The emission center wavelength of the blue light emitted from the backlight unit is preferably within a wavelength band of 440 nm to 470 nm.

The emission center wavelength of the green light emitted from the backlight unit is preferably within a wavelength band of 520 nm to 570 nm.

The emission center wavelength of the red light emitted from the backlight unit is preferably within a wavelength band of 600 nm to 640 nm.

The full width at half maximum of each of the blue light, the green light, and the red light is preferably 100 nm or less.

The blue light emitted from the backlight unit preferably has a peak of light emission intensity of which the full width at half maximum is 80 nm or less, more preferably has a peak of light emission intensity of which the full width at half maximum is 70 nm or less, and particularly preferably has a peak of light emission intensity of which the full width at half maximum is 30 nm or less.

The green light emitted from the backlight unit preferably has a peak of light emission intensity of which the full width at half maximum is 80 nm or less, more preferably has a peak of light emission intensity of which the full width at half maximum is 70 nm or less, and particularly preferably has a peak of light emission intensity of which the full width at half maximum is 60 nm or less.

The red light emitted from the backlight unit preferably has a peak of light emission intensity of which the full width at half maximum is 80 nm or less, more preferably has a peak of light emission intensity of which the full width at half maximum is 70 nm or less, and particularly preferably has a peak of light emission intensity of which the full width at half maximum is 60 nm or less.

In the liquid crystal display device of the present invention, the backlight unit preferably has a wavelength selective filter for blue which selectively transmits light having a wavelength shorter than 460 nm of blue light.

In the liquid crystal display device of the present invention, the backlight unit preferably has a wavelength selective filter for red which selectively transmits light having a wavelength shorter than 630 nm of red light.

The wavelength selective filter for blue or the wavelength selective filter for red are not particularly limited, and known wavelength selective filters can be used. The wavelength selective filters described in JP2008-52067A are exemplified, and the content thereof is incorporated in the present invention.

In addition, the backlight unit preferably also has a known diffusion plate or a diffusion sheet, a prism sheet (for example, BEF or the like), and a light guide. Other members described above are described in JP3416302B, JP3363565B, JP4091978B, or JP3448626B are exemplified, and the contents thereof are incorporated in the present invention.

[Luminance-Improving Film-Attached Backlight Unit]

The luminance-improving film-attached backlight unit of the present invention includes the luminance-improving film of the present invention and a backlight unit.

In FIG. 6, the configuration of the luminance-improving film-attached backlight unit of the present invention is shown. A luminance-improving film-attached backlight unit 22 of the present invention includes the luminance-improving film 11 of the present invention and the backlight unit 31. The luminance-improving film 11 and the backlight unit 31 of the present invention may be in direct contact, may be in contact through an adhesive layer, or may be separately disposed.

<Display Panel>

One example of a preferable display panel of a liquid crystal display device is a liquid crystal panel of the transmissive mode, and the liquid crystal panel has a pair of polarizers and a liquid crystal cell therebetween. Between each polarizer and the liquid crystal cell, typically, a phase difference film for viewing angle compensation is disposed. The configuration of the liquid crystal cell is not particularly limited, and a liquid crystal cell having a typical configuration can be employed. For example, the liquid crystal cell includes a pair of substrates disposed to oppose each other and a liquid crystal layer held between the pair of substrates, and, as necessary, may include a color filter layer. The drive mode of the liquid crystal cell is not particularly limited, and various modes such as twisted nematic (TN), super twisted nematic (STN), vertical alignment (VA), in-plane switching (IPS), and an optically compensated bend cell (OCB) can be used.

One embodiment of the liquid crystal display device has a liquid crystal cell in which a liquid crystal layer is held between the opposing substrates of which at least one has been provided with an electrode, and this liquid crystal cell is preferably configured to be disposed between two polarizing plates. The liquid crystal display device has a liquid crystal cell in which a liquid crystal is sealed between the upper and lower substrates, and displays an image by changing the alignment state of the liquid crystal by applying a voltage. Furthermore, the liquid crystal display device has an attendant functional layer such as a polarizing plate protective film, an optical compensation member for performing optical compensation, or an adhesive layer, as necessary. In addition, the liquid crystal display device of the present invention may include other members. For example, a surface layer such as a forward scattering layer, a primer layer, an antistatic layer, or an undercoat layer may be disposed together with (or instead of) a color filter substrate, a thin layer transistor substrate, a lens film, a diffusion sheet, a hard coat layer, an antireflection layer, a low reflection layer, and an antiglare layer.

In FIG. 4, one example of a configuration of the liquid crystal display device of the present invention is shown. In FIG. 4, the liquid crystal display device 51 is formed by laminating the backlight unit 31, the optical sheet member 21 of the present invention (laminate of a reflective polarizer 11 and a backlight side polarizing plate 1), a thin layer transistor substrate 41, a liquid crystal cell 42, a color filter substrate 43, and a display side polarizing plate 44 in this order.

Moreover, the configuration of the optical sheet member 21 of the present invention has been described in FIG. 4 as a representative example, but the liquid crystal display device of the present invention is not limited to such an example.

<Attaching Method of Optical Sheet Member to Liquid Crystal Display Device>

As a method of attaching the luminance-improving film of the present invention and the optical sheet member of the present invention, a known method can be used. In addition, a roll-to-panel manufacturing method can also be used, and is preferable from the viewpoint of improving the productivity and the yield. The roll-to-panel manufacturing method is described in JP2011-48381A, JP2009-175653A, JP4628488B, JP4729647, WO2012/014602A, or WO2012/014571A, but the present invention is not limited thereto.

EXAMPLES

Hereinafter, characteristics of the present invention will be more specifically described with reference to Examples and Comparative Examples. The materials, amounts used, proportions, treatment contents, treatment procedures, and the like indicated in the Examples below may be changed as appropriate without departing from the gist of the present invention. Therefore, the scope of the present invention is not to be interpreted as limiting to the specific examples shown below.

Example 1

<Formation of Support>
(Production of Core Layer Cellulose Acylate Dope)
The following composition was put into a mixing tank and stirred to dissolve respective components, whereby a cellulose acetate solution was prepared.
Composition of Core Layer Cellulose Acylate Dope:

| | |
|---|---|
| Cellulose acetate having an acetylation degree of 2.88 | 100 parts by mass |
| Plasticizer 2 (structure described below) | 15 parts by mass |
| Methylene chloride (first solvent) | 426 parts by mass |
| Methanol (second solvent) | 64 parts by mass |

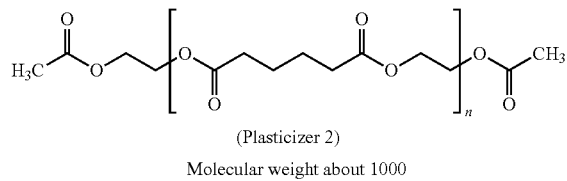

(Plasticizer 2)

Molecular weight about 1000

(Production of Outer Layer Cellulose Acylate Dope)
10 parts by mass of the following matting agent solution was added to 90 parts by mass of the above core layer cellulose acylate dope, whereby an outer layer cellulose acetate solution was prepared.
Composition of a Matting Agent Solution:

| | |
|---|---|
| Silica particles having an average particle diameter of 20 nm (AEROSIL R972, manufactured by Nippon Aerosil Co., Ltd.) | 2 parts by mass |
| Methylene chloride (first solvent) | 76 parts by mass |
| Methanol (second solvent) | 11 parts by mass |
| Core layer cellulose acylate dope | 1 part by mass |

(Production of Cellulose Acylate Film)
Three layers, that is, a core layer cellulose acylate dope and outer layer cellulose acylate dopes on both sides were cast from a casting port onto a drum at 20° C. at the same time. The resulting product was stripped in a state in which the solvent content is approximately 20% by mass, both ends in the width direction of the film were fixed with a tenter clip, and in a state in which the residual solvent is 3% to 15%, the film was stretched 1.1 times in the transverse direction and dried. Thereafter, by transporting between rolls in a heat treatment device, a cellulose acylate film having a thickness of 40 μm was produced, and this was used as a cellulose acylate film 1. Re and Rth of the film of 550 nm were 0.9 nm and −4 nm, respectively.

<Formation of λ/4 Plate>
First, POVAL PVA-103 manufactured by KURARAY Co., Ltd. was dissolved in water, then, a solution obtained by adjusting the concentration such that the dried film thickness became 0.5 μm was applied to the cellulose acylate film 1 produced above, and then, the resulting product was heated at 100° C. for 5 minutes. Then, this surface was subjected to a rubbing treatment, whereby an alignment film was formed.

Subsequently, the concentration of the solute having the following compositional ratio was adjusted such that the dried film thickness became 1.0 μm, and the solute was dissolved in MEK, whereby a coating solution was prepared. The above-described alignment film was bar-coated with this coating solution, then, evaporation of the solvent was performed by keeping the resulting product at 85° C. for 2 minutes, and the resulting product was subjected to heat-aging at 80° C. for 1 minute, whereby a uniform alignment state was obtained.

Thereafter, this coating film was kept at 75° C., and ultraviolet rays irradiation was performed on this coating film using a high pressure mercury lamp in a nitrogen atmosphere, whereby a λ/4 plate was formed.

(Solute Composition of Coating Solution for Formation of λ/4 Plate)

| | |
|---|---|
| Discotic liquid crystal compound 1 described below | 100 parts by mass |
| Alignment assistant 1 described below | 0.9 parts by mass |
| Alignment assistant 2 described below | 0.08 parts by mass |
| Polymer type surfactant 1 described below | 0.3 parts by mass |
| Polymerization initiator 1 described below | 3 parts by mass |
| Polymerizable monomer described below | 10 parts by mass |

Discotic liquid crystal compound 1

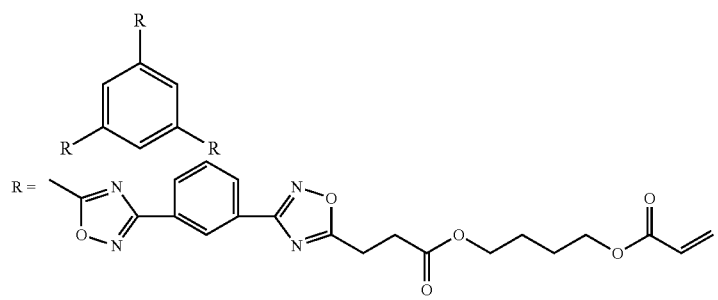

Alignment Assistant 1
(in the following structure, a mixture of two types of compounds in which the substitution position of a methyl group in the benzene ring of trimethyl substitution is different. The mixing ratio of two types of compounds 50:50 (mass ratio))

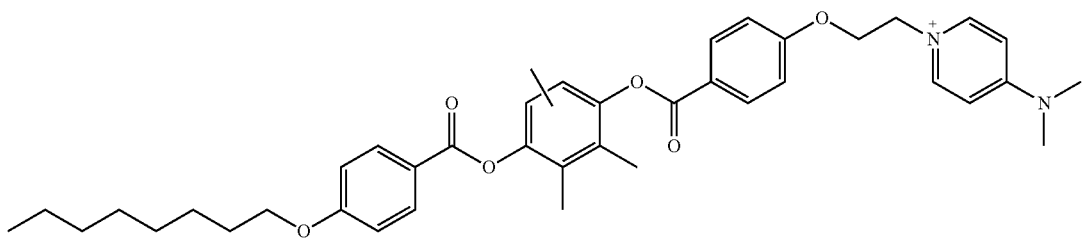

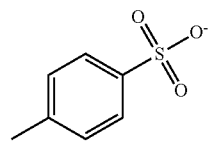

Alignment Assistant 2
(in the following structure, a mixture of two types of compounds in which the substitution position of a methyl group in the benzene ring of trimethyl substitution is different. The mixing ratio of two types of compounds 50:50 (mass ratio))

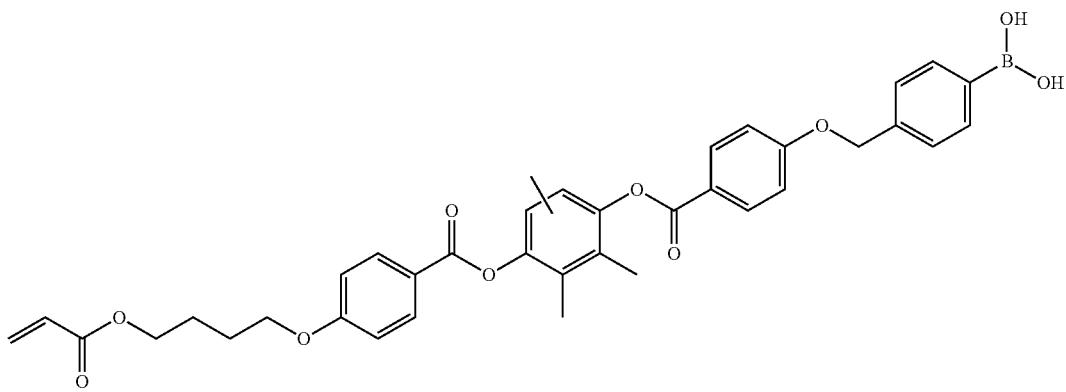

Polymer type surfactant 1

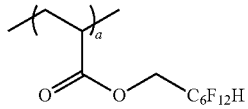

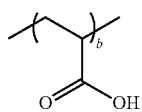

(Weight average molecular weight 8000)
a/b = 98/2

In the above structural formula, a/b=98/2 shows that a is 98% by mass and b is 2% by mass.

Polymerization initiator 1

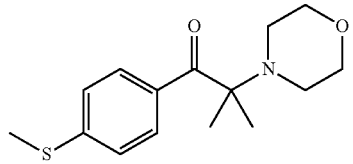

Polymerizable monomer

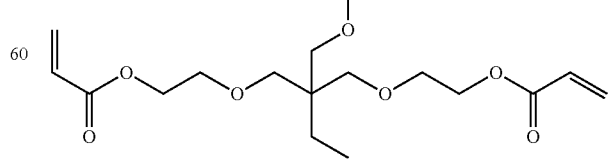

<Formation of First Light Reflecting Layer 1>

A first light reflecting layer 1 was formed on the produced λ/4 plate using the discotic liquid crystal compound 1 described above as a cholesteric liquid crystal material in the following method.

Subsequently, the concentration of the solute having the following compositional ratio was adjusted such that the dried film thickness became 2.4 μm, and the solute was dissolved in MEK, whereby a coating solution 1 including a discotic liquid crystal compound was prepared. The obtained coating solution 1 was used as the composition of Example 1.

The above-described λ/4 plate was bar-coated with this composition (coating solution 1) of Example 1, and the resulting product was subjected to heat-aging at 120° C. for 1 minute, whereby a uniform cholesteric liquid crystal alignment state was obtained. Thereafter, this coating film was kept at 45° C., and ultraviolet rays irradiation was performed on this coating film using a high pressure mercury lamp in a nitrogen atmosphere, whereby a first light reflecting layer 1 formed by fixing a cholesteric liquid crystalline phase was formed. The reflecting center wavelength of selective reflection of the first light reflecting layer 1 was 620 nm.

<<Light Reflecting Composition 1>>

| | |
|---|---|
| Discotic liquid crystal compound 1 described above | 100 parts by mass |
| Polymer type surfactant 1 described above | 0.45 parts by mass |
| Polymerization initiator 1 described above | 3 parts by mass |
| Chiral agent 1 described below | 3.8 parts by mass |

Chiral agent 1

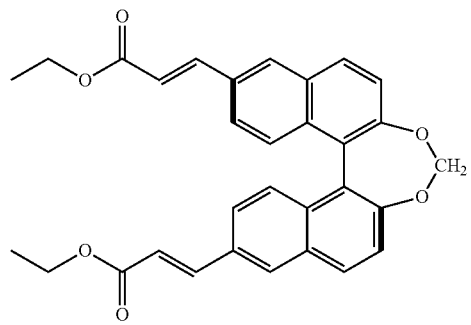

The laminate of a support, a λ/4 plate and an underlayer, and the first light reflecting layer 1, obtained in this manner, was used as the light reflecting film of Example 1.

Example 2

A solution 1 formed of a mixture (100 parts by mass) obtained by mixing the following discotic liquid crystal compound 2 and the following chiral agent 2 in a proportion of a mass ratio of 91/9, 0.2 parts by mass of a photopolymerization initiator (IRGACURE 907, manufactured by BASF Corp.), 0.45 parts by mass of the polymer type surfactant 1, and 85 parts by mass of methyl ethyl ketone was prepared.

By adjusting the amount of chiral agent 1 in the solution 1 such that the reflecting center wavelength of selective reflection became 620 nm and adding the chiral agent 1, a coating liquid 2 was prepared. The obtained coating solution 2 was used as the composition of Example 2.

The λ/4 plate produced in Example 1 was bar-coated with the obtained composition (coating solution 2) of Example 2, and the resulting product was subjected to heat-aging at 120° C. for 2 minutes, whereby a uniform cholesteric liquid crystal alignment state was obtained. Thereafter, this coating film was kept at 45° C., and ultraviolet rays irradiation was performed on this coating film using a high pressure mercury lamp in a nitrogen atmosphere, whereby a first light reflecting layer 2 formed by fixing a cholesteric liquid crystalline phase was formed.

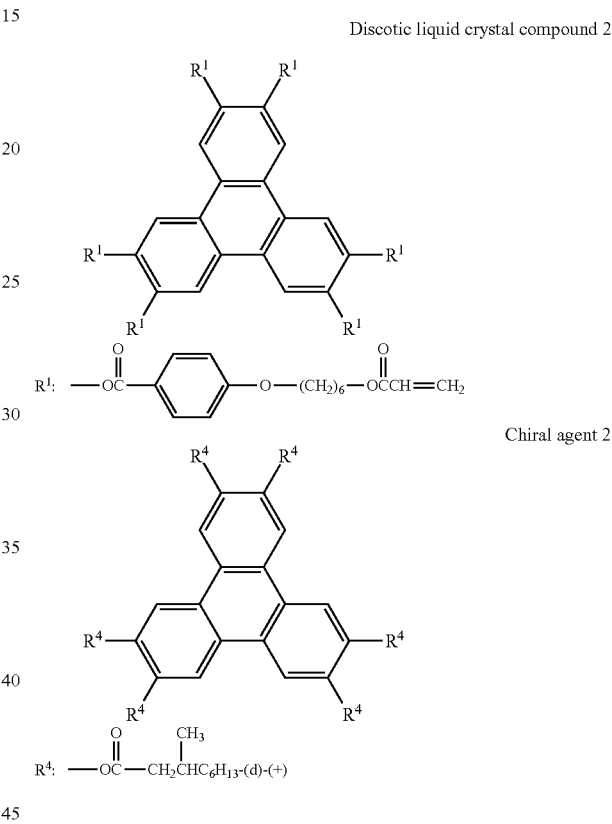

The laminate of a support, a λ/4 plate and an underlayer, and the first light reflecting layer 2, obtained in this manner, was used as the light reflecting film of Example 2.

Example 3

A solution 2 formed of 100 parts by mass of the following discotic liquid crystal compound, 2 parts by mass of a photopolymerization initiator (IRGACURE 907, manufactured by BASF Corp.), 0.45 parts by mass of the polymer type surfactant 1, and 85 parts by mass of methyl ethyl ketone was prepared.

By adjusting the amount of chiral agent 1 in the solution 2 such that the reflecting center wavelength of selective reflection became 620 nm and adding the chiral agent 1, a coating liquid 3 was prepared. The obtained coating solution 3 was used as the composition of Example 3.

The λ/4 plate produced in Example 1 was bar-coated with the obtained composition (coating solution 3) of Example 3, and the resulting product was subjected to heat-aging at 120° C. for 3 minutes, whereby a uniform cholesteric liquid crystal alignment state was obtained. Thereafter, this coating film was kept at 45° C., and ultraviolet rays irradiation was performed on this coating film using a high pressure mercury lamp in a nitrogen atmosphere, whereby a first light reflecting layer 3 formed by fixing a cholesteric liquid crystalline phase was formed.

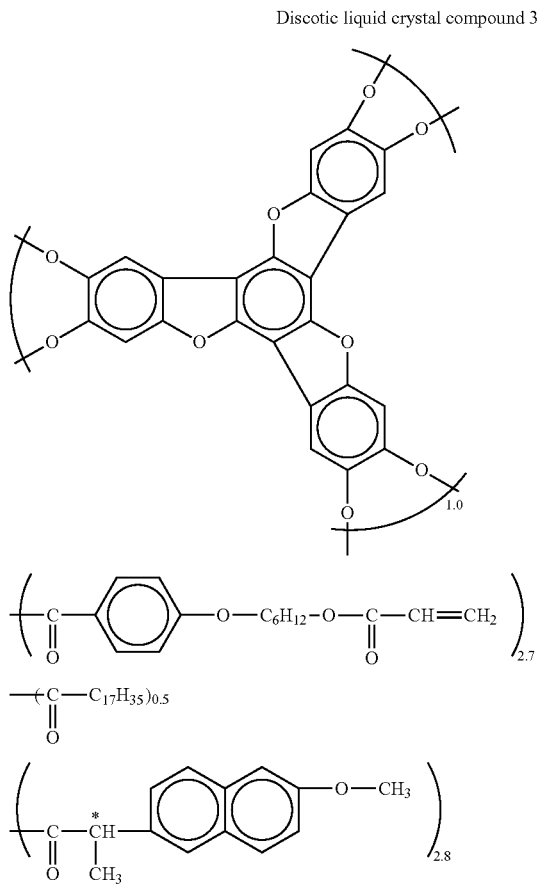

(the number next to the parenthesis represents a molar compositional ratio)

The laminate of a support, a λ/4 plate and an underlayer, and the first light reflecting layer 3, obtained in this manner, was used as the light reflecting film of Example 3.

Comparative Example 1

A light reflecting layer formed by fixing a cholesteric liquid crystalline phase using a rod-shaped liquid crystal compound was produced using the cholesteric liquid crystalline mixture (R1) using the following rod-shaped liquid crystal compound. A mixture having the following composition was applied thereto, and the resulting product was heated at 85° C. for 1 minute and exposed to light at 45° C., whereby a light reflecting layer was formed.

<Preparation of Choresteric Liquid Crystalline Mixture (R1) Using Rod-Shaped Liquid Crystal Compound>

The following rod-shaped liquid crystal compound 11, the following the rod-shaped liquid crystal compound 12, the following low molecular type surfactant 2, the following low molecular type surfactant 3, the following chiral agent, the following polymerization initiator, a solvent (methyl ethyl ketone) were mixed, whereby a coating solution having the following composition was prepared. The obtained coating solution was used as a coating solution (R1) which was a choresteric liquid crystalline mixture. The coating solution (R1) was used as the composition of Comparative Example 1.

| | |
|---|---|
| Rod-shaped liquid, crystal compound 11 described below | 80 parts by mass |
| Rod-shaped liquid crystal compound 12 described below | 20 parts by mass |
| Low molecular type surfactant 2 described below | 0.1 parts by mass |
| Low molecular type surfactant 3 described below | 0.007 parts by mass |
| Right turning chiral agent LC756 (manufactured by BASF Corp.) | amount to be a reflecting center wavelength described on the following Table 1 |
| Polymerization initiator IRGACURE819 (manufactured by Chiba JAPAN Co., Ltd.) | 3 parts by mass |
| Solvent (methyl ethyl ketone) | amount at which the solvent concentration becomes 30 parts by mass |

*Rod-shaped liquid crystal compound 11

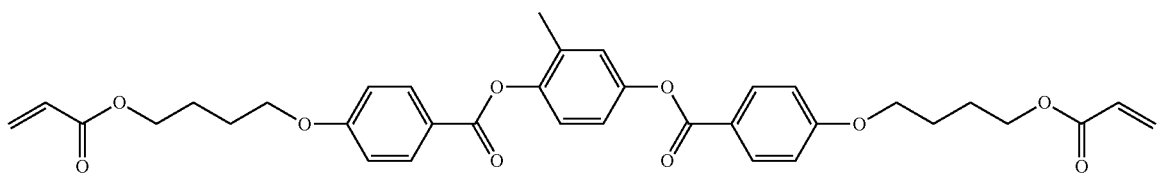

*Rod-shaped liquid crystal compound 12

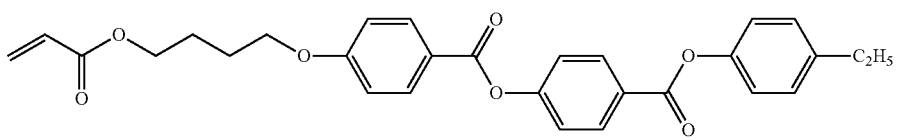

Low molecular type surfactant 2

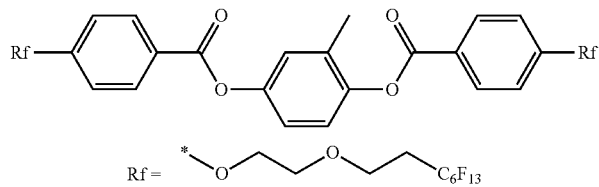

Low molecular type surfactant 3

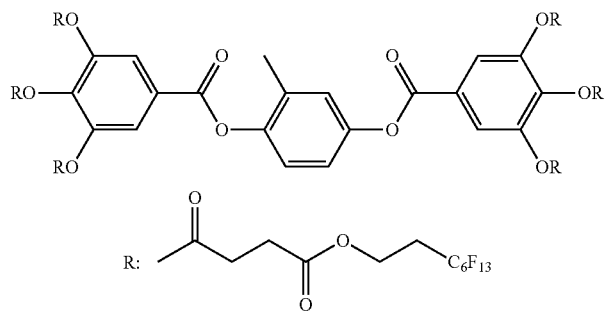

The reflecting center wavelength at the peak of the maximum reflectance of the obtained light reflecting layer was 620 nm, the full width at half maximum was 50 nm, and the film thickness was 2.4 μm. The laminate of a support, a λ/4 plate and an underlayer, and a first light reflecting layer formed by fixing a cholesteric liquid crystalline phase using a rod-shaped liquid crystal compound, obtained in this manner, was used as the light reflecting film of Comparative Example 1.

<Heat Resistance>

The compositions and durabilities of the light reflecting films, produced in Examples 1 to 3 and Comparative Example 1 were evaluated.

The light reflecting film of each of Examples and Comparative Examples was heated at a temperature of 220° C. for 3 hours. The transmittance of the light reflecting film before and after heating was measured using an ultraviolet visible spectrophotometer UV-3100 (manufactured by Shimadzu Corporation). Based on the results, using the transmittance at the reflecting center wavelength at which selective reflection is obtained as an indicator, evaluation was performed according to the following criteria. The obtained results are shown in the following Table 1.

A reflectance was 90% or greater compared with that before heating.

B reflectance was less than 90% compared with that before heating.

TABLE 1

| | Liquid crystal type | Heat resistance |
| --- | --- | --- |
| Example 1 | Discotic liquid crystal compound 1 | A |
| Example 2 | Discotic liquid crystal compound 2 | A |
| Example 3 | Discotic liquid crystal compound 3 | A |
| Comparative Example 1 | Rod-shaped liquid crystal compound | B |

From Table 1, in the composition and the light reflecting film of each example, it was found that heat resistance is good.

In contrast, in Comparative Example 1 using a rod-shaped liquid crystal compound instead of a discotic liquid crystal compound, it was found that heat resistance is poor.

Comparative Example 2

A composition 4 and a light reflecting film were produced in the same manner as in Example 1 except that the polymer type surfactant 1 was not added to the coating solution. The obtained composition 4 and light reflecting film were used as the composition and the light reflecting film of Comparative Example 2.

Comparative Example 3

A composition 5 and a light reflecting film were produced in the same manner as in Example 2 except that the polymer type surfactant 1 was not added to the coating solution. The obtained composition 5 and light reflecting film were used as the composition and the light reflecting film of Comparative Example 3.

Comparative Example 4

A composition 6 and a light reflecting film were produced in the same manner as in Example 3 except that the polymer type surfactant 1 was not added to the coating solution. The obtained composition 6 and light reflecting film were used as the composition and the light reflecting film of Comparative Example 4.

Comparative Example 5

A light reflecting film were produced in the same manner as in Comparative Example 3 except that the coating film thickness of the composition 5 used as a coating solution was changed to 10 μm and heating aging was performed at 120° C. for 1 hour. The obtained light reflecting film was used as the light reflecting film of Comparative Example 5.

Examples 4 to 6

Compositions 8 to 10 were produced in the same manner as in Example 1 except that the polymer type surfactant 1 added to the composition 1 was changed to the surfactants described in the following Table 2, respectively, and the amount of chiral agent was adjusted such that the peak center of the reflected light became 620 nm. The obtained compositions 8 to 10 were used as the composition of each of Examples 4 to 6.

Light reflecting films were produced in the same manner as in Example 1 except that any one of the compositions 8 to 10 was used respectively instead of the composition 1. The obtained light reflecting films were used as the light reflecting film of each of Examples 4 to 6.

Polymer type surfactant 2

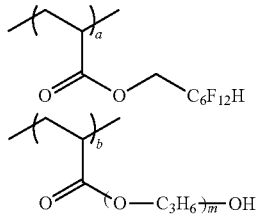

(weight average molecular weight 8000)
a/b = 40/60

In the above structural formula, a/b=40/60 shows that a is 40% by mass and b is 60% by mass, and m represents 8.

Polymer type surfactant 3

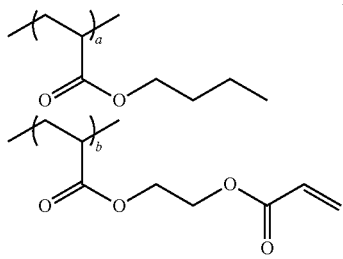

(weight average molecular weight 8000)
a/b = 60/40

In the above structural formula, a/b=60/40 shows that a is 60% by mass and b is 40% by mass.

Low molecular type surfactant 1

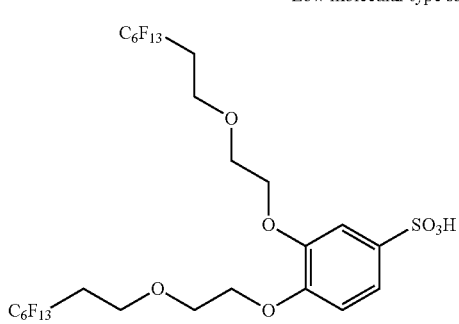

Example 6A

A light reflecting layer was formed in the same manner as in Example 1 except that the composition 1 was changed to the following composition 10A, and was used as the light reflecting film of Example 6A. In addition, the composition 10A was used as the composition of Example 6A.

<Composition 10A>

| | |
|---|---|
| Discotic liquid crystal compound 1 | 100 parts by mass |
| Polymer type surfactant 4 described below | 0.03 parts by mass |
| Polymerization initiator 1 | 3 parts by mass |
| Chiral agent 1 | 5 parts by mass |

Polymer type surfactant 4

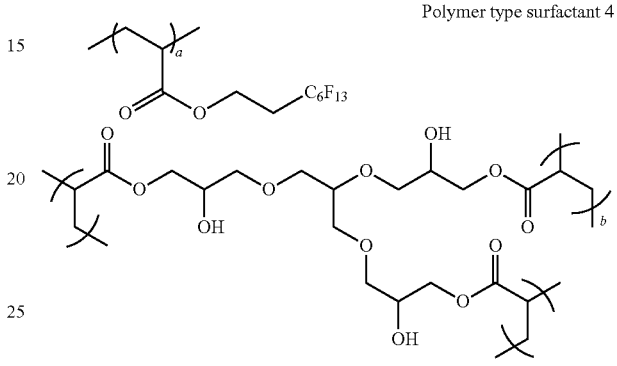

a/b = 59/41

[Evaluation]
<Reflectance>

The transmittance of the light reflecting film of each of Examples and Comparative Examples was measured using an ultraviolet visible spectrophotometer UV-3100 (manufactured by Shimadzu Corporation). Based on the results, using the transmittance at the reflecting center wavelength at which selective reflection is obtained as an indicator, evaluation was performed according to the following criteria. The obtained results are shown in the following Table 2.

A: transmittance was 60% or less
B: transmittance was greater than 60% and equal to or less than 70%
C: transmittance was greater than 70% and equal to or less than 80%
D: transmittance was greater than 80%

If the evaluation criteria is A, B, or C, tint is good, it is possible to suitably use, and it is more preferable that the evaluation criteria is A or B, and it is particularly preferable that the evaluation criteria is A.

<Alignment Time>

The composition of each of examples and comparative Examples was applied in the film thickness shown in the following table in the same manner as in the case of manufacturing the light reflecting film of each of examples and comparative examples, heat was performed at 120° C., and every 1 minute over time, the transmittance was measured by the method described above. Using the time when the amount of decrease in transmittance became 3% or less as an alignment time, evaluation was performed according to the following criteria. The obtained results are shown in the following Table 2.

A: alignment occurred at an alignment time equal to or less than 1 minute.
B: alignment occurred at an alignment time of greater than 1 minute and equal to or less than 5 minutes.

C: alignment occurred at an alignment time of greater than 5 minutes and less than 10 minutes.

D: alignment occurred at an alignment time equal to or greater than 10 minutes.

If the evaluation criteria is A or B, production speed is excellent, it is possible to suitably use, and it is more preferable that the evaluation criteria is A.

<Cissing>

In the light reflecting layer of 15 cm×20 cm of each of examples and comparative Examples, the number of cissings of the first light reflecting layer formed by fixing a cholesteric liquid crystalline phase formed using each composition was counted. The cissing refers to a region where the first light reflecting layer is not formed, on the surface of an underlayer. Base on the results, evaluation was performed according to the following criteria. The obtained results are shown in the following Table 2.

A: the number of cissings was 3 or less

B: the number of cissings was greater than 3 and equal to or less than 10

C: the number of cissings was greater than 10

If the evaluation criteria is A or B, production efficiency is excellent, it is possible to suitably use, and it is more preferable that the evaluation criteria is A.

<Alignment Defect>

The alignment defects was evaluated using the haze of the light reflecting film of each of Examples and Comparative Examples. The haze of the light reflecting film of each of Examples and Comparative Examples was measured according to JIS K7136. Base on the results, evaluation was performed according to the following criteria. The obtained results are shown in the following Table 2.

A: haze was equal to or less than 5%

B: haze was greater than 5% and equal to or less than 10%

C: haze was greater than 10%

If the evaluation criteria is A or B, light transparency is excellent, it is possible to actually use, and it is preferable that the evaluation criteria is A.

<Durability>

The durability of the light reflecting film of each of Examples and Comparative Examples was evaluated. The light reflecting film of each of Examples and Comparative Examples was kept for 1,000 hours under an environment of a humidity of 80% and a temperature of 60° C., then, wet heat aging was performed thereon, and the reflectance was measured by the method described above. Base on the results, evaluation was performed according to the following criteria. The obtained results are shown in the following Table 2.

A reflectance was 90% or greater compared with that before wet heat aging.

B reflectance was equal to or greater than 80% and less than 90% compared with that before wet heat aging.

C reflectance was less than 80% compared with that before wet heat aging.

If the evaluation criteria is A or B, deterioration of performance over time is low, it is possible to actually use, and it is preferable that the evaluation criteria is A.

TABLE 2

| | Configuration of first light reflecting layer | | | Thickness of first light reflecting layer (um) | Evaluation results | | | | |
|---|---|---|---|---|---|---|---|---|---|
| | Composition | Discotic liquid crystal compound | Surfactant | | Reflectance | Alignment time | Cissing | Alignment defects | Durability |
| Example 1 | Composition 1 | Discotic liquid crystal compound 1 | Polymer type surfactant 1 | 2.4 | A | A | A | A | A |
| Example 2 | Composition 2 | Discotic liquid crystal compound 2 | Polymer type surfactant 1 | 2.4 | A | B | A | A | A |
| Example 3 | Composition 3 | Discotic liquid crystal compound 3 | Polymer type surfactant 1 | 2.4 | A | B | A | A | A |
| Comparative Example 2 | Composition 4 | Discotic liquid crystal compound 1 | Not present | 2.4 | C | C | C | C | C |
| Comparative Example 3 | Composition 5 | Discotic liquid crystal compound 2 | Not present | 2.4 | D | C | C | C | C |
| Comparative Example 4 | Composition 6 | Discotic liquid crystal compound 3 | Not present | 2.4 | D | C | C | C | C |
| Comparative Example 5 | Composition 5 | Discotic liquid crystal compound 3 | Not present | 10 | A | D | C | C | C |
| Example 4 | Composition 8 | Discotic liquid crystal compound 1 | Polymer type surfactant 2 | 2.4 | A | B | A | B | A |
| Example 5 | Composition 9 | Discotic liquid crystal compound 1 | Polymer type surfactant 3 | 2.4 | A | B | B | B | A |
| Example 6 | Composition 10 | Discotic liquid crystal compound 1 | Polymer type surfactant 1 | 2.4 | B | B | B | B | B |
| Example 6A | Composition 10A | Discotic liquid crystal compound 1 | Polymer type surfactant 4 | 2.4 | A | A | B | A | A |

From Table 2, it was found that the composition of each of examples and the light reflecting film each of examples has few alignment defects and also has excellent durability under a hot and humid environment.

On the other hand, it was found that all the compositions of Examples 2 to 5 to which a surfactant was not added have large alignment defects, and have poor durability.

C: full width at half maximum was 40 nm to 20 nm

D: full width at half maximum was less than 20 nm

If the full width at half maximum is small, the color irregularity and the front contrast are reduced. If the evaluation criteria is A to C, it is possible to suitably use, and it is more preferable that the evaluation criteria is A or B, and it is particularly preferable that the evaluation criteria is A.

TABLE 3

|  | Configuration of first light reflecting layer | | | | Evaluation results | | | | | |
| --- | --- | --- | --- | --- | --- | --- | --- | --- | --- | --- |
|  | Composition | Discotic liquid crystal compound | Surfactant | Film thickness (um) | Reflectance | Alignment time | Cissing | Alignment defects | Durability | Full width at half maximum |
| Example 1 | Composition 1 | Discotic liquid crystal compound 1 | Polymer type surfactant 1 | 2.4 | A | A | A | A | A | A |
| Example 7 | Composition 11 | Discotic liquid crystal compound 2 | Polymer type surfactant 1 | 2.4 | A | B | A | A | A | B |
| Example 8 | Composition 12 | Discotic liquid crystal compound 3 | Polymer type surfactant 1 | 2.4 | A | B | A | A | A | C |

The composition of each of examples and the light reflecting film of each of examples had high reflectance, a short alignment time, and little cissing, and the characteristics thereof were also good.

Examples 7 and 8

<Comparison of Discotic Liquid Crystal Compound>

Compositions 11 and 12 were produced in the same manner as in Example 1 except that the discotic liquid crystal compound 1 added to the composition 1 was changed to the discotic liquid crystal compounds described in the following Table 3, respectively, and the amount of discotic liquid crystal compound and chiral agent added was adjusted such that the peak center of the reflected light became 620 nm. The obtained compositions 11 and 12 were used as the composition of each of Examples 7 and 8.

Light reflecting films were produced in the same manner as in Example 1 except that the composition 11 or 12 was used instead of the composition 1. The obtained light reflecting films were used as the light reflecting film of each of Examples 7 to 8.

[Evaluation]

The reflectance, the alignment time, the cissing, the alignment defects, and the durability of each of the compositions and each of the light reflecting film produced in Examples 1, 7, and 8, were evaluated in the same manner as in Example 1. The obtained results are shown in the following Table 3.

<Full Width at Half Maximum>

For each of the light reflecting film produced in Examples 1, 7, and 8, a transmission spectrum was measured using an ultraviolet visible spectrophotometer UV-3100 (manufactured by Shimadzu Corporation), and the full width at half maximum of the decreased peak in the transmittance was derived. Base on the results, evaluation was performed according to the following criteria. The obtained results are shown in the following Table 3.

A: full width at half maximum was 50 nm or greater

B: full width at half maximum was less than 50 nm and greater than 40 nm

From Table 3, it was found that, in the light reflecting film of Example 1 using a discotic liquid crystal compound 1, the full width at half maximum in the reflection spectrum is the largest, in the light reflecting film of Example 11 using a discotic liquid crystal compound 2, the full width at half maximum in the reflection spectrum is large, and in the light reflecting film of Example 12 using a discotic liquid crystal compound 3, the full width at half maximum in the reflection spectrum is the smallest.

Example 9

<Comparison of Underlayer>

First, SUNEVER SE-130 (manufactured by Nissan Chemical Industries, Ltd.) was dissolved in N-methylpyrrolidone, then, a glass plate was bar-coated with the solution of which the concentration was adjusted such that the dry film thickness became 0.5 μm, and the resulting product was heated at 100° C. for 5 minutes and at 250° C. for 1 hour. Then, this surface was subjected to a rubbing treatment, whereby an underlayer (alignment film) was formed.

Subsequently, the composition (coating solution 1) of Example 1 was prepared by adjusting the concentration such that the dried film thickness became 2.4 μm and dissolving in MEK.

The above-described underlayer (alignment film) was bar-coated with this composition (coating solution 1) of Example 1, then, evaporation of the solvent was performed by keeping the resulting product at 70° C. for 2 minutes, and the resulting product was subjected to heat-aging at 120° C. for 1 minute, whereby a uniform cholesteric liquid crystal alignment state was obtained. Thereafter, this coating film was kept at 45° C., and ultraviolet rays irradiation was performed on this coating film using a high pressure mercury lamp in a nitrogen atmosphere, whereby a first light reflecting layer 1 formed by fixing a cholesteric liquid crystalline phase was formed. The surface on the first light reflecting layer side of a laminate of this glass plate, an underlayer including SE-130 (alignment film), and the first light reflecting layer was attached to the λ/4 plate produced in Example 1 using an acrylic adhesive, and the glass plate was peeled off, whereby a light reflecting film was formed.

The laminate of a support, a λ/4 plate, the first light reflecting layer, and an underlayer (alignment film) including SE-130, obtained in this manner, was used as the light reflecting film of Example 9.

[Evaluation]

The reflectance, the alignment time, the cissing, the alignment defects, and the durability of each of the compositions and each of the light reflecting film produced in Examples 1 and 9, were evaluated in the same manner as in Example 1. The obtained results are shown in the following Table 4.

TABLE 4

| | | Configuration of first light reflecting layer | | | Evaluation results | | | | |
| --- | --- | --- | --- | --- | --- | --- | --- | --- | --- |
| | | | Discotic | | | | | | |
| | Composition | Underlayer (alignment film) | liquid crystal compound | Chiral agent | Surfactant | Reflectance | Alignment time | Cissing | Alignment defects | Durability |
| Example 1 | Composition 1 | λ/4 plate (vertically aligned film of discotic liquid crystal) | Discotic liquid crystal compound 1 | Chiral agent 1 | Polymer type surfactant 1 | A | A | A | A | A |
| Example 9 | Composition 1 | SE-130 | Discotic liquid crystal compound 1 | Chiral agent 1 | Polymer type surfactant 1 | A | A | A | B | A |

From Table 4, it was found that the light reflecting film of Example 1 using an underlayer (alignment film) containing a discotic liquid crystal compound which is aligned vertically has few alignment defects compared with alignment defects in the light reflecting film of Example 9 using an alignment film known in the related art as an underlayer (alignment film).

Examples 10 to 13

<Comparison of Chiral Agent>

Compositions 13 and 16 were produced in the same manner as in Example 1 except that the chiral agent 1 added to the composition 1 was changed to the chiral agents described in the following Table 5, respectively, and the amount of discotic liquid crystal compound and chiral agent added was adjusted such that the peak center of the reflected light became 620 nm. The obtained compositions 13 to 16 were used as the composition of each of Examples 10 to 13.

Light reflecting films were produced in the same manner as in Example 1 except that each of the compositions 13 to 16 was used instead of the composition 1. The obtained light reflecting films were used as the light reflecting film of each of Examples 10 to 13.

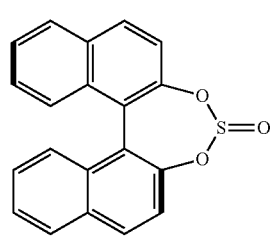

Chiral agent 3

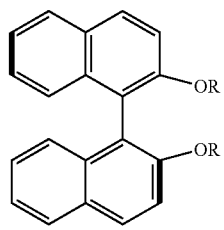

Chiral agent 4

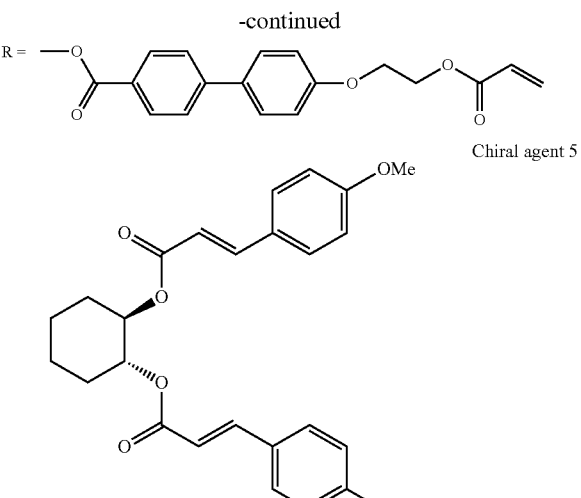

Chiral agent 5

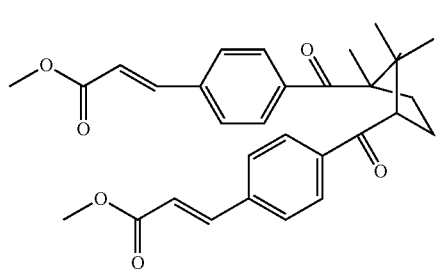

Chiral agent 6

[Evaluation]

The reflectance, the alignment time, the cissing, the alignment defects, and the durability of each of the compositions and each of the light reflecting film produced in Examples 10 and 13, were evaluated in the same manner as in Example 1. The obtained results are shown in the following Table 5.

TABLE 5

| | Configuration of first light reflecting layer | | | Evaluation results | | | | |
|---|---|---|---|---|---|---|---|---|
| | Composition | Chiral agent | Surfactant | Reflectance | Alignment time | Cissing | Alignment defects | Durability |
| Example 1 | Composition 1 | Chiral agent 1 | Polymer type surfactant 1 | A | A | A | A | A |
| Example 10 | Composition 13 | Chiral agent 3 | Polymer type surfactant 1 | A | B | A | B | A |
| Example 11 | Composition 14 | Chiral agent 4 | Polymer type surfactant 1 | B | B | A | B | A |
| Example 12 | Composition 15 | Chiral agent 5 | Polymer type surfactant 1 | C | B | A | B | A |
| Example 13 | Composition 16 | Chiral agent 6 | Polymer type surfactant 1 | C | B | A | B | A |

From Table 5, it was found that, in the composition and the light reflecting film of Example 1 using a chiral agent 1 which has a binaphthyl structure and represented by General Formula (1) or General Formula (2), in which binaphthol molecules were bonded to each other through a linking chain of ether, the alignment time was short, the reflectance was high, and few alignment defects occurred.

Next, it was found that the composition and the light reflecting film of Example 10 using a chiral agent 3 which has a binaphthyl structure and represented by General Formula (1) or General Formula (2), in which binaphthol molecules were bonded to each other through a linking chain including a sulfur atom are preferable from the viewpoint of the fact that the alignment time was little long, alignment defects slightly occurred, and the reflectance was high.

Next, it was found that, in the composition and the light reflecting film of Example 11 using a chiral agent 4 which has a binaphthyl structure and represented by General Formula (1), the alignment time was little long, the alignment defects slightly occurred, and the reflectance was slightly low.

In addition, it was found that, in the composition and the light reflecting film of each of Examples 12 and 13 using a chiral agent which does not have a binaphthyl structure, the alignment time was little long, the alignment defects slightly occurred, and the reflectance was lower.

Example 101

(Production of Luminance-Improving Film)

For the cholesteric liquid crystalline mixture (R1) obtained by using a rod-shaped liquid crystal compound used in Comparative Example 1, a cholesteric liquid crystalline mixture (R2) in which the amount of chiral agent and rod-shaped liquid crystal compound was adjusted such that the reflecting center wavelength became 530 nm was prepared. Thereafter, a light reflecting layer formed by fixing a cholesteric liquid crystalline phase obtained by using a rod-shaped liquid crystal compound was produced. A PET film (thickness of 75 μm) manufactured by Fujifilm Corporation was rubbed, then, the following cholesteric liquid crystalline mixture (R2) was applied to the rubbed surface of the PET film, and the resulting product was heated at 85° C. for 1 minute and exposed to light at 45° C., whereby a third light reflecting layer was obtained. The direction of the rubbing treatment was parallel to the longitudinal direction of the film.

For the cholesteric liquid crystalline mixture (R1) obtained by using a rod-shaped liquid crystal compound used in Comparative Example 1, a cholesteric liquid crystalline mixture (R3) in which the amount of chiral agent and rod-shaped liquid crystal compound was adjusted such that the reflecting center wavelength became 450 nm was prepared. The cholesteric liquid crystalline mixture (R3) in which the reflecting center wavelength was adjusted to become 450 nm was applied to the third light reflecting layer, and the resulting product was heated at 85° C. for 1 minute and exposed to light at 45° C. to form a second light reflecting layer, whereby a laminate of the PET film, the third light reflecting layer, and the second light reflecting layer was obtained.

The reflecting center wavelength at the peak of the maximum reflectance of the obtained third light reflecting layer was 550 nm, the full width at half maximum was 40 nm, and the film thickness was 2.2 μm.

The reflecting center wavelength at the peak of the maximum reflectance of the obtained second light reflecting layer was 460 nm, the full width at half maximum was 40 nm, and the film thickness was 1.8 μm.

The interface between the second light reflecting layer side of the obtained laminate of the PET film, the third light reflecting layer, and the second light reflecting layer, and the first light reflecting layer 1 side of the light reflecting film of Example 1 was attached using a gluing material such that the both were adhered. Thereafter, it was peeled off the PET film used at the time of forming the third light reflecting layer was peeled.

In addition, the thickness of the portion excluding the support formed of the cellulose acylate film 1, of the luminance-improving film 1 having the obtained support formed of the cellulose acylate film 1, the λ/4 plate and the underlayer, the first light reflecting layer, the gluing material, the second light reflecting layer, and the third light reflecting layer in this order was 7.4 μm. The luminance-improving film 1 obtained in this manner was used as the luminance-improving film of Example 101.

<Manufacture of Luminance-Improving Film-Attached Backlight Unit and Liquid Crystal Display Device>

A luminance-improving film-attached backlight unit and a liquid crystal display device of Example 101 were manufactured by decomposing a commercially available liquid crystal display device (manufactured by SONY Corporation, trade name KDL46W900A) and changing the commercially available luminance-improving film used as a luminance-improving film to the luminance-improving film 1 (including a support formed of cellulose acylate film 1) of Example 101.

Examples 102 to 106, 106A, Comparative Examples 102 to 105, and Examples 110 to 113

Luminance-improving films 2 to 10, 10A, and 11 to 14 were produced in the same manner as in Example 101 except that the light reflecting film of Example 1 was changed to the light reflecting film of Examples 2 to 6, 6A, Comparative Examples 2 to 5, and Examples 10 to 13, respectively. The obtained luminance-improving films 2 to 10,10A, and 11 to 14 were used as the luminance-improving films of Examples 102 to 106 and 106A, Comparative Examples 102 to 105, and Examples 110 to 113, respectively.

Luminance-improving film-attached backlight units and liquid crystal display devices of Examples 102 to 106 and 106A, Comparative Examples 102 to 105, and Examples 110 to 113 were produced in the same manner as in Example 101 except that the luminance-improving films 2 to 10, 10A, and 11 to 14 were used instead of the luminance-improving film 1, respectively.

[Evaluation]

<Evaluation of Front Luminance>

The front luminance of the liquid crystal display device was measured by the method described in paragraph [0180] in JP2009-93166A. Base on the results, evaluation was performed according to the following criteria. The results are shown in the following Tables 6 and 7.

A: 15% or greater better than the front luminance of the liquid crystal display device of Comparative Example 102.

B: 10% or greater and less than 15% better than the front luminance of the liquid crystal display device of Comparative Example 102.

C: 5% or greater and less than 10% better than the front luminance of the liquid crystal display device of Comparative Example 102.

D: equal to or less than the front luminance of the liquid crystal display device of Comparative Example 102.

If the evaluation criteria is A, B, or C, front luminance is good, it is possible to suitably use as a liquid crystal display device, and it is more preferable that the evaluation criteria is A or B, and it is particularly preferable that the evaluation criteria is A.

<Evaluation of Front Contrast>

The front contrast of the liquid crystal display device was measured by the method described in paragraph [0180] in JP2009-93166A. Base on the results, evaluation was performed according to the following criteria. The results are shown in the following Tables 6 and 7.

A: 10% or greater better than the front contrast of the liquid crystal display device of Comparative Example 102.

B: 5% or greater and less than 10% better than the front contrast of the liquid crystal display device of Comparative Example 102.

C: equal to or less than the front contrast of the liquid crystal display device of Comparative Example 102.

If the evaluation criteria is A or B, front luminance is good, it is possible to suitably use as a liquid crystal display device, and it is more preferable that the evaluation criteria is A.

<Evaluation of Change in Shade in Oblique Direction>

The diagonal tint change Δu'v' of the liquid crystal display device was evaluated by the following method. The tint color difference Δu'v' taking the difference between the front (polar angle of 0 degrees) and the direction of a polar angle of 60 degrees as the value of the tint coordinate u',v' was measured in the direction in which the azimuth angle is 0 degrees to 360 degrees, and the average value was uses as an evaluation index of the diagonal tint change Δu'v'. In the measurement of the tint coordinate u'v', a measuring instrument (EZ-Contrast160D, manufactured by ELDIM). Base on the results, evaluation was performed according to the following criteria. The results are shown in the following Tables 6 and 7.

A: 30% or greater better than the diagonal tint change of the liquid crystal display device of Comparative Example 102.

B: 20% or greater and less than 30% better than the diagonal tint change of the liquid crystal display device of Comparative Example 102.

C: 10% or greater and less than 20% better than the diagonal tint change of the liquid crystal display device of Comparative Example 102.

D: better than the diagonal tint change of the liquid crystal display device of Comparative Example 102, but less than 10% better.

E: equal to or less than the diagonal tint change of the liquid crystal display device of Comparative Example 102.

If the evaluation criteria is A, B, or C, the diagonal tint change of color irregularity is small, and thus, this is excellent, and it is preferable that the evaluation criteria is A or B, and it is more preferable that the evaluation criteria is A.

<Evaluation of Durability>

The durability of the liquid crystal display device was evaluated. The durability was evaluated by continuously using for 1,000 hours in a state in which the liquid crystal display device using each luminance-improving film was irradiated with light and by measuring the front luminance of the liquid crystal display device before and after light irradiation. Base on the results, evaluation was performed according to the following criteria. The results are shown in the following Tables 6 and 7.

A luminance was 95% or greater compared with that before light irradiation.

B luminance was 90% or greater and less than 95% compared with that before light irradiation.

C luminance was 80% or greater and less than 90% compared with that before light irradiation.

D luminance was less than 85% compared with that before light irradiation.

If the evaluation criteria is A or B, deterioration of performance over time is low, and thus, this is excellent, and it is preferable that the evaluation criteria is A.

TABLE 6

| | | Configuration of liquid crystal device Luminance-improving film | | | Evaluation of liquid crystal device | | | |
|---|---|---|---|---|---|---|---|---|
| | | Configuration of first light reflecting layer | | | | | | |
| | Type | Composition | Discotic liquid crystal compound | Surfactant | Front luminance | Front contrast | Diagonal tint change | Durability |
| Example 101 | Luminance-improving film 1 | Composition 1 | Discotic liquid crystal compound 1 | Polymer type surfactant 1 | A | A | A | A |
| Example 102 | Luminance-improving film 2 | Composition 2 | Discotic liquid crystal compound 2 | Polymer type surfactant 1 | A | A | B | A |
| Example 103 | Luminance-improving film 3 | Composition 3 | Discotic liquid crystal compound 3 | Polymer type surfactant 1 | A | B | B | A |
| Comparative Example 102 | Luminance-improving film 4 | Composition 4 | Discotic liquid crystal compound 1 | Not present | D | C | E | C |
| Comparative Example 103 | Luminance-improving film 5 | Composition 5 | Discotic liquid crystal compound 2 | Not present | D | C | E | C |
| Comparative Example 104 | Luminance-improving film 6 | Composition 6 | Discotic liquid crystal compound 3 | Not present | D | C | E | C |
| Comparative Example 105 | Luminance-improving film 7 | Composition 5 | Discotic liquid crystal compound 3 | Not present | A | C | E | C |
| Example 104 | Luminance-improving film 8 | Composition 8 | Discotic liquid crystal compound 1 | Polymer type surfactant 2 | A | A | C | A |
| Example 105 | Luminance-improving film 9 | Composition 9 | Discotic liquid crystal compound 1 | Polymer type surfactant 3 | A | B | C | A |
| Example 106 | Luminance-improving film 10 | Composition 10 | Discotic liquid crystal compound 1 | Polymer type surfactant 1 | B | B | C | B |
| Example 106A | Luminance-improving film 10A | Composition 10A | Discotic liquid crystal compound 1 | Polymer type surfactant 4 | A | B | A | A |

TABLE 7

| | | Configuration of liquid crystal device Luminance-improving film | | Evaluation of liquid crystal device | | | |
|---|---|---|---|---|---|---|---|
| | | Configuration of first light reflecting layer | | | | | |
| | Type | Composition | Front luminance | Front contrast | Diagonal tint change | Durability | |
| Example 101 | Luminance-improving film 1 | Composition 1 | A | A | A | A | |
| Example 110 | Luminance-improving film 11 | Composition 13 | A | A | B | A | |
| Example 111 | Luminance-improving film 12 | Composition 14 | B | A | B | A | |
| Example 112 | Luminance-improving film 13 | Composition 15 | C | A | B | A | |
| Example 113 | Luminance-improving film 14 | Composition 16 | C | A | B | A | |

From Tables 6 and 7, it was found that, in the liquid crystal display device of each of examples, the diagonal tint change is suppressed, and durability is high.

On the other hand, it was found that, in the liquid crystal display devices of Comparative Examples 102 to 105 in which the first light reflecting layer was formed using the compositions of Comparative Example 2 to 5 in which a surfactant was not added, the diagonal tint change is large, and durability is low.

The liquid crystal display device of each of examples had high front luminance and high front contrast.

EXPLANATION OF REFERENCES 1 backlight side polarizing plate
2 phase difference film
3 polarizer
4 polarizing plate protective film
10 light reflecting film
11 luminance-improving film
12 λ/4 plate
13 reflective polarizer
14a first light reflecting layer (discotic liquid crystal compound is aligned vertically)
14b second light reflecting layer
14c third light reflecting layer
15 support
17 λ/4 plate and underlayer (alignment film)
18 underlayer (alignment film)
20 adhesive layer (adhesive or gluing material)
21 optical sheet member
22 luminance-improving film-attached backlight unit
31 backlight unit
41 thin layer transistor substrate
42 liquid crystal cell
43 color filter substrate
44 display side polarizing plate
51 liquid crystal display device

What is claimed is:

1. A composition, comprising:
a discotic liquid crystal compound;
a chiral agent; and
a surfactant,
wherein the chiral agent contains an axially asymmetric structure.

2. The composition according to claim 1, wherein the surfactant is a polymer surfactant.

3. The composition according to claim 1, wherein the discotic liquid crystal compound has a 3-substituted benzene structure.

4. The composition according to claim 1, wherein the chiral agent contains a binaphthyl structure.

5. The composition according to claim 1, wherein the chiral agent is represented by the following General Formula (1),

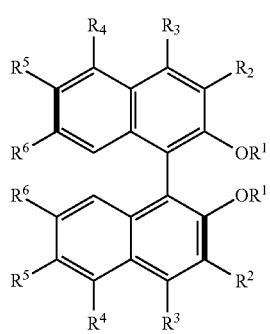

General Formula (1)

in General Formula (1), $R^1$ to $R^6$ each independently represent a monovalent organic group or an inorganic group;
a plurality of $R^1$ to $R^6$ may be the same as or different from each other; and
$R^1$ to $R^6$ may be linked to each other.

6. The composition according to claim 1, wherein the chiral agent is represented by the following General Formula (2),

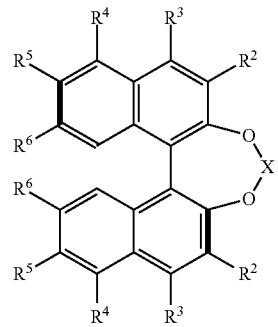

General Formula (2)

in General Formula (2), $R^2$ to $R^6$ each independently represent a monovalent organic group; a plurality of $R^2$ to $R^6$ may be the same as or different from each other;
$R^2$ to $R^6$ may be linked to each other; and
X represents a divalent organic group or an inorganic group.

7. The composition according to claim 1, wherein the composition is used for forming a light reflecting layer formed by fixing a cholesteric liquid crystalline phase.

8. A light reflecting film, comprising:
a first light reflecting layer formed by fixing a cholesteric liquid crystalline phase of the composition according to claim 1,
wherein, in the first light reflecting layer, a discotic liquid crystal compound is aligned vertically.

9. The light reflecting film according to claim 8, wherein the first light reflecting layer and a λ/4 plate are laminated to each other.

10. The light reflecting film according to claim 8, wherein the first light reflecting layer is laminated in direct contact with a surface of an underlayer.

11. The light reflecting film according to claim 10, wherein the underlayer contains the discotic liquid crystal compound.

12. The light reflecting film according to claim 11, wherein, in the underlayer, the discotic liquid crystal compound is aligned vertically.

13. The light reflecting film according to claim 10, wherein the underlayer is laminated on a support.

14. The light reflecting film according to claim 10, wherein the underlayer is a λ/4 plate.

15. A luminance-improving film, comprising:
the light reflecting film according to claim 8; and
a second light reflecting layer formed by fixing a cholesteric liquid crystalline phase of a rod-shaped liquid crystal compound, the light reflecting film and a second light reflecting layer formed by fixing a cholesteric liquid crystalline phase of a rod-shaped liquid crystal compound being laminated to each other.

16. The luminance-improving film according to claim 15, wherein the light reflecting film includes the λ/4 plate, and the λ/4 plate, the first light reflecting layer, and the second light reflecting layer are laminated in this order.

17. The luminance-improving film according to claim 15, further comprising:
a third light reflecting layer formed by fixing a cholesteric liquid crystalline phase of a rod-shaped liquid crystal compound.

18. The luminance-improving film according to claim 17, wherein, any one of the first light reflecting layer, the second light reflecting layer, and the third light reflecting layer is a blue light reflecting layer having a peak of reflectance of which the reflecting center wavelength is 380 nm to 499 nm and the full width at half maximum is 100 nm or less, another one is a green light reflecting layer having a peak of reflectance of which the reflecting center wavelength is 500 nm to 599 nm and the full width at half maximum is 125 nm or less, and the other one is a red light reflecting layer having a peak of reflectance of which the reflecting center wavelength is 600 nm to 750 nm and the full width at half maximum is 150 nm or less.

19. A luminance-improving film-attached backlight unit, comprising:

the luminance-improving film according to claim 15; and a backlight unit.

20. A liquid crystal display device using the luminance-improving film according to claim 15.

21. The composition according to claim 1, wherein the chiral agent is at least one selected from the chiral agent represented by the following General Formula (1), Chiral agent 2, Chiral agent 5 and Chiral agent 6;

General Formula (1)

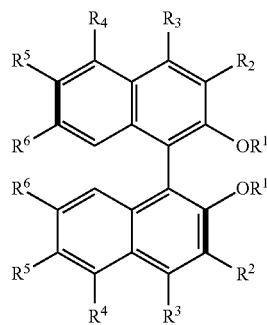

in General Formula (1), R1 to R6 each independently represent a monovalent organic group or an inorganic group;

a plurality of R1 to R6 may be the same as or different from each other; and

R1 to R6 may be linked to each other,

Chiral agent 2

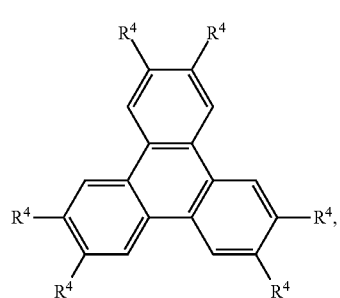

Chiral agent 5

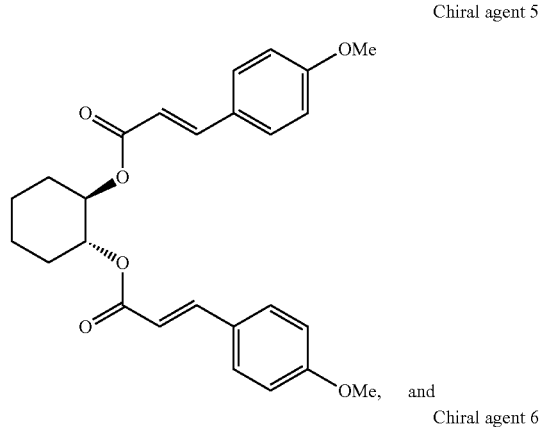

and

Chiral agent 6

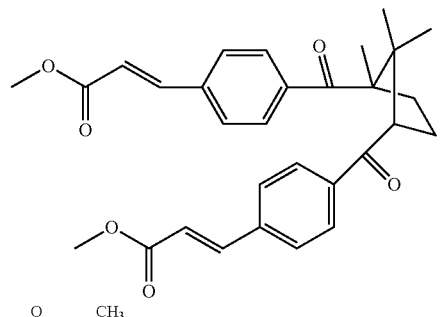

$R^4$: —O$\overset{O}{\overset{\|}{C}}$—CH$_2$$\overset{CH_3}{\overset{|}{C}}$HC$_6$H$_{13}$—(d)—(+)

* * * * *